US006312364B1

(12) United States Patent
Selsam

(10) Patent No.: US 6,312,364 B1
(45) Date of Patent: Nov. 6, 2001

(54) BLOW-MOLDABLE WATER-FILLED FREEWEIGHTS

(75) Inventor: Douglas Spriggs Selsam, 8211 Michael Dr., Huntington Beach, CA (US) 92647

(73) Assignee: Douglas Spriggs Selsam, Fullerton, CA (US)

( * ) Notice: Subject to any disclaimer, the term of this patent is extended or adjusted under 35 U.S.C. 154(b) by 0 days.

(21) Appl. No.: 09/136,830

(22) Filed: Aug. 19, 1998

(51) Int. Cl.$^7$ .......................... A63B 21/072; A63B 27/04; B65D 21/032; B65D 23/10
(52) U.S. Cl. .......................... 482/93; 482/106; 482/107; 482/108; 482/52; 206/501; 206/509; 215/384; 215/308; 220/770; 220/771
(58) Field of Search ...................... 482/52, 93, 106–108; D21/600, 681; 215/328, 384; 206/509, 501, 511; 220/770, 771; D9/521, 533, 535

(56) References Cited

U.S. PATENT DOCUMENTS

| D. 244,628 | 6/1977 | Wright . |
| D. 244,629 | 6/1977 | Wright . |
| D. 267,737 | 1/1983 | Wright . |
| D. 271,407 | 11/1983 | Wright . |
| D. 274,283 | 6/1984 | Wright . |

(List continued on next page.)

FOREIGN PATENT DOCUMENTS

| 408000165A | 1/1996 | (JP) . |
| 8000165 | * 1/1996 | (JP) ............................. A63B/21/072 |

OTHER PUBLICATIONS

"Space–Weights" Poster 201 1980 Forrest Wright Color.
"Space–Weights" Page from Family Circle Magazine Oct. 4, 1983 (Page 61).
"Space–Weights" Special K Cereal Box Apr. 14, 1984 Photocopy.
Letter Reguarding "Space Weights" from Mar. 23, 1998. Forrest Wright.
Ad for "Water–Weights Boots and Bells" Hydro–Tone Fitness Systems, Inc. (1 Page).
Computer Renderings of The Invention in Various Embodiments—14 pages 81/2"×11".

Primary Examiner—John Mulcahy

(57) ABSTRACT

A blow-moldable container, having a centrally located, generally tubular handle spanning a central recess has improved balance and ergonomics over existing blow-molded containers. Such a balanced container has great utility as a handheld freeweight, or as a container for pourable substances. An integrally molded base allows our container to be stood upright on end like a regular bottle. Products may be marketed in such containers under the premise that the consumer automatically acquires a freeweight by purchasing the product. The inclusion of fitably engageable contours on its top and bottom surfaces makes such a container stackable with others of its kind, for ease of packaging, shipping, and storage. A graduated set of handheld fillable freeweights may thus be compactly stored without a special rack. Since blow-molding offers great economy of production for sufficiently large numbers of containers, the average person will now be able to afford an entire graduated set of freeweights. Such freeweights may be shipped empty, and filled with water by the consumer, slashing shipping costs, and thereby further reducing the cost to the consumer. Blow-moldable, two-handed freeweights (barbells) are also disclosed. These also may be provided with contours offering enhanced stackability. Voids to fitably engage a user's feet further add to their utility. A deck member, as well as base members, may be stackably combined with the freeweights to form a stepping platform for aerobics, or an exercise bench. Methods for attaching fillable auxiliary weights to our handheld freeweights are also shown.

32 Claims, 16 Drawing Sheets

U.S. PATENT DOCUMENTS

| | | | |
|---|---|---|---|
| D. 343,660 | * 1/1994 | Hwang | D21/197 |
| 660,962 | 10/1900 | Kennedy . | |
| 814,570 | 3/1906 | Stockdell . | |
| 1,019,584 | 3/1912 | Balston . | |
| 1,366,200 | 1/1921 | Matysek . | |
| 3,734,493 | 5/1973 | Hasekian . | |
| 4,029,312 | 6/1977 | Wright . | |
| 4,199,140 | 4/1980 | Feretti . | |
| 4,212,458 | 7/1980 | Bizilia . | |
| 4,570,808 | 2/1986 | Campbell . | |
| 4,575,074 | 3/1986 | Damratoski . | |
| 4,658,975 | * 4/1987 | Cone | 220/771 |
| 4,673,179 | 6/1987 | Pengler . | |
| 4,679,788 | 7/1987 | Adler . | |
| 4,722,523 | 2/1988 | Yang . | |
| 4,750,630 | 6/1988 | Campbell . | |
| 4,765,514 | 8/1988 | Berglund . | |
| 4,773,640 | 9/1988 | Kolbel et al. . | |
| 4,826,151 | 5/1989 | Nuredin . | |
| 4,854,575 | 8/1989 | Wilson et al. . | |
| 4,867,325 | 9/1989 | Dransfield . | |
| 4,913,422 | 4/1990 | Elmore et al. . | |
| 5,158,512 | 10/1992 | Irwin et al. . | |
| 5,207,338 | * 5/1993 | Sandhu | 215/11.1 |
| 5,318,489 | 6/1994 | Irwin . | |
| 5,320,231 | 6/1994 | Iodice . | |
| 5,379,909 | 1/1995 | Roark . | |
| 5,393,284 | 2/1995 | Wesley . | |
| 5,716,305 | 2/1998 | Selsam . | |

\* cited by examiner

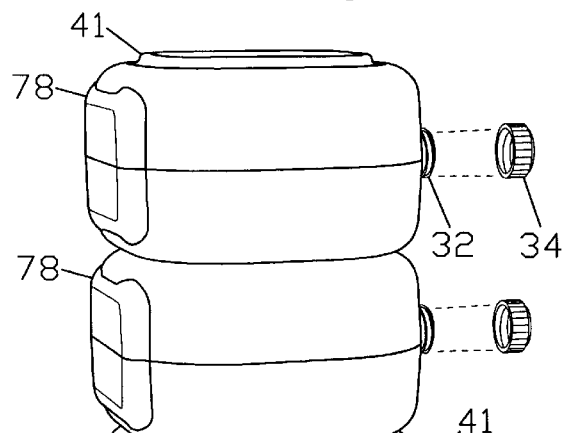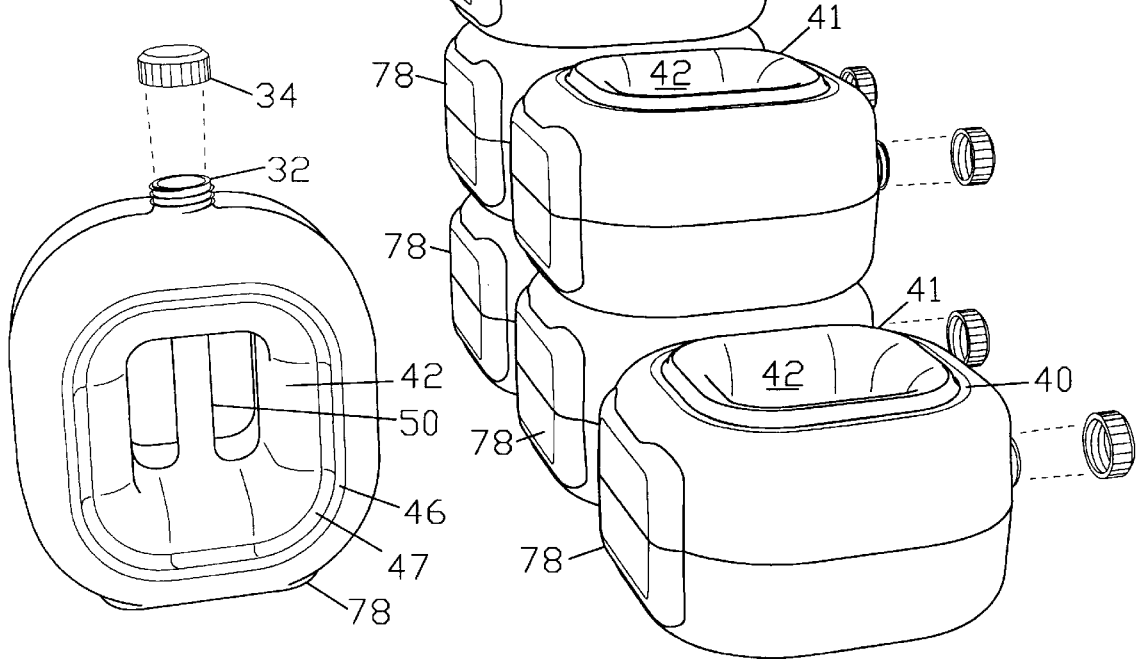

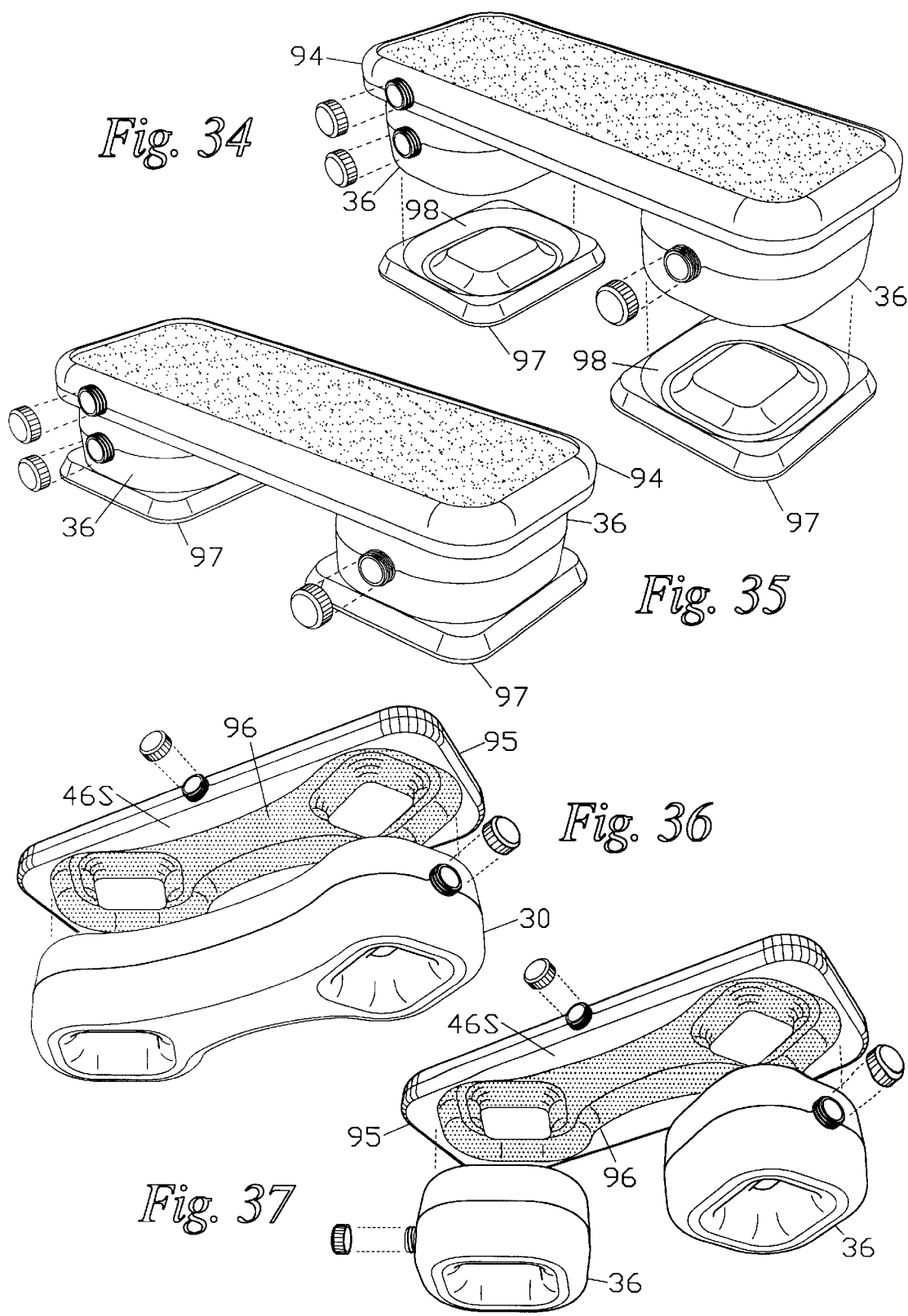

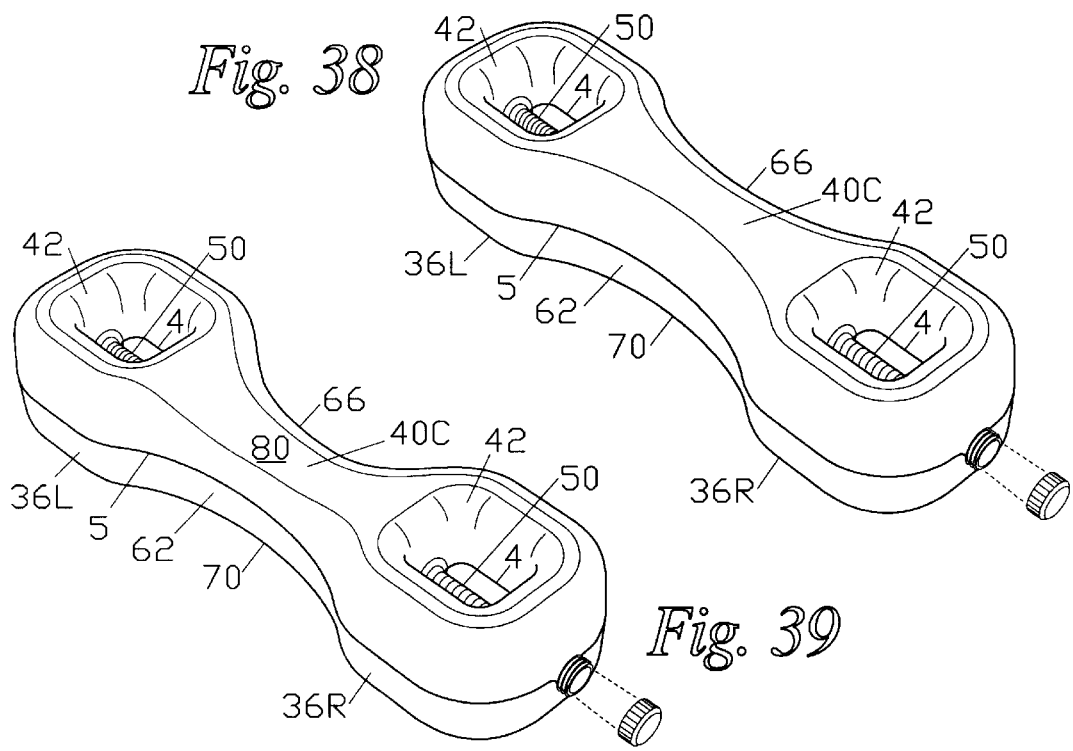
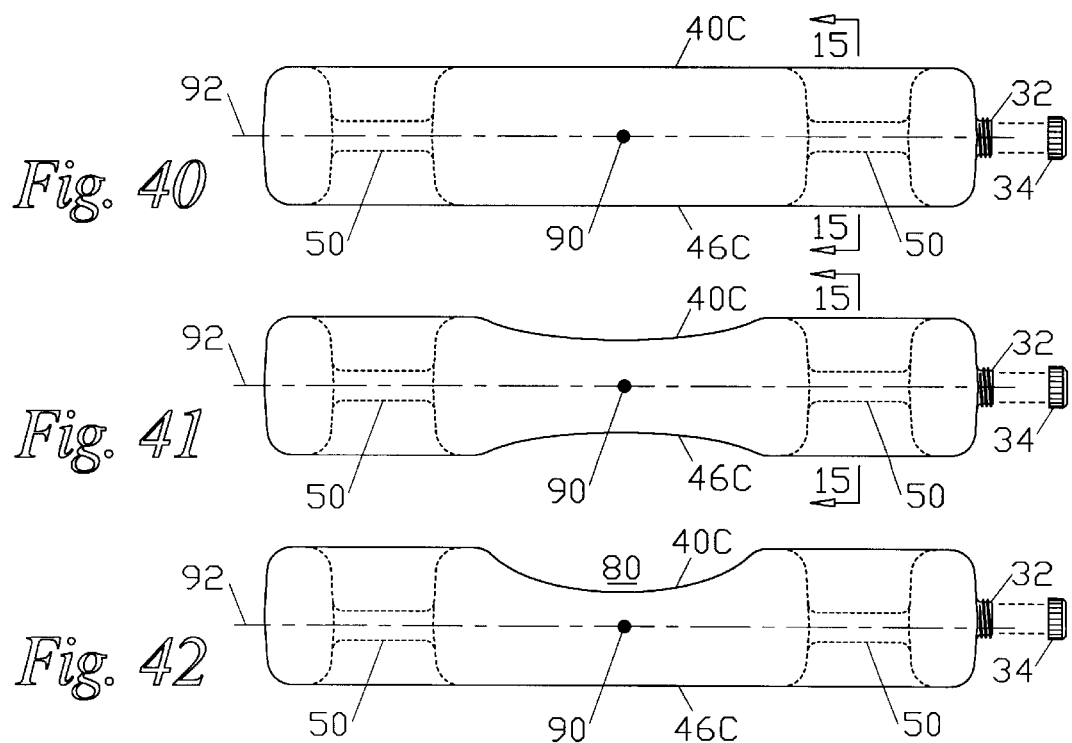

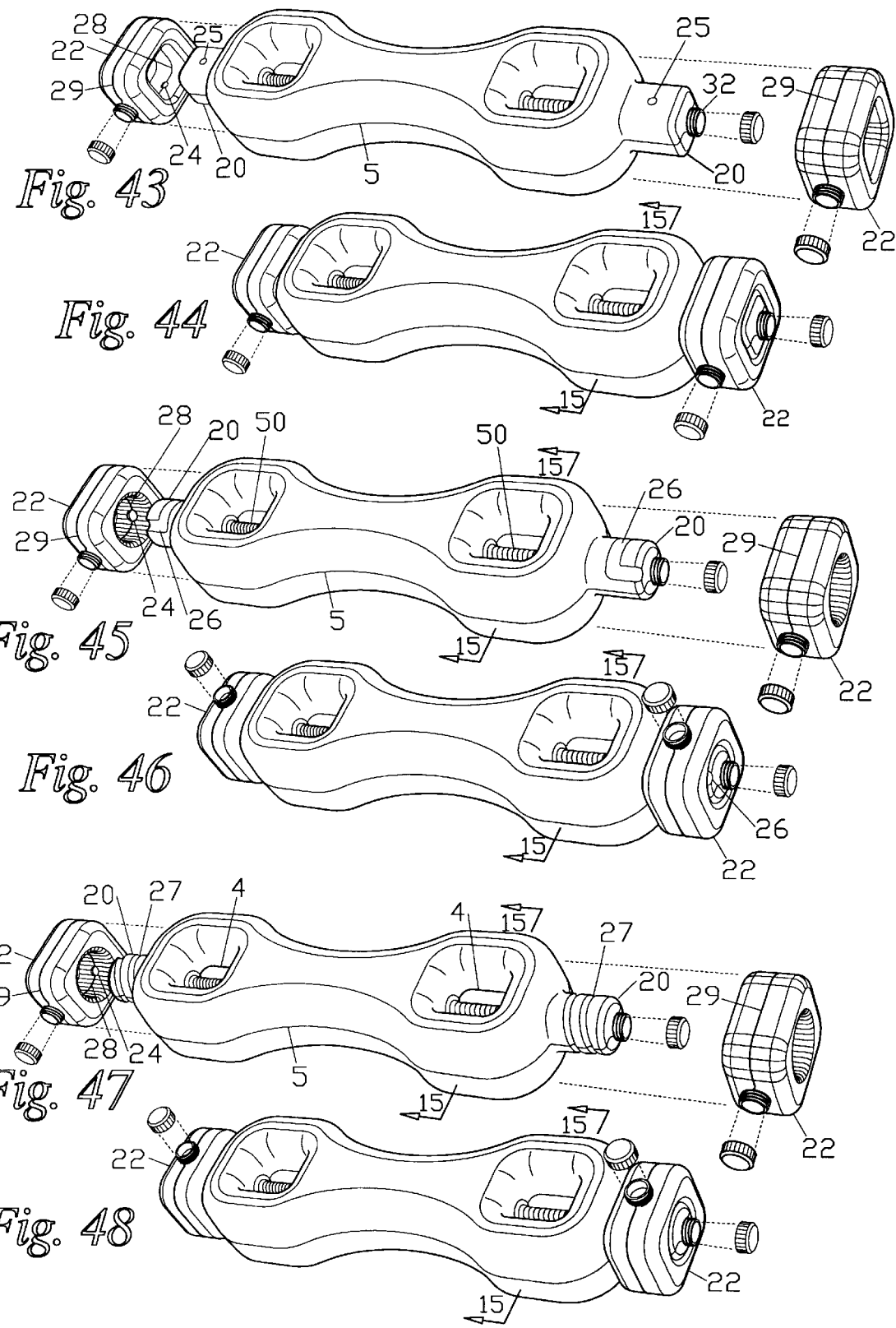

BLOW-MOLDABLE WATER-FILLED FREEWEIGHTS

BACKGROUND OF THE INVENTION

1. Field of the Invention

The present invention relates to exercising equipment, specifically to barbells and dumbells, more specifically to those designed to be filled with a ballast, such as water, by the user, and those facilitating other types of exercises, such as situps, pushups, and aerobic stepping routines.

2. Description of the Prior Art

It has long been recognized that one of the most effective methods for enhancing physical fitness is through the use of free weights, such as barbells and dumbells. Interestingly, the names for these devices came about when early foundries, a large part of whose business was making bells, would turn out a cracked or otherwise unsatisfactory bell. With the clapper removed, such a bell was silent, or "dumb", yet still had great utility as a weightlifting device. Thus the one-handed free-weight came to be called a "dumbell." Obviously two such bells attached to a bar became a "barbell". The basic requirements of a barbell or dumbell are simple enough: a substantial mass, or ballast, which may be easily gripped by one or both hands in a balanced, comfortable way, with a shape facilitating weightlifting exercises. And in the past, the traditional central iron bar served admirably as a rigid frame for the barbell, contributing to the overall weight, and providing a long, convenient handle. Since even the very name "barbell" would not exist without the "bar", it may be hard for us to imagine the real article without its cylindrical namesake precursor. But in fact if we re-examine the above characteristics which a barbell must have, (a substantial mass, or ballast, which can be easily gripped by both hands in a balanced, comfortable way, with a shape facilitating weightlifting exercises) the word "bar" does not appear. And so the venerable bar is in fact not part of the invention which I will set forth here, although this invention will still occasionally be referred to as a "barbell".

It is a well-established fact that one of the cheapest, most convenient, and universally available sources of ballast is water. Over the years many attempts have been made to utilize the weight of water in a barbell. These attempts have largely utilized water filled weights attached to the traditional bar. (See U.S. Pat. No. 1,019,584 to Balston) With today's technology, the most economical, durable, versatile, and convenient way to contain and attach a handle to a volume of water happens to be with a plastic container. While plastics have certainly been incorporated into many modern barbells, it's usually the same old timeworn design, disk shaped weights on cylindrical iron bar. Normally the weights are a cast concrete disk, with a thin plastic shell providing merely a cosmetic exterior and a short-lived insurance against complete disintegration when the concrete cracks. Even when molded plastic water-fillable containers were introduced as weights, they were still attached to the ubiquitous iron bar. (See U.S. Pat. No. 4,199,140 to Ferretti.)

This is understandable since barbells have been around for such a long time, basically a relic of the iron age, and a mature technology with its reliance on a central cylindrical iron bar was in place long before the era of modem plastics. Barbells have achieved a certain traditional status, becoming in fact, an icon for the whole idea of weightlifting. The very maturity of this technology, however, is now what is holding it back; When an old technology works well enough, little need is seen for change. But times have changed, and materials have changed, and the new materials have different physical properties than the old, requiring new approaches to the design and engineering of products. Would you go out and buy a gallon of milk in a glass bottle, when a lighter, safer, easier to carry plastic alternative is available? How about a metal gasoline can, when a plastic one that won't rust, or bang around in your trunk is on the shelf next to it? Even the permanent gas tank on your car is probably plastic, because it's strong, durable, and economical.

Surely if plastics are such a versatile and durable material for containing and carrying liquids, and water is such a universally available source of ballast, a way to combine the two in the design of a modem barbell can be found. There are several methods of molding plastic into the shape of a closable container, including vacuum forming, injection molding, blow molding, and rotational molding. For our purposes, producing a large one-piece plastic container with a narrow threaded neck, the latter two show the most promise:

Rotational molding would offer the greatest design freedom. Using this process, virtually any shape or size of hollow plastic container can be formed, as long as the mold can be separated from the finished part. A threaded spout, or neck, can be easily formed into a part as long as it is exactly centered on the parting line, with its longitudinal axis perpendicular to the direction in which the two halves of the mold open and close. The finished parts are strong, thick walled, and durable. And the mold itself is not overly expensive to produce. If we could design the product, rotational molding could undoubtedly be used to produce a closable container, which when filled with water, would have a substantial mass, or ballast, easily gripped by one or both hands in a balanced, comfortable way, with a shape facilitating weightlifting exercises. But rotational molding is slow, requiring extended heating and cooling periods and large, cumbersome machinery to rotate many molds at a time. Why so many molds? Because each one can only turn out a few parts per day, due to the long cycle time. For these reasons rotational molding is used mainly to turn out short runs of large, heavy-duty products such as kayaks and children's swimming pools.

If we only needed a few hundred, or even a few thousand of this newly designed barbell, rotational molding might well be the way to go. But in this case we have to think bigger. The health and fitness movement has taken the world by storm, with just about everyone aware of the importance of exercise to good health. A truly revolutionary new product for the fitness market might easily sell into the millions of units. Of all the techniques for forming durable plastic containers in numbers of this magnitude, by far the most economical is blow molding. This is the technique whereby almost all modern plastic jugs and bottles are made. Even though the mold itself is very expensive, requiring special liquid-cooling channels, blow molding is fast, with a single mold able to turn out thousands of parts per day. It is well suited to our application, since a threaded spout, or neck can be handily formed into a blow-molded part. (provided that, as with rotational molding, such a threaded spout is exactly centered on the parting line, with its longitudinal axis perpendicular to the direction in which the two halves of the mold open and close.) If an ergonomic water-fillable barbell can be designed which can be efficiently produced by the technique of blow molding, it will be possible for almost anyone to personally own a complete set of barbells and dumbells having different weights, which in the past may have been cost-prohibitive. (Having a complete graduated set of freeweights is what commercial gyms and professional bodybuilders prefer; The convenience of being able to choose a barbell or dumbell of a given weight and begin using it immediately, without the delay of having to add or subtract plates, is important for continuity in a workout.) Blow molding offers economy of production, and great design freedom, but also has some constraints, which we will discuss, not found in other molding applications. Overcoming those constraints will turn a good idea into a great idea.

During the development of this invention, in concentrating upon the balance, ergonomics and manufacturability of a blow-moldable container for weightlifting, the concepts discovered and put forth herein actually offer an improved blow-moldable container in general:

1.) Typically, blow-molded containers with integrally molded handles have those handles located at the periphery of the structure as a whole, centered on the parting line, sometimes on top, or more usually to one side, near the top. In the latter case, when such a bottle is full and therefore at its heaviest, when held level in one hand, that hand, as well as the handle, must withstand gravitationally induced torsional stresses. Consider, for example, a typical gallon plastic milk jug, with its handle located to one side near the top. When held by the handle, such a jug will tend, due to gravity, to rotate to a position where its center of gravity is located below the handle. This tilted position is good for pouring. When pouring is not desired, however, such a container must be held upright, or the contents will spill. In order for the jug not to rotate to a position where its center of gravity is located below the handle, a torque must be applied to the container by the hand. The plastic comprising the handle and its surrounding regions must be thick enough to withstand this torque. Thicker material translates to higher manufacturing costs. From the user's point of view, counteracting this torque may result in a momentary inconvenience to most people, but may be painful or difficult for someone with, for example, arthritis. Often a second hand must be utilized to more easily carry such an unbalanced container. Our new design will locate the handle in the center of the container, where minimal gravitational torques will act upon it. In such a configuration, the container may be held upright or poured with equal ease, using only one hand. The addition of a flat area, or base, opposite the filling nozzle, would allow such a bottle to be stood upright without spillage when open.

Another example of prior art would be, for example, a blow-molded 5-gallon jug with the handle located on top. The combined center of gravity of the container and its contents is located directly below the handle, so the container is easy enough to carry with one hand. Pouring, however, requires two hands: one holding the handle and another to tip it from behind. Our improved design will allow both carrying and pouring with one-handed ease. With the handle located at the center of the container, the container may be easily rotated to any position whether empty, full or anywhere in between; if it is half-full, for instance, liquid contents will flow to lowest point whatever the orientation. In all orientations, this location of the contents will be approximately centered below the handle, since the handle is at the center, rather than the periphery, of the container.

2.) Blow-molded plastic containers in general are designed to have their walls as thin as possible, since when less material is used, the product is more economical to produce. While thin walls are desirable from an economic standpoint, a thin walled container may suffer from inadequate rigidity, and be unable to hold its shape, especially when filled with a hot liquid, as is often the case in bottling operations for foodstuffs. Many blow-molded bottles therefore incorporate strengthening ribs, webs, grooves, or other contours to enhance the stiffness of their walls. In our improved design, a central recess, or aperture, spanned by the handle, fully penetrates the container from one side to an opposing side. The walls of this central recess constitute a physical communication between the central regions of these two opposing sides of the container. This communication in turn prevents these sides from bulging outward from the pressure exerted by the contents. Since these two opposing sides will also have the largest surface area of any pair of opposing sides, this represents a real enhancement in strength, and will stabilize the shape of a container which might otherwise severely bulge when filled, especially with a hot liquid. The handle, spanning the central recess, further serves to unify the structure of the container.

Relatively soft and pliable plastics, such as HDPE (High Density Polyethylene) or polypropylene, are known for their impact resistance and tough durability, as well as for their ability to be blow-molded or rotationally molded. They are the types of materials normally utilized in milk bottles, fuel tanks, playground equipment for toddlers, jugs for orange juice or detergent, etc. While tough and resilient, neither their tensile strength nor their stiffness even approaches those of iron or steel. Our design should make efficient use of the limited strength offered by plastics of this type. In addition, all voids and recesses should be provided with sufficient draft angles, relative to the direction in which the mold opens and closes, to allow the finished part to be removed from the mold.

Summarizing so far, what is needed is a general design for a closable plastic container, which when filled with water, would have a substantial mass, or ballast, be easily gripped by one or both hands in a balanced, comfortable way, and have a shape facilitating weightlifting exercises. If the product can then be optimized for being produced by the technique of blow molding, that will facilitate economical mass production into the millions of units, and allow the average user to economically afford an entire set of barbells and/or dumbells having graduated weights. Once optimized for balance, ergonomics, and blow-moldability, the design will have certain advantages over existing blow-molded containers, as a container, beyond the scope of weightlifting.

Having developed a new type of barbell, as long as we are exercising anyway, let's look at what other exercises this new structure might also facilitate. What about abs? Curved tubular metal frames to guide and assist the motion of situps, the so-called "ab-roller" type of devices have proven extremely popular. In fact, since their recent introduction, literally billions of dollars worth of such devices to exercise the abdominal muscles have been sold. It seems that there is practically nobody who doesn't feel that their midriff could use a little work. Clearly, if we can find a way to make our product particularly useful for the performance of say, situps, we will have a much more useful and desirable product on our hands. And how about stair-stepping platforms? These simple elevated surfaces are now used in most aerobics classes because as simple as they are, they really work. Stepping aerobics are extremely popular, especially with women, who are often looking to maintain good tone, cardiovascular health, and slimness, rather than to "bulk up." So if our product could also function well in a capacity facilitating stepping aerobics, it would have great utility to that many more people, making it more likely that an entire family can enjoy it. And let's not forget the chest. Pushups are great for the chest muscles, as well as the lats, so if our product could somehow enhance the performance of pushups too, that would make it just about like having a complete gym in a bottle!

In U.S. Pat. No. 5,716,305 I do in fact show how to integrate situp, pushup, and stair-stepping functions into a fillable barbell designed to be produced from a two-piece mold. In the present manuscript I will disclose a new fillable design for both barbells and dumbells, further optimized specifically for being blow-molded. I will also teach how to integrate the situp, pushup, and stair-stepping functions of my previous design into a barbell of this new design.

There are other areas in the present invention where improvements have been made upon the concepts disclosed in this previous patent (U.S. Pat. No. 5,716,305). The first concerns further optimization of the design specifically for being produced by the process of blow-molding: In my earlier design, if a model had angled handles, the inner region of the recess, or apertures, containing each handle was also angled. The exterior of the unit in the regions surrounding the handles, on the other hand, may have been enlarged for clearance but was not necessarily angled similarly to the handles. In heavier and therefore thicker models such a difference in angle between the inner recesses and the exterior could result in certain areas having an undesirably high blow ratio (a term which will be explained soon). After much consideration a solution has been found which also enhances the ergonomics as well as the appearance of the product. This solution will be disclosed in the description of the new design for an improved barbell, optimized for blow-molding, as put forth herein.

Many of the general principles learned during the development of the two handed barbell have also been applied to a design for new type of one handed barbell, or dumbell, which will also be disclosed herein.

Another aspect of the previous design concerning the blow ratio as well as ergonomics and user comfort is that of the spacing of the handles and the foot insertion voids; In heavier, and therefore thicker models, for the foot insertion voids to be a comfortable distance apart, then for the regions separating these foot insertion voids from the handle recesses which straddle them to be wide enough in relation to their depth to have a proper blow ratio, the handles could end up being separated by more than we would really prefer for providing absolute best comfort to the most users. An elegant solution has been found, which will also be disclosed in this document.

One more area of improvement on my previous design concerns its function as a stair-stepping device for aerobics. An increased front-to-rear "footprint", or stance of the unit itself where it contacts the floor, to combat inadvertent rollover, including the use of auxiliary base members, as well as a detachable deck, for increased strength and traction, would enhance the utility of the device and will be disclosed herein.

Traditionally, an entire graduated set of freeweights requires either a lot of room or a rack for storage. Alternatively, an entire, graduated set of our affordable barbells and/or dumbells, each scaled (sized) so as to have a different weight when full, might advantageously be provided with contour means for fitably stacking together, for ease in packaging, shipping, and storage. Such stackability would also enhance the desirability of our product, especially the one handed (dumbell) version as a general means of packaging for pourable materials.

Notwithstanding the ease with which an entire graduated set of our new barbell might be manufactured, versions of our new, blow-moldable barbell wherein the weight can be selectively increased by the attachment of auxiliary weights, as with traditional barbells, may still be seen as desirable. If a way can be found to achieve this, within the constraints of the limited strength of our materials, and the fact that our product must be separable from a two-piece mold, it would be a notable improvement. Three related methods of achieving this selective weight-increasing feature will be disclosed herein.

Following is a discussion of the ideas revealed in some related patents:

U.S. Pat. No. 660,962, issued at the turn of the century to Kennedy shows an "Indian club" convertible to a "dumb bell" by the reverse insertion of a cylindrical threaded handle. This design is notable from the standpoint of the current invention as it exemplifies the maturity of the basic idea of a dumbell having a handle which spans a central recess.

U.S. Pat. No. 814,570 to Stockdell illustrates a grip for a dumbell, having an elongated, noncircular cross-section.

U.S. Pat. No. 1,019,584 to Balston discloses a rigid barbell or dumbell having fillable end sections threadably attached to a connecting bar. This early embodiment of the concept of a fillable barbell had utility limited to that of traditional barbells and dumbells, and was not useful for situps, leg lifts, pushups, or as a stepping type of device. The device had multiple sections including a separate, conventional bar and therefore could not be manufactured as a single unit. The conventional bar had inherently high shipping weight.

U.S. Pat. No. 1,366,200 to Matysek discloses fillable dumbells, attachable to a bar to constitute a barbell. This device is designed to be gripped by the hands only, and is not useful for situps, leg lifts, pushups, or as a stepping type of device. This device also had multiple sections including a separate, conventional bar and therefore could not be manufactured as a single unit. Here again, the conventional bar has an inherently high shipping weight.

U.S. Pat. No. 3,734,493 to Hasekian discloses a molded, one-piece dumbell incorporating an integral platform with restraining straps for the feet. While useful for both traditional dumbell exercises, and for situps and leg extensions, this device is not useful as a barbell, as a stepping type of device, or for pushups, and is not specified as fillable by the end user, so is expensive to manufacture and ship.

U.S. Design Pat. No. D244,628 issued Jun. 7, 1977 to Wright claims "The ornamental design for a dumbell as shown" with no mention of it being hollow or fillable, no ballast nor means for the introduction of such into the dumbell shown, described, or otherwise indicated. This design patent shows a dumbell matching the barbell of U.S. Design Pat. No. D244,629 issued the same day. Since these two design patents are so similar, to avoid redundancy the reader is asked to please apply the discussion of D244,629 below to this design patent as well.

U.S. Design Pat. No. D244,629 issued Jun. 7, 1977 to Wright shows a pair of apparently solid (with the exception of an axial bore to receive a bar) dumbells mounted on a bar. Since this patent claims "The ornamental design for a barbell, as shown", and does not show or describe the device as hollow, fillable with a ballast, or having a means for the introduction of such, I will not address it from that standpoint other than to say that it is so similar in appearance to the device in U.S. Pat. No. 4,029,312 issued to the same inventor exactly one week later, that the discussion of that patent which follows should suffice to describe any related issues which the reader may ascribe to this patent. Since the two patents even seem to share some artwork, I will mention that in a comparison of the multiple views shown in this one, the tall, thin regions which run alongside the handles (corresponding to those which Wright calls "peripheral side passages" in U.S. Pat. No. 4,029,312) measure out as being almost 4 times as tall as they are wide, making them non-blowmoldable if they were hollow.

U.S. Pat. No. 4,029,312 issued Jun. 14, 1977 to Wright discloses a pair of fillable dumbells which can be telescopically mounted on a rigid bar to constitute a barbell. Apertures located in the center of each dumbell provide access by either hands or feet without requiring attachments or alterations, providing convenient versatility. These dumbells are relatively lightweight when empty, and therefore this combination is less expensive to ship than conventional weights.

Disadvantages of this combination are that it incorporates a conventional bar, which does not lend itself to being formed by the same molding process as the dumbells, and that it is composed of three main parts, and so in any case cannot be molded as a single unit. The conventional straight bar has inherently high shipping weight. Also, the handles must be oriented coaxially with the bar, to telescopically receive the bar, while it is generally recognized that handles oriented at an angle to the longitudinal axis of a barbell are more comfortable for many exercises. In addition, the handles by default have a constant circular cross section, so they can telescopically receive the bar, while handles having a non-circular and/or non-constant cross-section have proven superior in many applications. The assembly has axial symmetry to the extent that it may roll away accidentally. The two sealable closure means, each consisting of a "material-receiving opening" and a "plug member", appear too small for easy filling without using a funnel, and in any case are quite archaic in nature, with the plug liable to accidentally fall out, or be pushed in, and get lost.

In fact, the whole concept of "a fillable barbell in which the weight can be varied by selectively increasing or decreasing the amount of ballast therein" being more convenient than the traditional approach where multiple weights can be selectively added or subtracted from a bar seems questionable: Where is the convenience, in the middle of a workout routine, of having to remove two plugs, then have a receptacle or faucet close at hand to provide a source for pourable ballast, and a sink, drain, or receptacle to dispose of unwanted ballast, in order to carefully measure and pour a specific amount into each dumbell, possibly needing a funnel, reseal them, then clean up any spillage which might have ensued? And what happens to the balance and usability of a dumbell or barbell which is, say, halfway full of a pourable, flowing ballast substance, free to slosh around inside, when such a device is tilted so that one side of each chamber is completely full and the other is completely empty? It seems that a better design, to fully take advantage of the cheaply abundant nature of water as a ballast, would be one where each barbell may be produced so inexpensively that a user could afford a whole set of them, each formed to have a different weight when full. To be able to fill each barbell through a single filling aperture, rather than two, would certainly be an additional convenience.

When reading about my present invention, one might be tempted to ascribe certain features of it to Wright's models, due to a similar "look". For example, the recesses, or apertures, which contain the handles in my invention fully penetrate the structure from one side to the other, with the handles spanning their narrowest middle regions, for reasons of moldability; By having our parting line follow the widest part of the handle and the narrowest section of the recess, and making the recesses flare outward in each direction from narrow middle region spanned by the handle, with proper draft angles for easy mold separation, we are providing a way for a two piece mold to close then open around the handle, and finally release the finished part. Wright on the other hand, is careful to specify (starting halfway down column 6 in U.S. Pat. No. 4,029,312) that "the central aperture 31 may be a recess rather than an opening all the way through the central portion of the weight 21." (Notice he is using the word "recess" differently from me.) He goes on to explain that having "an aperture entirely through the body of the shell is desired for symmetrical distribution of the mass." (not so it could provided with proper draft angles to be produced by a two-piece mold.) Note that if one of Wright's "central apertures" were "a recess rather than opening all the way through," as he states they could be, his barbell could definitely not be produced from a two-piece mold by thatfact alone. Referring to FIGS. 8 and 9 of this same U.S. Pat. No. 4,029,312, the walls of the "aperture" appear exactly parallel, with no attempt made to show any accommodation for draft angle requirements. An adequate draft angle would be especially important near such an interior parting line, as the cooling part will tend to shrink to it, rather than away from it. Since Wright never mentions specific molding processes, parting lines, draft angles, etc. we must consider his inventions, while somewhat similar in appearance to mine, as the far different sort of concept that they actually are.

While it may seem at first glance that the egg-shaped dumbells of this design could easily have been produced by blow-molding or rotational molding, actually, due to fact that the tubular "axial bore or channel" which telescopically receives the bar extends unbroken from one end of the generally spherical shell to the other, and the "central aperture" (which contains and is spanned by the handle) likewise fully penetrates the shell, but in a direction exactly perpendicular to the "axial bore or channel", it is geometrically impossible to produce a dumbell of this general type from a two-piece mold.

Additionally, if the long "axial bore or channel" is of constant diameter, which one would assume it is for it to "telescopically receive" a bar, then due to this feature alone it would be inseparable from a two-piece mold due to a lack of proper draft angles. While in his second claim, Wright makes reference to his "shell and said cylindrical element (handle) comprising a single unitary piece of molded plastic material", he in fact shows us a design which could not be cast in one piece by any conventional molding process. (In fact, this design was never actually manufactured, according to Wright, because of moldability problems having to do with the inclusion of this "axial bore or channel." It is worth noting that the one weightlifting product of Wright's design which was conmmercially developed, fillable dumbells sold under the name "Space-Weights", while not incorporating such an "axial bore or channel" were nevertheless produced by injection molding them in two halves, then gluing the halves together. None of Wright's designs was blow-molded, nor put forth as being blow-moldable.)

Further, if the design had been meant to be a fillable container produced from a two-piece mold, it could advantageously have incorporated a closable filling neck, as long as such a neck were centered on the parting line, with its longitudinal axis perpendicular to the direction in which the mold opens and closes. Such a neck could be shaped to accept a snap-on cap, but like the "plug means" cited in Wright's barbell, a snap-on cap must either be inconveniently small, or possibly be subject to accidental opening and/or loss, with this risk rising as the diameter of the cap or plug increases, since a larger closure will have a higher surface area-to-circumference ratio. More optimally, a closable container meant to be produced from a two piece mold can be provided with a threaded neck and a matching screw-on cap. A screw-on cap, regardless of size, is known to provide a tight, reclosable seal that is unlikely to accidently come off from a momentary or transient surge in ballast pressure the way a cork or snap-on cap might. Since Wright's material-receiving opening is located ninety degrees from any reasonable mold separation line, it is most certainly not designed to take advantage of the types of filling means made possible by two-piece molding techniques.

Another good reason that this design was not well suited for being produced by the technique of blow-molding, and certainly had not been optimized for it, has to do with the "blow-ratio": The cross section of this barbell taken at the handle shows that the narrow portions of the unit which run alongside the handles (which Wright calls "peripheral side passages") have a height-to-width ratio of about four. A common rule of thumb in the art of blow molding plastics is that unless absolutely necessary, the height-to-width ratio (called a blow ratio) of a finished part be no greater than about two. This is because the starting material, a hot extruded plastic tube (called a "parison"), has to stretch like a balloon when injected with pressurized air to fill each half of the mold, with its walls becoming thinner in the process. When any region of the mold has an unusually high blow ratio, (greater than about two) the entire parison must be made prohibitively thicker to compensate, resulting in undesirably high material usage, higher shipping weight, longer cooling times, and decreased production efficiency. These narrow portions in Wright's design could easily have been made wider if the inside surfaces facing the handles were simply aligned with the handles, rather than so severely arcing out away from them, which they do to allow the insertion of a user's foot. Because of this undesirably high blow ratio, we can infer that this fillable barbell was not meant to be blow-molded. (Note: Within the industry, there are two generally accepted definitions of the term "blow-ratio". One meaning refers to only half of the mold at a time, and is similar to the "draw" ratio of vacuum-forming. In that case the generally accepted maximum value is unity (1). Our use of the term in this document will always refer to the entire mold (both halves), or finished part, and so has a maximum value of two (2).)

To conclude then, the device of U.S. Pat. No. 4,029,312 to Wright is not a properly designed to be blow-molded, rotationally molded, or even produced as a single unit by any conventional molding process. The combination of its geometric non-moldability, a "material-receiving opening" obviously not located on a mold separation line, nor being provided with a threaded or snap-on neck and cap, as is a standard practice in the production of hollow molded plastic containers, as well as regions having an excessive blow-ratio make it obvious that Wright never seriously considered blow-molding or rotational molding as a means of production when designing this barbell. One underlying concept of Wright's design, to have a fillable barbell in which the weight can be selectively varied by adding or subtracting ballast, is fundamentally different from the concept which will be disclosed here, which is a design for a fillable barbell which, in sufficient numbers (to cover the rather steep initial tooling costs), is so inexpensive to manufacture that virtually anyone will be able to afford an entire graduated set of barbells, each having a different weight when completely full.

While noteworthy for its elegance and novelty, Wright's invention is not useful for pushups, and lacks utility as an aerobic stepping type of device. Larger filling apertures, to speed the filling process, and more positive closure means for such larger apertures, and/or reduction to a single aperture and closure, handles disposed at an angle and having a non-constant elliptical cross-section, as well as elimination of the conventional bar, discarding the unnecessary axial symmetry so it won't roll, and making the combination blow-moldable, would all be desirable improvements.

U.S. Design Pat. No. D267,737 Jan. 25, 1983 to Wright illustrates a smoothed barbell reminiscent of his earlier design (U.S. Pat. No. 4,029,312 Jun. 14, 1977, discussed above) for its reliance on the general form dictated by a central rigid cylindrical bar, onto each end of which two ovoid dumbells are telescopically fitted. Although this hollow barbell design appears as if it could possibly be fashioned as a one-piece unit, there is no means shown for a user to access the interior for adding ballast. Also, no ballast material is illustrated within the thick-walled, hollow shell. Since in this design patent, no "material-receiving opening" nor a "plug member" such as those which Wright shows in U.S. Pat. No. 4,029,312, nor any ballast material, are illustrated, described, or otherwise disclosed, we might conclude that this design patent does not show a barbell which is fillable by the user, but instead one which is meant to be used in its hollow state, as is, for example the exercise device in U.S. Pat. No. 4,673,179 to Pengler. (In Pengler's device, discussed below, a thick-walled empty structure with handles, while hollow, derives its mass not from any contained ballast, but from the density of its constituent materials, cited as "for example, a ceramic, a concrete aggregate, or other dense substance, even including metals such as aluminum and otherwise." The hollowness is actually to make it lighter, not heavier.) Further, if Wright's design were meant to be a fillable container produced from a two-piece mold, we might expect that it would advantageously incorporate a filling neck, possibly threaded, since the inclusion of such a neck is possible for blow-molded or rotationally molded containers for liquid, providing it can be located where it is centered on the parting line, with its longitudinal axis perpendicular to the direction in which the mold opens and closes.

Though this design patent illustrates an ornamental design for a "barbell" without the separate iron bar, the design itself still incorporates many vestigial features associated with a traditional barbell:

a.) The exterior shape of the unit as a whole has general rotational symmetry about a central longitudinal axis. This is a holdover from the time-worn concept of a cylindrical bar with attachable disk shaped weights. The design is unnecessarily constrained by this needless axial symmetry, as if it had been turned on a lathe, with such axial symmetry making the barbell prone to accidentally rolling.

b.) The design incorporates a generally tubular midsection having a circular cross section. While a cross section of virtually any shape might be possible or desirable, Wright chose to follow the traditional form suggested by a central cylindrical bar here.

c.) The handles are not only located on, but are coaxial with a central longitudinal axis. This is another carry-over from the traditional concept of a barbell, where a single cylindrical bar served as both a structural frame for the assembled unit and as handle means. It is also reminiscent of Wright's earlier design, where two ovoid dumbells telescopically fit onto a traditional cylindrical bar. In that case, the handles slid over the bar, so the bar was constrained to be straight, and the handles were constrained to be coaxial with it. By eliminating a central bar, Wright had complete freedom to orient the handles at any angle, but did not explore that route.

d.) The handles have a constant, circular cross-section, like a conventional bar, as opposed to an elliptical, and/or non-constant cross-section, as might be more desirable.

This design also is not optimized for being produced by the technique of blow molding. (According to Wright, the only weightlifting product of his design ever sold commercially, fillable dumbells called "Space-Weights", were produced by separately injection molding two halves, then gluing the two halves together to form one "Space-Weight".) The cross section of this barbell (FIG. 6, Des. 267,737 to Wright) taken at the handle shows that the narrow portions of the unit which run alongside the handles have a height-to-width ratio of about four. A common rule of thumb in the art of blow molding plastic is that unless absolutely necessary, the height-to-width ratio (called a blow-ratio) of a finished part be no greater than about two. This is because the starting material, a hot extruded plastic tube (called a "parison"), has to stretch like a balloon when injected with pressurized air to fill each half of the mold, with its walls becoming thinner in the process. When any region of the mold has an unusually high blow ratio, (greater than about two) the entire parison must be made thicker to compensate, resulting in undesirably high material usage, higher shipping weight, longer cooling times, and decreased production efficiency. These narrow portions in Wright's design, like those disclosed in U.S. Pat. No. 4,029,312, could easily have been made wider if the inside surfaces facing the handles were simply aligned with the handles, rather than so severely arcing out away from them, which they do to allow the insertion of a user's foot.

Because of this undesirably high blow ratio, and the lack of a spout or neck located on the mold separation line, as well as the fact that Wright does not mention blow-molding or, for that matter, even rotational molding or any other specific molding process in any of his barbell patents, we can assume that this design for a hollow barbell was not meant to be blow molded. Prototype molds for a similar device of Wright's are in fact injection molds, made of fiberglass, each intended to produce one half of the device. The two halves were to be glued together to form the final product.

Because the device illustrated lacks any apparent means for introducing or removing ballast, i.e. a hole, or for that matter, closure means, and does not in fact show any ballast present in the cross sectional views, we can infer that this is not a design for a fillable barbell. In fact, in the claim it is designated only as "The ornamental design for a barbell, as shown", with no mention of it being fillable.

U.S. Design Pat. No. D271,407 issued Nov. 12, 1983 to Wright claiming "The ornamental design for a dumbell, as shown" makes no reference, written, drawn, or otherwise inferred to it being hollow, molded, or fillable, with no opening or closure shown. Nonetheless, since it is yet another design of Wright's, let us address it from the standpoint of a blowmolder and point out that, from measurements of the illustrations shown, the discus-shaped members would have a blow ratio of 3.5:1, which is unacceptable, and made more so by the extremely sharp edges of their periphery.

U.S. Design Pat. No. D274,283 issued Jun. 12, 1984 to Wright again claiming only an ornamental design, not indicated as being hollow or fillable, nonetheless when measured and examined from a blow molding perspective, yields a blow ratio of three, effectively ruling out the process of blow-molding for the production of this otherwise simple and elegant design. Again, while this attractive device is clearly illustrated from all sides, the definite lack of any visible means for the introduction of ballast, the lack of any illustration or mention of any such ballast, or indeed any indication that this represents a hollow structure of any kind, would lead an unbiased reader to surmise that this ring-shaped hand-weight was to be fashioned of solid metal, plastic, a cementitious aggregate, or some combination of such conventional materials. Obviously, as claimed, the design is more ornamental than functional, since torques about the axis of the handle could be reduced by sacrificing the main circular shape, bringing the sections transverse to the handle closer to the handle. Such torques could also be more easily controlled if the handle were to have an elliptical, or other non-circular cross section. Also, judging the scale from the thickness of the handle, engagement with a user's hand could be improved by a more substantial flaring at the ends of the handle, and by allowing the ring to remain straight in the area where the handle attaches to it, so that a hand would not be "pinched" by the premature curve of the ring if the handle were gripped at one end. Certainly such increased flaring at the ends of the handle would enhance the strength of the interface between the handle and the ring. Of course if the structure were of solid iron, for instance, with the handle welded across the ring, we would expect a welding bead about the size of the minimal fillet shown at the seam between the two, and that abrupt transition would be O.K. because solid iron has ample material strength. If, on the other hand, the structure were meant to be a hollow molded plastic container, we would expect a much smoother transition (more pronounced flare) between the handle and the ring, so as to maximize the limited strength of the thin-walled, much softer material. A decision to try to blow-mold such a design would especially favor such increased flaring, and weigh against having the sharp corners illustrated, as such discontinuities can cause wrinkles and thin areas in the parison as it expands. To conclude, while there is no indication that this design was meant as a hollow, closable container, many serious factors, including an excessive blow-ratio and sharp edges, would militate against trying to produce a dumbell having an ornamental shape such as this by the technique of blow-molding.

U.S. Pat. No. 4,212,458 to Bizilia discloses one example of the many devices designed to anchor the feet of a user during the performance of situps, by attachment to the underside of a door. While useful for this designated purpose, it lacks utility for other types of exercises. This is an example of the proven desirability of being able to hold the feet down for the enhanced performance of situps.

U.S. Pat. No. 4,575,074 to Damratoski discloses a one piece molded fillable dumbell which may be used as either a hand or foot weight. This design for a lightweight dumbell is notable in that it seeks to minimize torque on the hand by having the contained ballast surround the hand instead of being concentrated at each end of a handle. Oddly, this device is restricted in its claims to having a handle which is off center. Damratoski goes into great detail regarding the exact measurements of his preferred embodiment, for example specifying that he has "found it preferable to make the handgrip 18 approximately 5⅓ inch (13.34 cm.) long" (yes, you did read "approximately 5⅓ inch"), further stating that he has "found that these dimensions will comfortably accommodate the hands of most users." One gets the feeling from reading this patent that he has gone to great lengths to try many shapes and sizes of handles, finally deciding on one with a rectangular cross section ¾ inch wide by 1⅛ inch deep. In any case we aren't given any information about what types of materials this invention is to be made from or how it is to be manufactured.

One thing is for sure, and that is that this dumbell could not be blow molded. Like Wright's models, discussed above, it exceeds our maximum permitted blow ratio of 2; Stating that he has "found that a weight of the type described herein will be suitable for use by the average person if the edge walls 26 and 28 are spaced 3 inches (7.62 cm.) apart," then going on to specify that "the distance from each flat segment of outer wall 22 to the corresponding segment of the inner wall 24 is 1⅛ inch," Damratoski is giving us a prescription for disaster for anyone trying to blow mold such a shape. Taking a cross section of this hypothetical dumbell and dividing its depth of three inches by its width of 1⅛ inch, we have a blow ratio of 2.667, which is way above what the industry is capable of. As previously discussed, a total depth to width, or "blow" ratio of about 2 is generally considered to be the maximum permissible in the art of blow-molding. Anyone doubting the veracity of such a rule would be advised to ask a blow molder, or better yet, try to find a blow-molded bottle or container, such as an oil, gasoline or juice container which has a blow ratio exceeding even one (1), that is, has its parting line on one of its longer sides. Not only that, but if you are going to try to "push the envelope" with respect to the blow ratio, you'll stand a much better chance if your shape has a rounded rather than a rectangular cross section. The square peripheries of these same "edge walls 26 and 28" in Damratoski's design definitely rule out such a miracle. (Picture yourself blowing bubble gum into a champagne glass versus a square box of the same size. In the case of the champagne glass, the bubble stretches evenly and contacts the whole surface of the interior at roughly the same time. In the case of the box, however, as the bubble advances toward the corners, it sticks to the sides of the box, becoming anchored there. The remaining region which is not yet stuck must become continually thinner as it advances toward the corner, unable to distribute the increased stretching over the bulk of the material which has become anchored to the walls of the box. Since the amount of material not "anchored" to the sides of the box is decreasing geometrically, while the area it must cover is also decreasing, but much less quickly, an actual breach of the material is quite likely before it ever actually reaches the corner.)

Like many fillable weightlifting devices, this one is designed so that the weight may be varied by the addition of different ballast materials, with Damratoski supplying us with a handy table showing how much it will weigh when filled with what. Although the configuration outlined might make a fine jogging weight, as the inventor notes, it is too light to be a serious weightlifting tool, even when filled with lead. In addition, the requirement that the handle be off-center to minimize any wasted clearance between the outside of the weight and the fingers, so as to minimize inertial torque on the hand, will actually cause a gravitational torque to be applied to the hand, possibly resulting in an unbalanced feel in a heavier, lead-filled unit. In conclusion, this jogging weight is not blow-moldable and lacks utility as a barbell or as an aerobic stepping type of device. It also does not aid in the execution of pushups.

U.S. Pat. No. 4,673,179 to Pengler discloses a polyhedron having handles formed by default at the filleted linear intersections of its component planar faces, by the excavation of a passage behind the middle of each such filleted linear intersection. Each such excavation continues the curve of the fillet a full 360 degrees to form a cylindrical handle, while allowing room for a hand to grasp it. This clever and attractive device is not to be confused with a moldable, ballast-fillable barbell for the following reasons:

a.) It's not a barbell: The device is described as consisting of a "geometrically regular body," meaning a regular polyhedron such as a cube, regular pyramid, etc. having only planar faces. The handles are located only at the exterior linear intersections of its component planar faces, instead of along a central, longitudinal axis. Such a shape is not conducive to most barbell-type exercises, due to interference with the user's body, as well as inconvenient orientation of the handles.

b.) It is not moldable: While Pengler is quite vague in describing how such a device would be manufactured, saying it is a "molded or otherwise formed one piece solid body, the shapes put forth in his patent, with their intricate latticework of holes, faces, hollows, and handles, could certainly not be produced from a two-piece mold. Just calling something "moldable" does not necessarily mean it is so.

c.) It is not ballast-fillable:

1.) There is no ballast material shown or described.

2.) There is no means shown or described for admitting any ballast material to the interior of the device, nor of sealably closing the device to prevent loss of ballast.

3.) The weight in all embodiments is supplied by the mass of the structure itself, never by ballast: Toward the top of column 3 (U.S. Pat. No. 4,673,179) Pengler states, "Where weighted characteristics are required, the shell can comprise a metal, dense plastic, or other material." (The only embodiment of the device fillable with anything is mentioned in the next sentence, which continues, "Where weight is not desired, the shell can comprise a pair of spaced flexible plastic walls, the void therebetween being fillable with pressurized air.") Further down the same column, in describing his preferred embodiment, he specifies: "The material comprising the cube 10 can be, for example, a dense plastic, or can be a heavier material as, for example, a ceramic, a concrete aggregate, or other dense substances, even including metals, such as aluminum or otherwise."

4.) Even in an embodiment of his invention which is "hollow" in the sense that the unit as a whole has an empty central region, as illustrated in his FIG. 4, Pengler states: "In this form of the device, the center 30 of the device is hollow, with the body of the cube being defined by a relatively thin shell 32. In order to provide sufficient weight in this form of the invention, the shell 32 preferably comprises a high density material, such as a metal, which can be cast or otherwise suitably formed to provide the indicated shape." We can assume that if Pengler had meant for his device to be fillable with ballast as a means of mass enhancement into this device, we would read about it at this point. To the contrary, Pengler describes the similarly centrally hollow embodiment illustrated in his FIG. 5 as "generally similar to the apparatus depicted in FIG. 4 except that structure has now been somewhat further simplified by the web portions 33 of FIG. 4 being eliminated so that the interior of the hollow device 50 is completely visible and accessible through the openings such as 52, 54 etc. into the shell interior 56." Obviously, such a hollow structure having a total of 24 holes on all sides, through which the interior is "completely visible and accessible", is not capable of containing a ballast material.

5.) As mentioned, the one embodiment which is fillable, as Pengler shows in his FIG. 6, is fillable with air, not a ballast material. In this embodiment, each planar surface consists of a sandwich of compressed air between sheets of a flexible material, (like an airmattress) while the handles remain solid. The walls, but not the main central generally hollow area, are inflatable, "through a suitable valve". So basically, Pengler's device is fillable with air, not a ballast, in an endeavor to make it lighter, not heavier.

6.) In the only other embodiment of his device which makes use of two materials having different densities, as illustrated in Pengler's FIG. 3, a heavy solid core (metal is suggested) is buried within a lower density exterior (a relatively low density plastic is suggested), which includes the solid handles.

Since the denser core is a solid, permanent, built in component, this device makes no use of any introducible ballast, pourable or otherwise.

In conclusion, while this attractive exercise device has hollow areas, handles, and in one embodiment even has portions which can be inflated with compressed air, it is certainly not a moldable ballast-fillable barbell since, as described, it is neither moldable, ballast-fillable, nor even a barbell.

U.S. Pat. No. 4,679,788 to Adler discloses an exercise device having a weighted and padded cross arm on a post extending up from the base of the device. The base is designed for insertion under a bed mattress. Its primary use is to hold the feet of a user down during the performance of situps. It also has limited utility for leg exercises and as a relatively lightweight barbell. This device must be assembled from several distinct parts, and since its weight cannot be increased by the addition of ballast by the end user, is not particularly cheap to manufacture or ship.

U.S. Pat. No. 4,722,523 to Yang discloses a multiple use exercise kit which facilitates a wide variety of exercises. While quite versatile, this combination of many parts, including metal bars and weight plates, is heavy and expensive to produce and ship. It is also quite complicated to use, requiring reconfiguration between different types of exercise.

U.S. Pat. No. 4,773,640 to Kolbel et al. discloses a fillable dumbell, comprised of two weights and a coupling member, the coupling member surrounding a central ring diametrically spanned by a handle, which is free to rotate within the the ring, but supplied with adjustable frictional means to inhibit the rotation or stop it at any point. While Kolbel states that the fillable weights and coupling member may be blow-molded as a single unit, the handle and the ring which encircles it are separate units, which must be somehow attached to the blow-molded part. One is left wondering, if the two weights are formed by blow molding them as a single unit, what is the purpose of the very narrow (constricted) portion in the middle called a "web 5", and why is there a separate cap on each end, when a single blow molded container normally has continuous fluid communication throughout its interior? In his claim 3 Kolbel cites the coupling member as sealing the two chambers from one another, whereas in such a configuration, if blow molded, the coupling member would tend to connect, not separate the chambers, absent any reason for them to be pinched off from one another. If any part would seal the two halves, it would be the narrow web, which if blow-molded and shaped as shown, would still allow fluid communication between the two halves. An improvement would be to simply allow fluid communication between the two weights, reducing the required number of openings and caps from two to one, although in his claim 11, Kolbel does suggest (with no illustration to support it) that the dual screw-on caps could also be elongated to serve as handles.

Since, under ideal conditions, the process of blow molding allows any section of such a container to be twice as high as it is wide (a blow ratio of 2), this dumbell could be made more compact for a given weight if its length were reduced and its height increased. Further reduction in length could be achieved by making the coupling member and web both wider and thicker, making the weight distributed more evenly around the hand instead of confining it to two separate weights on each end. With such reduced length, the whole dumbell could be more easily rotated, possibly mitigating the dubious requirement for a rotating handle. If the handle did not have to rotate, it could be integrally molded with the weights, simplifying the design and reducing manufacturing costs. While this dumbell is designed on the premise that the weight may be varied by the addition of different ballast materials, in reality few persons would find constantly emptying and filling a single weight and storing the unused ballast easier than simply having a graduated variety of weights on hand. Also by the time you add the expense of the bearings and the screwed-together metal frame for the rotating metal handle, and then have to outlay further cash for a supply of differing ballast materials, what is the point of even having this model be fillable and blow molded, as opposed to just using a set of small iron dumbells which may obviously be rotated as needed?

Concluding, this patent is for a dumbell, but not a barbell, and due to its separate rotating handle and ring, could not be molded as a single unit.

U.S. Pat. No. 4,826,151 to Nuredin discloses an ankle-supporting stand for elevating the feet of a user, providing enhanced effectiveness in the performance of pushups. While well suited for its intended purpose, this device, by itself, does not facilitate a well-rounded exercise regimen.

U.S. Pat. No. 4,854,575 to Wilson et al. discloses a supposedly collapsible doughnut-shaped dumbell having accordion pleats around its periphery, with the idea that the weight of this dumbell can be slightly altered depending on how much ballast is used to fill it. Unfortunately, this appears to be yet another example of an idea which has not been fully thought through, for example:

1.) The accordion pleats are located exclusively on the outside walls of the dumbell, but not on the inside walls which define the void traversed by the handle. This means that only the outside walls could expand (get taller), but not the inside walls. This fact will severely limit the amount that the dumbell as a whole can expand, and is not discussed in this patent and indeed appears not to have even been considered in the design of this barbell.

2.) The top and bottom surfaces are shown as flat and level in both the full (FIGS. 3 and 5) and empty positions (FIG. 7), so we have a contradiction. It would be nice if the smooth inside walls could magically stretch (get taller) to match the stretching of the outer accordion-pleated wall, and so keep the top and bottom surfaces flat and level as shown, but in reality, only the outer accordion-pleated wall could expand. This limited expansion of just the outer wall would necessarily result in an inwardly or outwardly tilted top and bottom surface in either the closed or the open position. Take your pick, but the top and bottom surfaces couldn't both be level in both the open and closed positions if only the outside walls are expanding. This fact, while not mentioned in the patent, is apparent if one really thinks about it.

3.) FIG. 5 shows half of these exclusively outer accordion pleats being interrupted by the flat area which surrounds the inlet port, with no explanation of how this will affect the ability of the accordion pleats in this area to expand. A moment's reflection will reveal that the pleats will not function at the point where they connect to this flat area, further limiting in this region any limited expansion capability that this dumbell might have.

4.) In addition, this patent shows virtually no consideration of manufacturing techniques, or how this thing could actually be made. Our first clue is toward the end of the first paragraph in the Detailed Description, where Wilson states: "The location of the inlet port (20) and cap (22) is not critical. Advantageously the inlet is located on the outer periphery of the container (7) in the position illustrated in the various FIGS. 1, 2, 5 and 6 for convenience of introducing fluid, but other locations can be used if desired." Apparently Wilson has not considered how critical it might be that his inlet be located on a parting line, disposed with its longitudinal axis perpendicular to the direction in which the mold opens, for this product to even be made. Even FIG. 8, a detail view of the plug and inlet port does not show or mention a parting line.

5.) Such parting lines certainly needed to be considered, since Wilson vaguely states in the second paragraph of the Detailed Description that the pleats are molded biased into the closed position "by being molding using conventional techniques". Since the pleats run horizontally and form acute angles in the closed position (FIG. 7) a conventional two-piece mold would have to open horizontally to produce them. On the other hand, to form the void and handle, a two-piece mold would have to open vertically, as lines suggestive of parting lines within the central void and running along the handle in FIG. 1 would suggest. The squared edges at the ends of the accordion pleats, where they are interrupted by the flat area containing the inlet port would also require a vertically opening mold, but the pleats themselves would then prohibit separation of the part from the mold. Wilson shows signs of being aware of these drawbacks by the end of his Detailed Description, where he states: "The device (2), except for the screw-on cap (22) can be integrally molded in a single unit, or in two preferable symmetrical mirror image halves which are subsequently joined together, using a thermoplastic resin such as those exemplified above and using conventional molding techniques." Due to improper draft angles of the accordion pleats, this device could absolutely not be blow-molded from a conventional two-piece mold.

U.S. Pat. No. 4,750,630 to Campbell et al. discloses a generally elongated toroidal baby bottle, the two sides of which have narrowed central regions which function as handles for little hands. Due to the fact that it has a blow ratio of less than two, generously rounded corners, and its threaded filling neck is oriented with its longitudinal axis perpendicular to the direction in which a two-piece mold used to produce this shape would reasonably open, this well thought-out design could easily be blow molded. This popular example shows that useful, yet atypical handle designs for blow-moldable bottles have been considered and generally accepted in the past.

U.S. Pat. No. 4,867,325 to Dransfield discloses a toroidal baby bottle, having a bisecting tubular chamber which increases the capacity of the bottle. The two sides of the toroidal container act as handles, with the bisecting tubular chamber acting only to provide increased volumetric capacity and increased surface area for warming, but not as a handle itself. A flexible brush is included to reach throughout the interior. The opening for the attachment of a nipple is oriented at an angle of between "20 to 60 degrees with respect to the central plane of the bottle". Since this opening is shown with threads, such an angled orientation could inhibit separation of the part from the mold, if one were to attempt to produce this bottle from a two-piece mold by the technique of blow-molding. Also there are insufficient flares or fillets where the central tubular chamber meets the toroidal outer chamber, which could result in these sharply cornered areas having undue wall thinness, were one to attempt to produce this bottle by the technique of blow molding. This bottle is presented here because it is topologically similar to the thinnest embodiment of the dumbell of the present invention, but since it has two handles comprised by the outer toroid, while the middle tubular chamber is not a handle at all, but just a vessel, it is actually vastly different from the present invention.

U.S. Pat. No. 4,913,422 to Elmore et al. discloses a dumbell consisting of a handle with a sleeve at each end, into which fillable weights can be attached. Additional weights can then be attached to the first weights, etc.

U.S. Pat. Nos. 5,158,512 and 5,318,489 to Irwin et al disclose a stepping type of device for aerobic exercise. While elegant in its design and well suited to its purpose, it lacks utility for other types of exercise.

U.S. Pat. No. 5,393,284 to Wesley discloses a flexible, fillable barbell which may be reconfigured to become rigid by the insertion of a conventional bar. Straps for attachment to the feet are included. This device is portable and versatile, but must be reconfigured for different uses, and is not useful for pushups, situps, or as a stepping type of device. Also, the conventional bar has inherently high shipping weight.

U.S. Pat. No. 5,716,305 to this inventor discloses a molded hollow barbell having novel features facilitating a multiplicity of exercises, including voids for insertion of the feet from above and below, to facilitate the enhanced performance of situps, pushups, and leg extensions, as well functionality as a stair-stepping type of device.

CONCLUSION OF BACKGROUND SECTION

To conclude then, what is needed is a design for a hollow, blow-moldable, one piece barbell, the entire enclosed volume of which is in fluid communication, having a single repeatably closable orifice of an appropriate size, through which the entire barbell can be conveniently filled or emptied. This orifice must be placed in such a location that, in at least one orientation, the body of the barbell may be completely filled with ballast, leaving no air pockets. In addition, this orifice must be disposed so that it is centered on a parting line of the mold, with the longitudinal axis of any protruding spout perpendicular to the direction in which the mold opens and closes. Finally, such an orifice must be located where it will not interfere with a user's body during use.

The design must make efficient use of the limited strength offered by the relatively pliable plastics, such as HDPE (High Density Polyethylene) or polypropylene, which we will employ for their ability to be blow-molded, and to survive hard impacts without damage. Toward this end, to have the most massive regions closely surround the handles, and be bourne by both ends of the handles, would be desirable. All voids and recesses should be provided with sufficient draft angles, relative to the direction in which the mold opens and closes, to allow the finished part to be removed from the mold.

For most economical production in very large numbers, so as to enable virtually anyone to own not just one, but an entire graduated set of our new barbell and/or dumbell, the design should be optimized for being produced by the technique of blow-molding, with rounded corners and no regions having a blow ratio in excess of two. The general design should be scalable, inasmuch as such a graduated set shall be lent an ergonomic and visual continuity. A shape which prevents accidental rolling would be a plus.

Handles disposed at an angle, as well as those having an elliptical cross-section, and/or a cross-section that varies along their length, would enhance the ergonomics of such a barbell. A way is needed to include such angled handles in heavier, thicker models without exceeding a desired blow ratio due to areas of restricted width.

Ergonomics also dictate that the unit should be shaped so as to not unduly interfere with a user's body. This would be best accomplished if we could have contours relieved where necessary for such noninterference, while preserving thickness elsewhere to provide volume and strength. Further improvement would include incorporating other features, first disclosed in U.S. Pat. No. 5,716,305 to this inventor, including voids to engage the feet and a flat top, or deck for use as a stepping surface. A way should be found to place such voids at a comfortably wide separation, while not unduly separating the handles which straddle them, within the confines of a desired maximum blow ratio.

A stronger, skid-resistant stepping surface, with a wider stance or "footprint" from front to back, without discontinuities or holes would improve safety. Stackability would be a good feature for a graduated set of our barbells and/or dumbells, greatly enhancing the desirability of the product by making it easier to store and ship.

Notwithstanding the overall disclosure of an ergonomic barbell so cheap to manufacture and ship that any single user can afford an entire graduated set, a way to quickly add or subtract auxiliary weights to a single barbell of our new design may nonetheless be seen as an improvement.

Regarding the one handed version of our new design (dumbells), if we can create a design for a blow-moldable, stackable plastic container for liquids which is perfectly balanced around the handle, I am convinced that many other uses may be found for it. For example fitness-oriented products such as Gatorade could be sold in such containers with the consumer getting a free dumbell along with an incentive to make repeat purchases so as to complete a set. The addition of a flat side, or base, opposite the filling nozzle would allow the container to be set upright without spillage, even when open. The inclusion of contours allowing stackability might make such a bottle the container of choice for a variety of products regardless of the fitness aspect. For example, jugs for industrial chemicals are often stackable, but require an added step during the manufacturing process to make the handles recessed. A stackable bottle with a recessed handle which is producible directly from a simple two-piece mold would be an improvement.

SUMMARY OF THE INVENTION

In order then to design a mass-producible, water-fillable barbell, easily manufactured by the technique of blow molding, four special issues must be taken into account:

1.) While materials such as high-density polyethylene (HDPE) commonly employed in blow-molded containers are tough, durable, and resilient, they certainly don't have the stiffness or tensile strength of steel. In addition, our barbell will consist mostly of inert ballast material. (When filled, our final product will actually be a composite structure, the fluid core (water) having only compressional strength, with the tensile stresses bourne by the fairly rigid shell.) Our design process must utilize the limited strength that our material does have efficiently, for our final barbell product to be strong enough to withstand hard, constant use.

2.) While blow-molding is by far the most efficient way to manufacture large runs of plastic containers, not all shapes are suitable for the process. Special considerations unique to the art of blow-molding dictate that to make efficient use of the economy it offers, the shape of a design should be optimized for the process.

3.) Water is less dense than iron so, pound for pound, our barbell will have more volume. We must distribute the weight as closely to the handles and the region between them as possible, to keep the overall size and material usage down, while maintaining a balanced shape which allows a full range of motion without interference with the user's body.

4.) A threaded spout, or neck, which is actually a complex shape, may be integrally incorporated into a blow-molded container, as long as it is exactly centered on the parting line, with its longitudinal axis substantially perpendicular to the direction in which the two halves of the mold open and close. In order then to provide our barbell with a usable threaded spout, we must find a location on the parting line which will:

a) not interfere with a user's body during the performance of the exercises for which this barbell device is designed.

b) be capable of being the highest point in at least one orientation of the barbell, so that the unit can be completely filled with water by the force of gravity alone, leaving no air spaces or bubbles.

Now let's take those four special issues, combine them with our original design requirements, (a substantial mass, or ballast, which can be easily gripped by one or both hands in a balanced, comfortable way, with a shape facilitating weightlifting exercises) and design ourselves an ergonomic, closable, water-fillable barbell with a design optimized for blow-molding:

General Structure and Strength of the Handles:

As for the first special issue, from a materials-strength standpoint, for our design to greatly resemble in form a conventional long bar with weights is out of the question. Not only does the conventional bar serve as both handles of a barbell, it is also the main structural frame for the unit as a whole. With the huge leverages involved, even solid steel weightlifting bars can be seen to bend under load. Any reasonable person would agree that a weightlifting bar of conventional dimensions but consisting of only a hollow polyethylene tube would certainly not be strong enough for its intended use. On the other hand, we can see from the myriad of blow-molded 5 gallon containers for liquids having integrally molded handles, such as gasoline cans and industrial jugs, that a hollow polyethylene handle directly connected and smoothly merged at its ends to a container, can routinely be used to lift a substantial weight. (5 gallons of water weigh about 40 pounds.) Why is a hollow tubular plastic handle strong enough in this application? Four reasons:

a) The leverage on it is reduced because it is short—only long enough to be comfortably gripped by a single hand, and b) The container to which it is attached has its own structural integrity independent of the handle, thereby saving the handle from doing double duty as the structural frame of the unit as a whole.

c) The handle is attached at both ends to the container, eliminating the stresses that would ensue due to leverage and unconstrained movement of the free end, were the handle to be attached at only one end.

d) The handle smoothly merges at each end with the container, distributing stresses evenly from the handle to the container.

Important keys to our design then, from the aspect of material strength, will be to minimize the leverage on our handles by making each of them only long enough to be easily gripped by a hand, by giving the barbell as a whole its own structural integrity independent of the handles, and by smoothly merging the handles at each end to the unit as a whole.

Locating the Handles Within Recesses:

Now let's take a look at the ergonomics involved: In order for our barbell to be easy to use, it should have a balanced feel. First, as with most freeweights, a general end-to-end symmetry will equalize the weight born by each of a user's hands. Second, the handles should be located along (but not necessarily be coaxial with) a longitudinal axis which passes through the center of mass of the unit as a whole. This is so that when held at any angle by the handles, the unit has no rotational moment induced by gravity (the unit doesn't want to spin to a preferred "down" position). Note that ordinary barbells achieve this rotational stability by simple axial symmetry, however, this is only the most geometrically obvious case of rotational stability. In fact, a design of any shape where the handles are located approximately along an axis passing through the center of mass of the unit as a whole, will have the desired rotational stability.

Bearing this rotational stability issue in mind, and returning to the issues of the material strength of the plastic and the low density of water, locating our handles within recesses will allow us to:

a) locate them along a longitudinal axis passing through the center of mass of the unit as a whole.

b) give the unit as a whole, in the regions surrounding the handles, its own structural integrity, so that the unit is not dependent upon the handles for its overall strength, the way a conventional barbell is dependent on its bar.

c) have our relatively short handles be smoothly merged at both ends to the structure as a whole. Shorter handles don't have to endure the high stresses resulting from the extreme leverage generated by the long bar of conventional barbells, and having them smoothly merge at both ends to the overall structure restricts the movement that an unattached end would have, and distributes any stresses to both ends.

d) locate a major portion of total ballast directly around each handle, reducing the average distance of the mass from the handles, and reducing overall length of the unit, consequently reducing the attendant leverages and stresses on the shell that such excessive lengths and distances entail.

e) provide an efficient way to package the desired contained volume into the smallest physical region while still enabling our other design objectives, therefore making an overall compact product which does not waste material.

Making the Handle Recesses Penetrate the Structure Fully:

In any molding process that utilizes a two piece mold, that the draft angles of the inner surfaces of the mold permit removal of the finished part from the mold is an important basic requirement; By making our handle recesses penetrate the structure fully, from one side of the unit through to an opposed side, and providing proper draft angles, we make our product producible from a two-piece mold, with the separation (parting) line on the inside of the recesses simply following the widest part of the handles and the narrowest part of each recess. In addition, with this full penetration, the interior walls of the recesses, or apertures, attach to and merge with the exterior of the unit on two sides of the unit instead of just one, greatly adding to the overall structural integrity. The full penetration of the handle recesses is the basic concept which allows our new barbells and dumbells to be produced from a two-piece mold.

The Geometry of the Handle Recesses:

As already discussed, for strength reasons the handles should not be greatly longer than necessary for easy engagement by a hand. For our unit to have overall compactness while maximizing the ballast-containing volume, the size and shape of the recesses containing those handles should be restricted to that necessary for easy access to the handles; The middle section of each recess, or walled aperture, immediately surrounding the handles should have two opposed sides into which the ends of the handle perpendicularly merge, and two other opposed sides aligned with the handle, but separated from it enough to allow clearance for the hand. After smoothing the corners, this configuration will result in a fully penetrating recess, the middle region of which has rounded-rectangular cross section. This shape provides the desired freedom of access and engagement by the hand without wasting space. Each recess should be narrowest in this middle section surrounding the handles and, for ease of access, as well as moldability, smoothly widen (flare) to its open ends.

Making the Handles and Their Recesses Angled:

The simplest barbells have straight bars, and consequently the areas gripped are coaxial with the bar as a whole. Given a choice, however, exercisers often prefer a bar having strategically placed bends providing angled sections which offer enhanced gripping areas. This is because, although a straight bar is easier to manufacture, it doesn't necessarily offer the best interface with the human body. For our fillable barbell design, we have no bar, and so are free to orient the handles at any comfortable angle.

Taking advantage of this freedom, the present invention, in a multiplicity of its embodiments, will have its handles disposed at a comfortable nonzero angle to the longitudinal axis of the unit as a whole. In our barbell, if the handles are angled, we will of course want to dispose the inner, rounded-rectangular sections of the recesses that contain them at the same angle.

Specially Shaped Handles:

Looking at the shape of the handles themselves, since our design does not incorporate the traditional cylindrical bar, there is no reason our handles should be restricted to having a circular cross-section. A trip to the local hardware store, and a quick look at common tools having handles, such as hammers, axes, and the like, provides ample evidence that over the years, handles having an elliptical cross-section have often proven superior. Also notice that many well established handle shapes do not even have a constant cross section, but one that varies over the length of the handle, to provide the most comfortable grip possible for the human hand. Our molded handles can advantageously have an elliptical cross-section and/or one that varies along their length. Certainly each handle should flare at its ends where it smoothly merges with the walls of the recess containing it.

The Special Considerations Regarding Blow Molding:

The second special issue, requirements unique to blow-molding, will be explained next, and subsequently addressed as applied to issues of materials-strength, ergonomics, and the overall goals in the challenge of designing our product:

As previously stated, in any molding process that utilizes a two piece mold, that the draft angles of the inner surfaces of the mold permit removal of the finished part from the mold is an important basic requirement.

Next, a common rule of thumb in the art of blow molding plastic is that unless absolutely necessary, the height to width ratio (called a "blow-ratio") of a finished part be no greater than about two. In blow-molding, a hollow tube of hot, semi-molten plastic, called a "parison", is vertically extruded (hung) into the area between the two halves of a liquid-cooled metal mold. The mold is then closed on the parison, and pressurized air is injected, to inflate the parison. As the parison stretches to fill the mold, its walls become thinner. Where it stretches the most, it may become undesirably thin or even breach. Because of this localized thinning, when any region of the mold has an unusually high blow-ratio, (greater than about two) the entire parison must be made thicker to compensate, resulting in prohibitively high material usage, higher shipping weight, longer cooling times, and decreased production efficiency.

Blow-molding also works best when the part has a smooth, flowing shape with rounded, rather than sharp, corners. The process itself amounts to blowing a hot plastic bubble inside of a mold; The more bubble-like the desired shape, the better suited for being blow-molded.

Now let us consider our design in light of the blow ratio: As discussed above, for blow-molding purposes, it is critical that the height-to-width ratio of any region of our product not appreciably exceed two. (Stated differently, our 2:1 "blow-ratio" rule means that taken in cross-section, the width of any region of our part should be at least about half its height.) For the handles themselves, this does not present a problem; Whether circular or elliptical in cross-section, for best comfort and utility, our handles should have a height-to-width ratio of well less than two.

For the regions immediately surrounding the handles, however, we must be careful not to greatly exceed a blow ratio of two, while still having a compact design which provides enough contained volume to give us the desired weight. In a very light version of our barbell, the regions surrounding the handles might be no thicker than the handles themselves. Since a cross-section of any region of such a unit is already wider, even from front to back, than it is tall, to graduate toward heavier versions while maintaining compactness, we would prefer to accomodate the additional volume by first increasing its height (depth), rather than its width. (In this way we also preserve its general shape from a plan view, lending a visual and ergonomic continuity, as well as possible stackability, to a set of such barbells having graduated weights.) Once we reach the point where, in vertical cross section, any region of our barbell is twice as tall as it is wide, to further increase the volume, and not exceed the blow ratio, we must begin to increase the width of that region as well. Thus, to make our design as compact and ergonomic as possible, we should seek to eliminate or adjust any regions which are particularly narrow in relation to their height, and therefore likely to have an excessive blow ratio in thicker models.

As noted previously in the "Background of the Invention" section of this document, referring to a multifunctional barbell of my earlier design (as disclosed in U.S. Pat. No. 5,716,305) if a model had angled handles, the inner region of the recess surrounding each handle was also angled, for easy hand access. Contrarily, the exterior of the unit in the regions surrounding the handles may have been enlarged for clearance but was not necessarily angled similarly to the handles. Because of this discrepancy in angles, the distance between the interior walls and the exterior walls was non-constant, with the corner regions of the rounded rectangular recess immediately surrounding each handle having diminished clearance between themselves and their surrounding exterior walls. In heavier and therefore thicker models such a difference in angle between the inner recesses and the exterior could result in these areas of reduced clearance having an undesirably high blow ratio. After much consideration a solution has been found which also enhances the ergonomics as well as the appearance of the product. The solution is to make the exterior of the barbell, in the end regions which surround the handles, angled to match the angle of the handles themselves, thereby equalizing the perpendicular distance between the interior and the exterior walls of these regions, and therefore eliminating (widening) the especially narrow areas that would have had a high blow-ratio.

The best shape, then, for the exterior of our barbell in the areas surrounding the handles, from the standpoints of compactness, uniformity of general design for models of different weights, and overall volumetric capacity maximization (for our heavier models) is one where, in a cross-section taken in plan view at the mold separation line, the exterior contour generally mimics the shape of the interior contour (the middle section of the recess where the handle is attached), except that at any point, it is offset to the outside of the recess by a constant amount. In other words, in the areas surrounding each handle, our exterior shape should have a cross-section (taken at the parting line in plan view) that generally maintains a constant minimum perpendicular distance from the generally similar interior cross section of the contained handle recess. In order to not exceed our blow ratio, our exterior contour should essentially mimic the interior contour; If the handles and hence the handle recesses are angled, then so should our surrounding exterior contours also be angled by the same amount.

For example, if we angle the handles comfortably, say at 30 degrees from the longitudinal axis of the unit as a whole, we will angle the hand-access recesses by the same 30 degrees, and angle the exterior, in the regions surrounding the handles, by that same 30 degrees.

To sum up the last several paragraphs, since we aren't dealing with a conventional straight cylindrical iron bar, we have great freedom of shape and orientation of our handles. If we choose to angle the handles, and hence to similarly angle the rounded rectangular recesses spanned by them, then a compact and efficient design calls for the exterior of the unit as a whole, in the regions surrounding the handles, to be angled as well, so that the maximum desired blow-ratio is not exceeded.

The result is that each handle spans the central recess of a ballast containing region having a shape which could perhaps best be described as a "rounded-rectangular donut", which is itself aligned with the handle.

This alignment of the exterior with the angled handles has another advantage: Barbells with angled gripping areas are usually designed to be held with the hands closer together than is typical with a straight bar. This is because they are more likely to be used for curls and extensions than a straight bar. By angling the rounded-rectangular donut-shaped end regions which surround our angled handles, we are providing an easier transition from these end regions to the inward-swooping middle region of the barbell. This has the effect of allowing a narrower (closer) placement of the handles while maintaining smoothly contoured concave middle surfaces where the barbell contacts the users trunk.

Blow-molding Considerations as Applied to Our Dumbells:

Each dumbell of our new general design is similar in form to one of the rounded-rectangular donut-shaped end regions of our barbell.

The same considerations apply regarding the blow ratio: In any region the depth-to-width ratio, known as the blow ratio, may have a maximum value equal to two. Again, as with our barbell, it is important that all corners are provided with a generous radius (are amply rounded), and that the recess spanned by the handle is aligned with the exterior of the dumbell to avoid "pinched" areas having an excessive blow ratio. Also, the handle should flare at its ends where it smoothly merges with the walls of the recess which it spans. (For a good example of a fillable hand weight which could not be blow molded, see U.S. Pat. No. 4,575,074 to Damratoski, as discussed in the "background" section of this document.)

Noninterference with the Torso for Barbells:

In a conventional straight barbell, the hands may be placed at any comfortable place on the bar. Alternatively, a bar will have angled areas suggestive of handles, placed at a convenient distance from the center. In either case, the narrow bar does not project outward from the central axis enough to adversely contact the user's body (trunk) during use. We wish to duplicate these advantages in our design, therefore our handles should be a comfortable distance apart, and the region between the handles should be contoured so that it does not restrict the range of motion by interference with the user's body. Since our plastic will not have the strength of steel, we'd like to keep the region between the handles as thick (large in cross sectional area) as possible, for overall structural integrity. A thicker middle region will also give us more precious volume to contain our (relatively) low density ballast of water. We will accomplish the desired non-interference of the center section with the user, while maintaining as much overall thickness in the middle region as possible, by incorporating concave body-accommodation contours into it, while restricting the contouring to only that necessary for facilitation of normal use.

First let's consider the issue of interference with the user's body at full extension and contraction of the arms during use. When performing curls, for instance, it is desirable for the hands to complete an arc from full extension, where the barbell contacts the fronts of the hips, to full contraction, where the barbell may contact the chest and shoulders. In our design, the handles are located within recesses which, for molding and strength purposes, fully penetrate the structure from one side through to an opposed side (let's call these two opposed sides top and bottom). These two opposed sides obviously suggest two preferred directions of hand engagement by the user.

To allow maximum extension and contraction in our design, the other two opposed sides (let's call them front and rear), should have concave body-accommodation contours molded into their middle regions. Now, when viewed from above, our barbell will have a "dog-bone" type of shape, having two bulbous, rounded-rectangular donut-shaped ends and a narrower middle region. (In heavier, thicker models, the "donuts" will be more like "tall donuts".)

With this new configuration, if our handles are angled (and hence the recesses containing them, and the exterior contours surrounding them are also angled), it turns out to be most convenient, since the inwardly angled exterior of the regions surrounding the handles can be smoothly merged with the similarly inward angled front and rear surfaces of the middle region, forming one smooth, flowing, inwardly contoured surface on the front, and one on the rear. Stated another way, the front and rear surfaces of our angled "rounded rectangular donuts", on the sides facing toward the middle of the unit, can be smoothly merged with the concave front and rear surfaces of the middle region, forming continuous inwardly swooping contoured surfaces in the middle regions of the front and rear.

A Preferred Direction of Engagement for Barbells:

In thicker versions of our barbell, the top and bottom surfaces of the middle section may also be slightly concave to help avoid interference with the user's trunk, although this will decrease the top-to-bottom depth of the middle section, which will also tend to decrease its strength. But remember that there is no requirement for any type of axial symmetry (only balance) in our design, therefore in a heavier, thicker version of our design we can maintain some of the desired thickness in the center section, while further avoiding interference with the user, by establishing a single preferred direction of engagement (reducing the number of preferred directions from two to one), and scooping out a concave region on that preferred side to accommodate the user's body.

A comfortable and effective distance for the handles is about shoulder width or a little wider. In our heavier, thicker models, to make our user-accommodation concavity comfortably wide, without having the handles located too far apart, our user accommodation cavity may well impinge (cut into) the rounded-rectangular donut-shaped end regions surrounding the handles. That presents no problem (and in fact, as we will see, can even be beneficial) as long as we round off all of our corners and edges. An easier way to think of this is that a heavier barbell of our design would be preferentially relieved in the middle region on three adjacent sides (front, bottom, and rear), with the relieved areas smoothly transitioning from one side to the next.

Since scooping out our body accommodation cavity will lighten that side of the unit, moving the center of mass of the unit as a whole away from that side, we must accommodate by relocating the handles somewhat further from that side also, so as to maintain their position on a longitudinal axis passing through the (now relocated) center of mass of the unit.

In a lighter, and therefore thinner version of our design, engagement from either the top or bottom would be equally easy, with no scoop needed on either of these two opposed sides of preferred hand engagement. In this case, however, there should still be concave body accommodation contours formed into the other two opposed sides (front and back), to allow full extension and contraction during use.

So to summarize thus far in the design process of our barbell, we have an elongate, blow-moldable, fillable container, fairly symmetric from end to end, with a recess (spanned by a handle) fully penetrating a rounded-rectangular donut-shaped region at each end, with opposed (front and rear) surfaces of the middle region at least partially scooped out (concave) to accommodate the user's body at full extension and contraction. In heavier, and therefore thicker models, we may establish a preferred direction of engagement, with a scoop also taken out of that side, and the handles relocated away from that side so as to maintain rotational stability about the longitudinal axis.

If the "top" side is made substantially flat, it has utility as a stepping platform. The general concept is similar to that disclosed in U.S. Pat. No. 5,716,305 to this inventor, except that in the present invention, in versions where the handles and hence the ends of the unit are angled, there is an enhancement of the unit's functionality as a base: Remember that, viewed from above, the handle recesses and hence the bulbous ends of the unit which surround them have a generally rounded-rectangular shape. Now a rectangle, even a rounded rectangle, always measures longer diagonally than straight across. Therefore, by having the rounded-rectangular regions surrounding our handles disposed at an angle, we are increasing the effective front to rear stance of our base. This makes our unit more rotationally stable about its longitudinal axis, and therefore more resistant to accidentally tipping (rolling) over during use.

Attachable Deck:

Another new enhancement regarding a stair-stepping function for our barbell is to include a rigid detachable flat deck which can be snapped on top of the barbell to distribute the user's weight evenly and provide a uniform, hard stepping surface. Of course it would be prudent to supply our deck with a nonskid surface.

Such a rigid, attachable deck can also be made to fit on top of a pair of our new dumbells. Dumbells of different thicknesses and/or multiple stacked dumbells might be utilized to selectively change the height of the deck, similarly to the devices disclosed in U.S. Pat. Nos. 5,158,512 and 5,318,489 to Irwin et al. By orienting our dumbells with their longer dimension parallel to the short sides of the deck, we are again enhancing the front-to-rear stance, or "footprint", making the unit more stable. In addition, since many aerobic routines require the participant to step to and from the sides of the deck, using our dumbells as support members, with their sides parallel to the sides of the deck, enhances the usable stepping area by providing direct support for all four corners of the deck. Such a deck may also be used as an exercise bench for either laying or sitting upon during the performance of exercises utilizing whatever free-weights are not used in supporting the deck. Pushups may be performed with enhanced resistance if the feet are elevated by positioning them on top of the deck. Like our freeweights, the deck may also be a hollow blow-molded or otherwise formed structure, fillable with water and provided with a suitable closure, for enhanced weight and therefore enhanced stability. A filling neck, or spout may be included if centered on the parting line, with its longitudinal axis perpendicular to the direction in which the mold opens and closes. Such a neck or spout may be recessed, to avoid unwanted contact with the user.

Base Members:

The stability of our deck/dumbell combination may be substantially increased by the addition of a pair of base members, each having a flat bottom surface which provides a widened stance and enhanced stability. The top side of each base member is provided with a base indentation which fitably engages the bottom of the dumbell. These base members greatly enlarge the footprint, or stance, of the arrangement, in addition to providing a means for adjustment of the deck height; The inclusion or non-inclusion of base members, as well as the option of using base members having different thicknesses, or even stackable base members, all offer ways to adjust the height of the deck.

Merging Foot Insertion Voids with Hand Recesses for Our Barbells:

In U.S. Pat. No. 5,716,305 I also disclosed how to incorporate foot insertion voids into the middle region of a fillable barbell. These generally fully penetrate the unit from the bottom surface through to the top, and allow engagement of the unit with the feet for situps or leg extensions. Also, in heavier, thicker units, the user can insert the feet from the top to raise and securely anchor them for enhanced performance of pushups.

Foot insertion voids such as these can certainly be incorporated into our present invention exactly as they were into this previous one. But there have since been developed improved, alternative ways to implement such foot-insertion voids into a barbell of our design, which will work better in heavier, and therefore thicker models:

In such heavier, thicker versions of our new design, the rounded-rectangular donut shaped regions which surround the handles at each end of our unit, being optimized for blow-molding, have a rather wide cross-section. In addition, when they are oriented at an angle to the longitudinal axis of the unit as a whole, they take up even more room along that axis. (Remember, even a rounded rectangle always measures longer diagonally than straight across.) Bearing in mind that the most effective positions for situps and pushups are with the feet comfortably separated, and that our handles should not be greatly more than shoulder-width apart, as our units become thicker we begin to be squeezed for space; In these thicker, taller models, the regions which separate the hand recesses on each end from the foot insertion void(s) in the middle cannot be made wide enough to satisfy our 2:1 blow ratio rule without either confining the feet uncomfortably close together or unduly separating the hands.

Another way of looking at this situation is as follows: The handles should be located a comfortable distance apart, but not too wide for a comfortable grip. Just a bit more than shoulder width is about standard. The foot insertion voids, located between the handles, must be separated far enough from one another to provide a comfortably wide stance (distance between the feet) for a user performing situps or pushups. Such a comfortably wide stance is about shoulder-width or a little less. Since our handles can only be slightly more than shoulder-width apart, and our foot-insertion voids must be spaced almost shoulder width apart, that doesn't leave much distance between each foot-insertion void and its adjacent handle recess. As our units graduate toward thicker models, and the rounded-rectangular donut shaped regions surrounding the handles get thicker and fatter, at some point our foot-insertion voids begin to impinge (cut into) these donut-shaped regions. This has the effect of making these impinged regions (the side of each donut facing toward the center of the unit) narrower, possibly exceeding our maximum desired blow ratio of about two.

We have two solutions to this dilemma:

1) Since these regions cannot be made full height without either being overly wide, or exceeding our blow-ratio, we can compromise by letting them be only as tall as their restricted width will allow; To sufficiently reduce the height of our problem areas we need only relieve the bottom of them enough to come within our desired blow-ratio. Recall that, to make our body-accommodation concavity on the side of preferred access wide enough for comfort, it may well impinge (cut into) the bottoms of the "donuts" surrounding the handles on the sides of those donuts facing the center of the unit. Fortunately, these impinged regions of our "donuts" are part of the problem regions which we seek to reduce in height to maintain for our blow-ratio. By simply extending these impinged regions on the bottom of our "donuts" all the way through to the hand recesses, we have solved our problem. In effect, we are relieving two channels which extend the surface of the body-accommodation cavity outward, connecting to each hand recess. Stated another way, each of the "donuts" surrounding our handles will have a notch carved into the bottom, on the side facing toward the center of the unit.

2) Simply get rid of the two problem areas altogether; In this scenario, regions which separate the hand recesses from the foot insertion void(s) are deemed unnecessary and are completely removed. Now, each hand recess will merge and fully communicate with its adjacent foot insertion void, to form an elongated, multipurpose hole. In a unit which would have had two hand recesses, and two separate foot insertion voids, the four holes are condensed into a single pair of elongated, multipurpose holes. In a unit which would have had two hand recesses and a single elongate foot insertion void, all three holes are combined into a single, very elongated, multipurpose hole. Note that in this last case, topologically, our barbell has been reduced to a single convoluted, elongate loop spanned by two handles! In fact, it might occur to the astute reader that such a single-loop structure, even if not incorporating an area for foot insertion, might still be an attractive, as well as effective barbell.

Varying the Weight:

Next we turn to the area of weight variation, or, how to change the weight of a barbell or dumbell of our new design. Of course, if the unit is only partially filled with water it will be lighter, but due to sloshing it may become unstable and/or unbalanced during use. Also remember that the structure is actually a composite, with the noncompressible aqueous ballast providing at least some of its compressional strength. To replace some of this noncompressible ballast with compressible air by only partially filling it is to risk weakening the unit, especially if it is to be used in a stair-stepping capacity.

Alternatively, as is the case with most fillable barbells and dumbells, we could use ballast substances of varying densities, such as sand, beans, saltwater, or even gasoline, to greatly vary the weight. We could even use mixed ballast materials, such as water and ping-pong balls, water and foam beads, or water and sand.

A Graduated Set of Stackable Freeweights:

A more sensible solution, since our freeweights are designed to be inexpensive anyway, is to simply produce them in a set of varying thicknesses, so that an exerciser can switch from one to another without interruption of the workout routine. Since all of the units will have a basically similar shape, they can be stacked for compact storage or shipping. Complementary interlocking contours, molded into the top and bottom surfaces of the barbells and dumbells may be provided to enhance their stackability. Such an interlocking set could be packaged ready for shipment or sale by simply stacking them, including a printed cardboard insert, and shrink-wrapping the whole assemblage in clear plastic.

Integrally Molded Base for Dumbells:

The inclusion of an integrally molded base at the opposite end from the filling neck of a dumbell of our new design will allow the dumbell to be stood on end when open without spillage of its contents. Such a container might find use far beyond weightlifting. Since the handle is located in the middle, the container is easier to carry and pour than most existing blow-molded containers. It could be the container of choice for many pourable substances due to this fact alone. If provided with contours on the top and bottom facilitating enhanced stackability, so that storage, bulk packaging, and shipping are made easier, we could be talking about an extremely useful new way to package pourable substances. A container could be configured for stackability with others of its own size, or with other different sized containers so that a graduated set is easier to store and ship. A product could be marketed in such a container, with the fact that it could later be filled with water and used as a freeweight acting as an extra incentive to purchase the product. The consumer might even be persuaded to purchase two of each size of product in order to accumulate a complete graduated set of weights for each hand.

Attachable Auxiliary Weights for Our Barbells:

Another family of variations on our moldable, fillable freeweights have a protrusion formed as an integral part of each end, onto which fit auxiliary weights having holes which match the protrusions. The weights can be made of conventional solid materials, but more preferably will be molded and fillable like the rest of our barbell. Here is another area where our design must diverge from the norm due to the inherent properties of the relatively pliable materials we have chosen to use. The strength of an iron or steel bar is so great that it can be very long and thin, and still support a heavy weight without much problem. For our barbell, however, an end protrusion capable of supporting an attached weight must be relatively short, so any leverage on it is minimized, and wide, in order to be strong enough to do its job. The protrusion/weight combination may take several forms:

a) The weight can slidably fit onto a protrusion of constant cross-section, similarly to a conventional barbell. If this cross-section is non-circular, rotation of the weight is prevented. To prevent the weights from accidentally sliding off the ends of the protrusions, there is the option of providing the slidably engaging surfaces with a bump-and-dimple type of snapable locking means: The weight is provided with one or more bumps, each molded into a surface of the hole in the weight which slidably engages the barbell. The barbell has dimples disposed to snapably engage the bumps when the weight is slid all the way onto the protrusion. Note that this bump-and-dimple locking system is possible because of the tough resilience of our material. Also note that, to maintain proper draft angles which will allow easiest separation of the part from the mold, a bump but not a dimple should optimally be molded into the slidably engaging surface of the hole in the weight, and similarly, the matching dimples of the barbell should ideally be located far enough from the parting line that their angle does not inhibit mold separation.

b) Our protrusions may be cylindrical, supplied with L-shaped channels, which allow each weight, with its projecting bumps, to be slid on then twisted to lock into place.

c) The protrusions can be threaded, with the weights shaped to engage the threads when simply screwed on. Since we wish to be able to produce our barbell from a two-piece mold, for the mold to be able to open and release the finished part, our threaded protrusions must be exactly centered on the parting line, with their longitudinal axes perpendicular to the direction in which the two halves of the mold open and close. Since, due to draft angles, it will be impossible to mold a complete set of threads into the inside of a hole in our weights, we can either mold in bumps or a similar protruding shape to serve as partial threads, sufficient to engage the completely threaded protrusion, or rely on a threaded insert which would fit in the hole.

The Threaded Nozzle and Cap:

Finally we shall address the need for a closable means of access to the interior of our shells, to make it easy for a user to selectively empty or fill the barbell or dumbell with a pourable ballast material of choice. Five major issues come into play here:

a) The placement of any fill-hole or nozzle should be such that there exists at least one orientation of the barbell in which this nozzle or fill-hole is at the highest point of the barbell, so that the unit can be completely filled with water by the force of gravity alone, leaving no air spaces or bubbles.

b) Any fill-hole or nozzle should, for convenience, be large enough to allow quick and speedy introduction (or removal) of a pourable ballast material directly from a hose, faucet, or vessel, without spillage, ideally without the need for a funnel or other special equipment.

c) The means for closure should be able to easily and repeatedly provide a positive, reliable, watertight seal, and should be durable enough to be likely to continue to provide such a seal for the lifetime of the product.

d) Should our means for closure protrude from the outer surface of our barbell, it should be located where it will not interfere with a user's body during the performance of the exercises for which this barbell device is designed.

e) Since we wish to be able to produce our barbell or dumbell from a two-piece mold, if our closable means of access is to be a threaded neck, or spout, it must be exactly centered on the parting line, with its longitudinal axis perpendicular to the direction in which the two halves of the mold open and close.

The conceptually simplest solution, as utilized by Wright in his dumbells (U.S. Pat. No. 4,029,312) is a round hole provided with plug means, with the plug comprising a resilient, truncated cone (a typical cork, or stopper). Conveniently, an opening of this type can be formed by simply drilling a hole in any appropriate location. On the downside, however, such a plug can easily fall out by accident, making a mess and/or becoming lost. To avoid this, a user may even be tempted to push the plug in too far, permanently losing it inside the unit. We can reduce this tendency for the plug to accidentally fall or be forced out of its hole by reducing the diameter of both. Such a smaller hole will have a higher circumference-to-area ratio, making it less likely that a plug would be accidentally pushed out. Unfortunately a smaller hole also makes it more difficult and time-consuming to add or remove the pourable ballast material, possibly requiring the use of a funnel to avoid spillage.

Another closable type of access suitable for molded plastic containers is a neck, or spout, having a rim, or lip onto which a cap snapably engages, as in for instance, some milk and juice bottles. This method, again, presents very little resistance to accidental removal, and hence is probably not suitable to our task.

A more sophisticated closable access to our molded, fillable barbell would be a threaded neck, or spout, provided with a screw-on cap. This method offers the advantages that it easily and repeatably provides a positive, reliable, water-tight seal, and is durable enough to be likely to continue to provide such a seal for the lifetime of the product. In addition, we have no problem making such a threaded spout large enough so that the pourable ballast substance may be quickly and easily added or removed from our barbell from a hose, faucet, or vessel, without requiring the use of a funnel to avoid spillage. Since we wish to be able to produce our barbell from a two-piece mold, for the mold to be able to open and release the finished part, our threaded neck, or spout, must be exactly centered on the parting line, with its longitudinal axis perpendicular to the direction in which the two halves of the mold open and close. For the nozzle not to physically interfere with a user during the performance of the many exercises for which the barbell is designed, it should protrude perpendicularly from the surface near one end of the barbell, aimed generally away from the center of the unit and hence away from the user. Fortunately, when a barbell having a nozzle so protruding from an end region, centered on the parting line, is oriented so that the nozzle is aimed exactly upward, it is also the highest part of the unit, allowing easy filling with no air pockets or bubbles. (The unit could not be completely filled, for example, from an opening placed on the parting line in the middle section, since no matter how such a barbell were turned, part of it would be higher than the opening.) If the handles, and hence the rounded-rectangular donut-shaped regions at the ends of the barbell are angled, the nozzle should also be similarly angled, protruding perpendicularly from a side nearest one end. This placement will accomplish the following objectives:

a.) The overall length of the barbell will be decreased by the length of the nozzle with its cap, since they won't protrude directly from the end, but will be angled like the surface they protrude from.

b.) By not protruding directly from the end of the barbell, the nozzle/cap combination will be less likely to be damaged by impacts during shipping or normal use.

c.) By locating the nozzle in the middle of a relatively flat area, as opposed to a more convex part of the surface, it effectively protrudes less, and so is less likely to be damaged by impacts.

d.) Similarly, disposing the nozzle perpendicularly to the surface from which it protrudes, allows the nozzle to be short, and the cap to lay flat, close to the surface, where it is most protected from damage by impacts.

In a version of our barbell having end protrusions for the attachment of auxiliary weights, the nozzle should protrude straight out from the end of one of the protrusions, to avoid interference with the weights as they are attached or detached from the main unit. If the auxiliary weights themselves are to be molded, and fillable with ballast, then they too should each be provided with a threaded nozzle, exactly centered on their parting line, with its longitudinal axis perpendicular to the direction in which the two halves of that mold open and close. For our dumbells, to maintain continuity with our two handed barbells, we will choose to locate our nozzle on a shorter side, centered so that it lines up with the handle.

Objects and Advantages of the Invention:

In this patent I reveal an improved ergonomic fillable barbell design optimized for being fashioned by blow-molding. A two-handed fillable barbell molded as a single unit and having a threaded filling nozzle and screw-on cap has been completely unknown until first revealed by this inventor in U.S. Pat. No. 5,716,305. Improvements to the concepts first put forth in this previous patent shall be included here.

The present invention is a vast improvement over the current state of the art in the world of fitness equipment. One reason is the increasing tendency for consumers to purchase fitness equipment through such avenues as TV "800 number" infomercials, mail order catalogues, and the Internet. Since each product must be individually shipped to each customer, great pains are taken to reduce the shipping weight, as shipping charges represent a very substantial part of the total cost of putting the product into the customer's hands. Notice that even though freeweights are the training method most preferred by professional athletes and body builders, one never sees free weights advertised in TV infomercials. Shipping charges are the reason. In fact most exercise devices sold on TV conspicuously avoid the inclusion of weights in any form, relying instead on rubber bands, flexing bows, springs, or the user somehow lifting his or her own weight through clever mechanisms—anything to lower the shipping weight.

Probably the main objective of the present invention is to put an entire set of high quality freeweights, as well as an aerobic stepping platform into the hands of the average consumer for a price that he or she can afford. To this end, it is an object to make these freeweights fillable with water by the consumer to save on shipping charges. It is an object to make them blow moldable because that is the most economical way to produce fillable containers (provided that the shape can be blow molded, and that the volume of production justifies the relatively high tooling costs), further reducing the cost to the consumer. It turns out that the process of blowmolding is quite an art in itself, and definitely does not lend itself to "just any shape". It was therefore an object of this invention to come up with a general configuration for both barbells and dumbells which could be blow-molded from inexpensive, durable materials such as HDPE, while being strong enough, heavy enough when full, and ergonomic enough to provide years of quality workouts. Also, due to the desirability of a bench to sit or lay upon for weightlifting, and a platform for aerobic stepping routines, a way to incorporate a deck which can be used as such a bench or platform into our ensemble has been found.

Having the entire set of freeweights provided with contours making them fitably stackable will make them easier to store when not in use, which is important for the consumer, and will make them easier to package and ship, which has important benefits for both the producer and the consumer.

Another object is to design a barbell having the foot insertion features revealed by this inventor in U.S. Pat. No. 5,716,305 with improved blow-moldability for thicker, heavier models.

A blow-molded, water-filled freeweight will have a much softer feel than one made of metal, and will more resiliently contact the human body, especially if it impacts, or falls on a user. Thus a barbell or dumbell of this design will be perceived as being more "user-friendly" than a conventional one, and will hence be more enthusiastically received by the novice weight lifter, and others who may be uncomfortable with, or intimidated by, iron barbells. The new fitness phenomenon known as "pump", in which freeweights of relatively low mass are utilized in aerobic classes would be a likely application for such a barbell or dumbell.

For these reasons a set of such fillable freeweights may come to be seen as superior to regular iron weights, regardless of manufacturing or shipping costs. Since nowadays a TV 800 number sales campaign is often considered successful even if it only breaks even, with the profits, if any, made in the "backend" or retail market, and the TV campaign providing primarily product awareness, it is important that this product be one which people will want to purchase from stores as well. Since it will often be on the shelves next to conventional freeweights, it should be competitive in both quality and price. It should also have high enough quality and durability to attract and withstand institutional use.

One more advantage to the present invention is that it maximizes the weight of each unit for its given size, concentrating the weight closely around the hands to minimize inertial torques and use as little material as necessary.

A further object of this invention is to provide a single unit barbell type of device with built in handles which does not require the use of a conventional bar.

A still further object of this invention is to provide a blow-moldable, fillable barbell type of device in which the longitudinal axis of each handle may be at a nonzero angle to the longitudinal axis of the unit as a whole.

The non-circular, generally elliptical cross-section of the handles aids in the user's control of the weight; Since the weight must be rotated by the user's hand about the axis of the handle during the course of most movements, a handle having a smooth surface and a circular cross section would almost serve as a bearing, rather than a positive secure interface between the user's hand and the weight.

One more object of the present invention is to provide a simple, easy to use fitness device which may be employed in a variety of exercises such as curls, presses, tricep extensions, bent over rows, squats, and other traditional barbell and dumbell exercises, as well as pushups, situps, leg extensions, stair stepping routines, etc., with minimal reconfiguration between exercises.

Yet one more object of the present invention is to provide a versatile, multiple use exercise device which is less likely than metal weights to cause personal injury or property damage if accidentally dropped.

An important advantage over most exercise devices and packages suitable for sale by mail order catalogue, TV 800-number infomercials, or the internet is that, due to the multiplicity of its component parts, a versatile ensemble such as disclosed herein may be enjoyed by several friends or family simultaneously, greatly enhancing its overall utility, increasing the likelihood of many persons, who prefer to work out with a partner, to be satisfied and so to continue a program of exercise with it.

In accordance with the foregoing objectives, a method for producing an entire interlocking set of fillable, blow-moldable freeweights, with an attachable deck is disclosed. Herein is described a versatile ensemble having true utility as freeweights, which may be inexpensively manufactured and shipped, with the additional advantages that it may be used for situps, pushups, leg extensions, and stair stepping type exercises. Since the barbells and dumbells, as well as the platform may be emptied and refilled at any time, and indeed, may even be used as an interim container for foodstuffs, fuel, or beverages, they are ideal as a fitness aid when traveling, or on extended expeditions, maneuvers, or camping trips.

Finally, having achieved in our dumbell a design for a stackable, blow-moldable container for a liquid, having an integral handle which is located at the center of gravity, within a recess that fully penetrates from one side of the container to the other, so that the walls of the recess serve to physically enhance the rigidity of the container, it is apparent that such a container has great utility beyond a weightlifting application. Such a container might be used for the packaging and storage of any number of pourable consumer products, from milk and juice, to dry pet foods and breakfast cereals. Beer, wine, water, and soft-drinks might also be advantageously marketed by the use of such inexpensive, ergonomic, stackable containers. Stacks of such containers could be incorporated into retail displays, forming a stable base for signs or 3D constructs. Motor oil or antifreeze, for example, might be good candidates for such packaging. Also, industrial chemicals, solvents, inks, and cleaners might be well suited. The advantages of such a container would be:

1. When full and therefore most heavy, it would be gripped it at its center of gravity, whether carrying or pouring, so that torques on the hand due to gravity would be minimized.
2. The walls of the recess, (which penetrates the bottle completely from one side to an opposite side) facilitate structural communication between two opposing sides of the bottle, adding to the overall rigidity of the container.
3. Stackability greatly enhances ease of bulk packaging, shipping, storage and display.
4. When emptied of its original contents, such a container may be filled with water and used as an exercise device. This fact might be used as a promotional sales incentive. Consumers may be thereby induced to buy two of a product to obtain a pair of dumbells, or several sizes of a product to obtain a complete interlocking set.

Still further objects and advantages will become apparent from a consideration of the ensuing description and drawings.

BRIEF DESCRIPTION OF THE DRAWING FIGURES

FIG. 27 is a perspective view of the fifteenth embodiment of the present invention standing on its end, taken from the front.

FIG. 28 is a perspective view of several members of the fifteenth embodiment of the present invention stacked one atop the next, taken from the left rear.

FIG. 34 is a perspective view of the eighteenth embodiment of the present invention, with its members slightly separated, taken at an oblique angle from above.

FIG. 35 is a perspective view of the eighteenth embodiment of the present invention, with its members stacked together, taken at an oblique angle from above.

FIG. 36 is a perspective view of the twentieth embodiment of the present invention, with its members slightly separated, taken at an oblique angle from below.

FIG. 37 is a perspective view of the twentieth embodiment of the present invention, with its members slightly separated, taken at an oblique angle from below.

FIG. 38 is a perspective view of the twenty-first embodiment of the present invention, taken from the upper right front.

FIG. 39 is a perspective view of the twenty-third embodiment of the present invention, taken from the upper right front.

FIG. 40 is a sectional view of the twenty-first embodiment of the present invention, taken from the front.

FIG. 41 is a sectional view of the twenty-second embodiment of the present invention, taken from the front.

FIG. 42 is a sectional view of the twenty-third embodiment of the present invention, taken from the front.

FIG. 43 is a perspective view of the twenty-fourth embodiment of the present invention, with its members slightly separated, taken from the upper right front.

FIG. 44 is a perspective view of the twenty-fourth embodiment of the present invention, with its members attached, taken from the upper right front.

FIG. 45 is a perspective view of the twenty-fifth embodiment of the present invention, with its members slightly separated, taken from the upper right front.

FIG. 46 is a perspective view of the twenty-fifth embodiment of the present invention, with its members attached, taken from the upper right front.

FIG. 47 is a perspective view of the twenty-sixth embodiment of the present invention, with its members slightly separated, taken from the upper right front.

FIG. 48 is a perspective view of the twenty-sixth embodiment of the present invention, with its members attached, taken from the upper right front.

LIST OF REFERENCE NUMBERS IN DRAWING FIGURES

Figure 1:
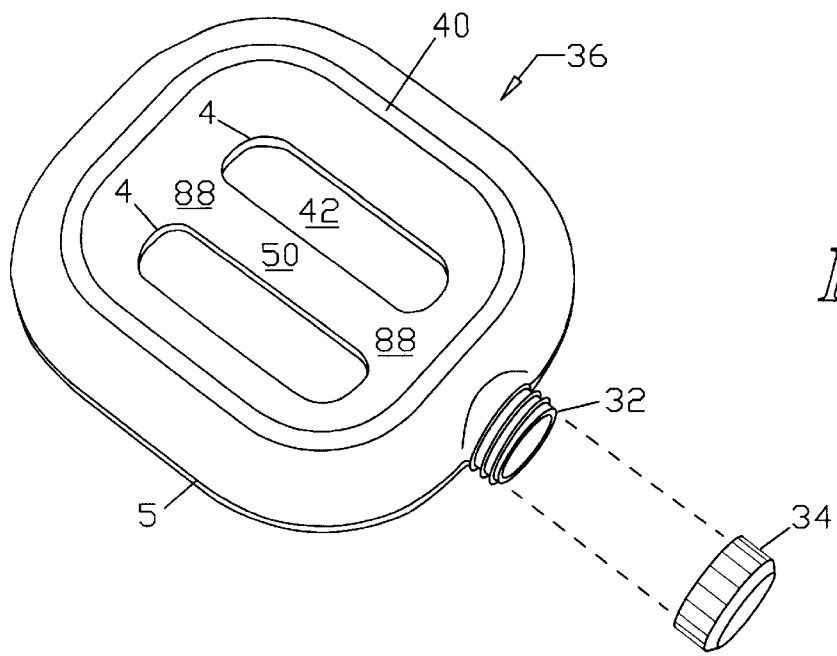
FIG. 1 is a perspective view of the first embodiment of the present invention, taken from the upper right front.

D1–D5 depth of barbell or dumbell
W1–W5 sectional width of barbell or dumbell
4 inner parting line for barbell or dumbell 5 outer parting line for barbell or dumbell
6 outer parting line for deck
20 protrusions on barbell for attachment of weights
22 attachable weights for barbell
24 bumps on attachable weights
25 dimples on protrusions
26 L-shaped channels on protrusions
27 threads on protrusions
28 inner parting line of attachable weight
29 outer parting line of attachable weight
30 barbell
32 threaded filling neck
34 threaded cap
36 rounded-rectangular donut-shaped dumbell
36L, 36R rounded-rectangular donut-shaped ends of barbell (left and right)
40 top surface
40L, 40R top left surface, top right surface,
40S top surface of deck
40C top-central surface (top surface of middle region)
41 raised lip
42 recess (hand access recess, or aperture, spanned by handle)
42L, 42R left and right recess, or aperture, (hand access recess)
44 narrowest middle region (hand access recess midsections)
46 bottom surface
46L, 46R bottom left surface, bottom right surface
46S bottom surface of deck
46C bottom-central surface (bottom surface of middle region)
47 groove or channel
50 generally tubular handle
62 inward-swooping front surface (middle front of barbell)
66 inward-swooping rear surface (middle rear of barbell)
70 middle region
78 integrally molded base
80 user's trunk accommodation central cutout
82L, 82R foot insertion voids (left and right)
83L, 83R elongate multipurpose apertures (left and right)
83 very elongate multipurpose aperture
86 a directional axis along which the mold opens and closes
88 flare at each end of tubular handle
90 center of mass when filled
92 longitudinal axis passing through center of mass
94 deck member which fits on top of dumbells
95 deck member which fits on top of barbell
96 bottom indentation (void formed into the bottom of deck member to fit top of barbell)
96L, 96R bottom indentations (left and right void formed into the bottom of deck member, to fit on top of dumbells)
97 base member
98 base indentation (formed into the top of each base member)
99 a conventional water cooler or dispenser

DETAILED DESCRIPTION OF THE PREFERRED EMBODIMENTS

The design of the present invention, a multiple use exercise product, is optimimized to be produced as one or more durable, specially shaped containers, to be filled with a pourable ballast substance such as water, sand, or shot by the end user. Notwithstanding this fact, it should be understood that the general design discussed here could easily be filled with a similar ballast substance at the point of manufacture, or at any convenient point along the distribution chain. In addition, a product with this general design could be filled with a hardening, or cementitious ballast substance at the point of manufacture, as are many conventional weightlifting products, or even simply be produced as a solid unit, either from a molding or machining process.

Regardless of the intricacies of the different embodiments discussed, each of the preferred embodiments of the present invention is, in its simplest essence, a plastic bottle with a cap, and may be manufactured in the same manner as are other heavy duty bottles, jugs, and containers. As is well known in the art, most plastic bottles are preferentially produced by the technique of blow molding, ideally from a two piece mold. The present invention has been designed to be easily produced from a two piece mold using conventional blow molding techniques. Not "just any shape" is conducive to the process, therefore great care has been taken to design the various elements of the present invention to be blow-moldable.

Reference should now be made to the drawing figures, on which similar or identical elements are given consistent identifying numerals throughout the various figures thereof. References to figure numbers direct the reader to the view(s) on which the element being described is best seen, although the element may also be seen on other views.

While the words top, bottom, left, right, front, and rear will be used to refer to surfaces and members described herein, it is to be understood that these descriptive terms are used only in the context of orientation of the devices in the illustrations under discussion, as during the many exercises and functions for which they are designed, members of the present invention are to be used in a multiplicity of orientations. Similarly, the words vertical and horizontal will be used to describe the present invention oriented as illustrated in the figures under discussion.

Regarding any two handed (barbell) versions of this invention, due to the fact that it is designed in large part for engagement by both hands or both feet simultaneously, the present invention should be understood to exhibit approximate mirror symmetry from left to right, with the exception of the fill nozzle and cap. Similar structures and features will be numbered with the letter suffixes L and R when they differ primarily in their left/right symmetry.

While most of the surfaces comprising the present invention are not in the strictest sense planar, but are ergonomically contoured, having for instance a slight bulge outward, the geometrically descriptive words such as parallel and perpendicular will be used in a best effort to describe the general orientation of these surfaces, with the understanding that these words are used in an approximate sense.

First Embodiment

Figure 2:
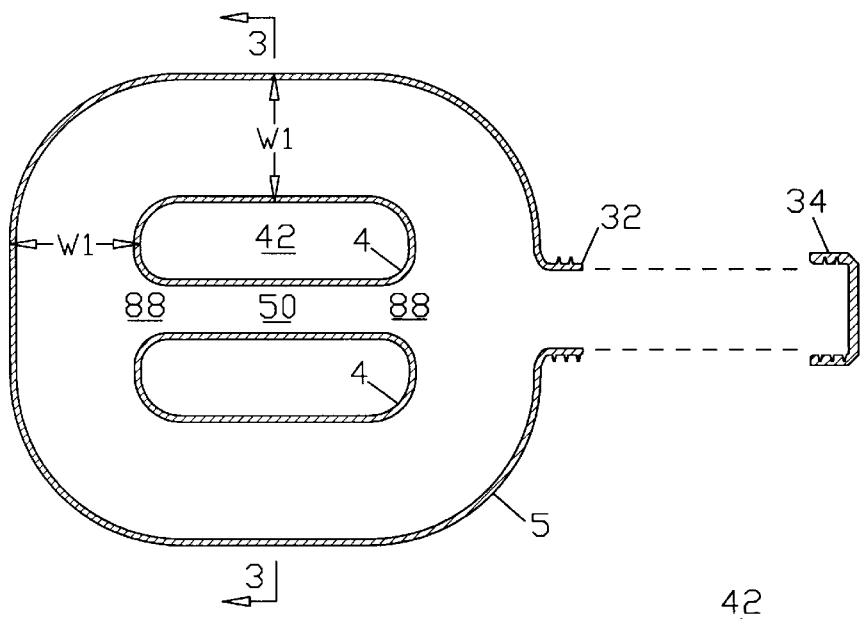
FIG. 2 is a sectional top view of the first embodiment. This view also applies to the fourteenth embodiment.
Figure 3:
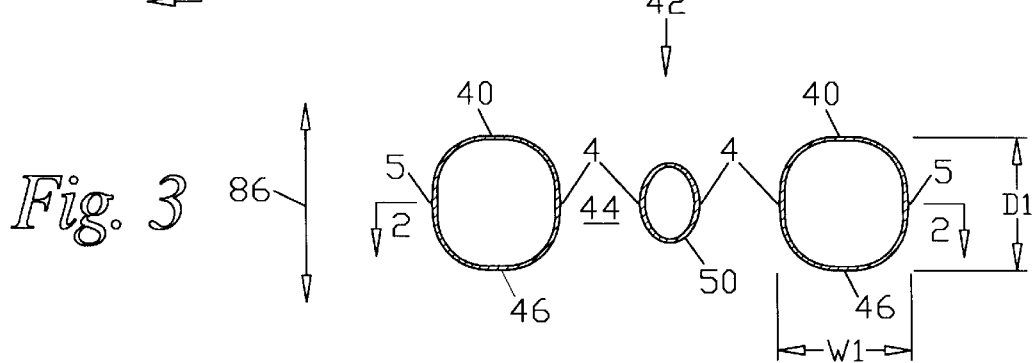
FIG. 3 is a sectional end view of the first embodiment. This view also applies to the sixth and eleventh embodiments.

FIGS. 1–3 show a hollow, blow-molded dumbell, having the shape of a rounded-rectangular donut 36, having a central recess 42 which fully penetrates it from a top side 40 to a bottom side 46. The central recess 42 is spanned at its narrowest middle region 44 by a tubular handle 50. The handle is provided with a flare 88 at each end, with the flares providing a smooth transition from the handle to the walls of the recess. Threaded cap 34 fits threaded filling neck 32, which is centered on one end of the dumbell, aligned with the handle. Since this hollow, fillable dumbell is designed to be produced from a two-piece mold, it has parting lines wherever the two halves of the mold meet. This fillable dumbell has an outer parting line 5, and two inner parting lines 4. Looking to FIG. 2, a section taken from along a directional axis 86 along which the mold used to produce this dumbell opens and closes (vertical in relation to the finished product), we can see that the outer parting line 5 begins and ends at the mouth of the threaded filling neck, following the widest part of the outer contour of this dumbell. The inner parting lines 4 have mirror symmetry about the handle, and follow the widest part of the handle, the widest parts of the flares connecting each end of the handle to the walls of the central recess, and the narrowest part of the recess. The walls of the recesses are provided with sufficient draft angles to allow easy part removal, since, as the part cools, it will tend to shrink to (tighten around) the mold in such an inner recess region.

In FIG. 3, we see a vertical section, taken from the direction of the filling neck. Sectional width W1, which is the perpendicular distance from an inner parting line 4 to outer parting line 5, is equal to 2.5 inches. Depth D1, which is the vertical distance from top surface 40 to bottom surface 46 is also 2.5 inches. Dividing D1 by W1 yields a total blow ratio of 1:1, or simply 1. Since this blow ratio is less than 2, and the fillets between the recess walls and the top and bottom surfaces, as well as the fillets between the outer walls and the top and bottom surfaces have large radii relative to the overall size of the unit, this unit is certainly blow-moldable and should not suffer from excessive wall thinness in any area. The elliptical cross section of the handle lends a comfortable grip and helps to provide rotational stability of the unit around the axis of the handle. Since this elliptical cross section is by nature rounded and well less than twice as high as it is wide, it can be blow-molded like the rest of the unit. Notice that filling neck 32 is centered on outer parting line 5 and is oriented with its longitudinal axis perpendicular to the directional axis 86 along which the mold opens and closes, to allow the part to be successfully removed from the mold when opened. This dumbell will weigh about five pounds when full, and as you can see, the weight is localized closely around the handle to minimize torques on the hand.

This design represents a true groundbreaking improvement in dumbells, since it is the first known example of a unitary, rigid, fillable dumbell, having a handle located within a central recess, which is capable of being blow-molded. This fact allows freeweights of this general design to be economically produced in the range of thicknesses necessary for a fully functional graduated set. While the initial cost of a blow mold is much higher than that of most other types of molds (since it is a complex item which must be machined from large blocks of aluminum and have many unique and exacting features, such as liquid-coolant channels, blowpins, knockouts, pinchoffs, etc.), for high volume production it nevertheless remains the most cost-effective method of production for hollow plastic containers.

Second Embodiment

Figure 4:
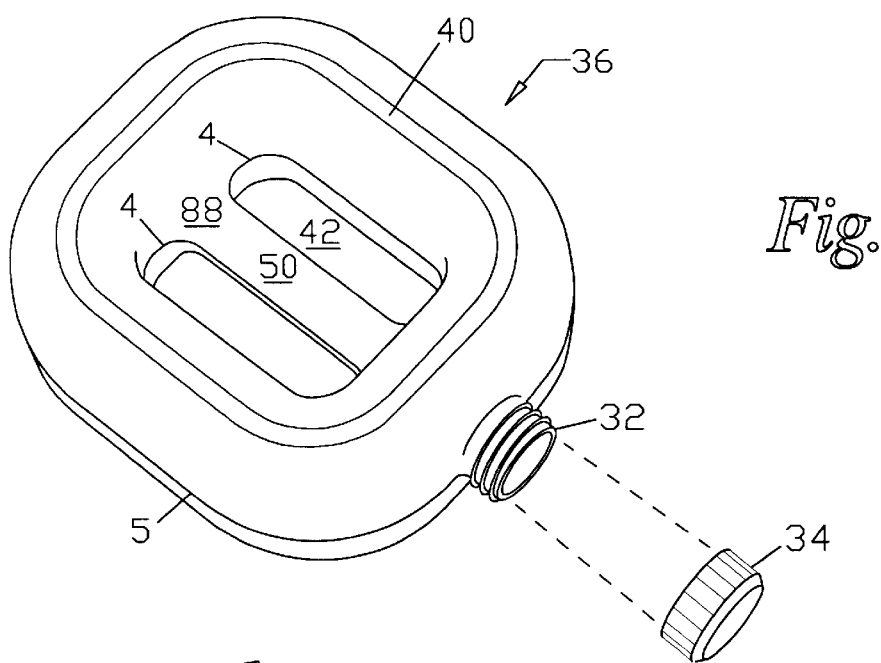
FIG. 4 is a perspective view of the second embodiment of the present invention, taken from the upper right front.
Figure 5:
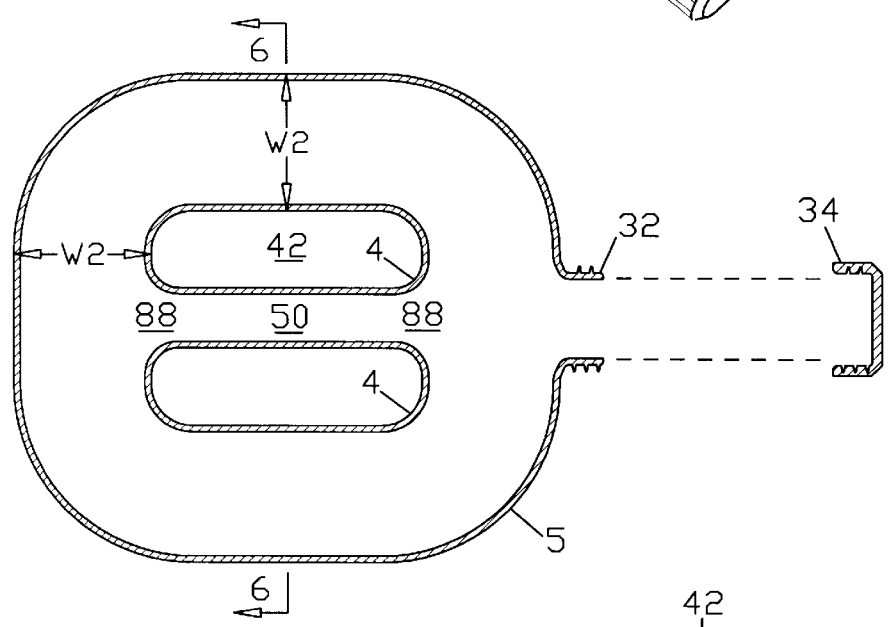
FIG. 5 is a sectional top view of the second embodiment. This view also applies to the fourteenth embodiment.
Figure 6:
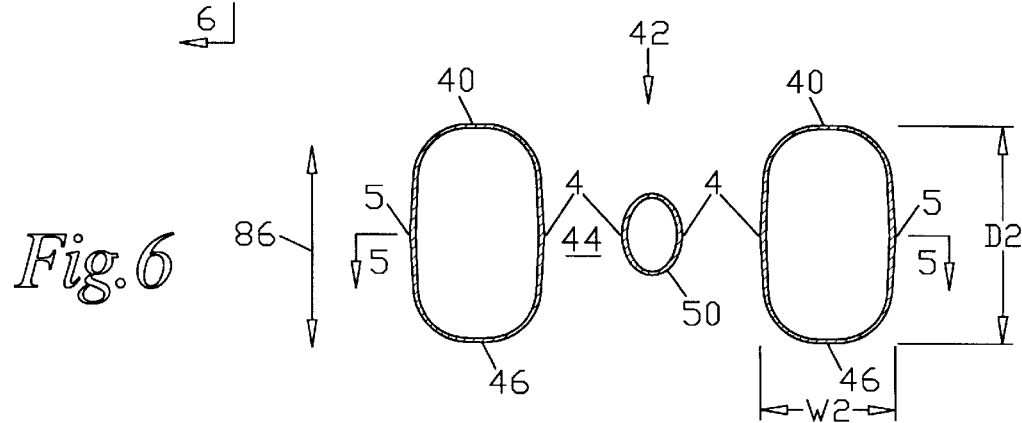
FIG. 6 is a sectional end view of the second embodiment. This view also applies to the seventh, twelfth, and thirteenth embodiments.

FIGS. 4–6 show a thicker, heavier dumbell, which is otherwise similar to the first dumbell. In this case, sectional width W2, the distance between inner and outer parting lines is 2.5 inches, while overall depth D2, the distance from top surface 40 to bottom surface 46 is 4 inches. Dividing D2 by W2 yields a total blow ratio of 1.6, still within the requirements of blow-moldability. This unit weighs about 8 lbs. when full.

Third Embodiment

Figure 7:
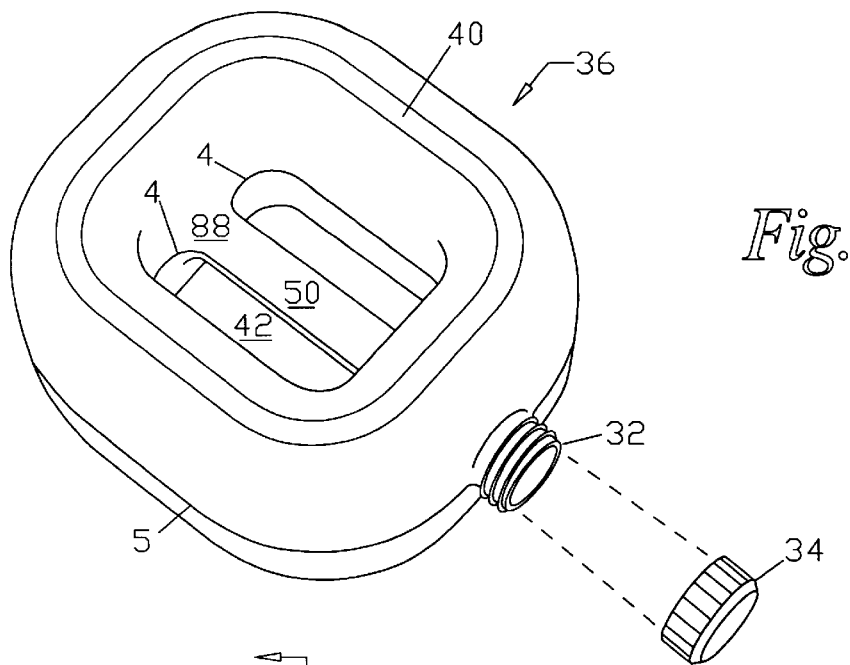
FIG. 7 is a perspective view of the third embodiment of the present invention, taken from the upper right front.
Figure 8:
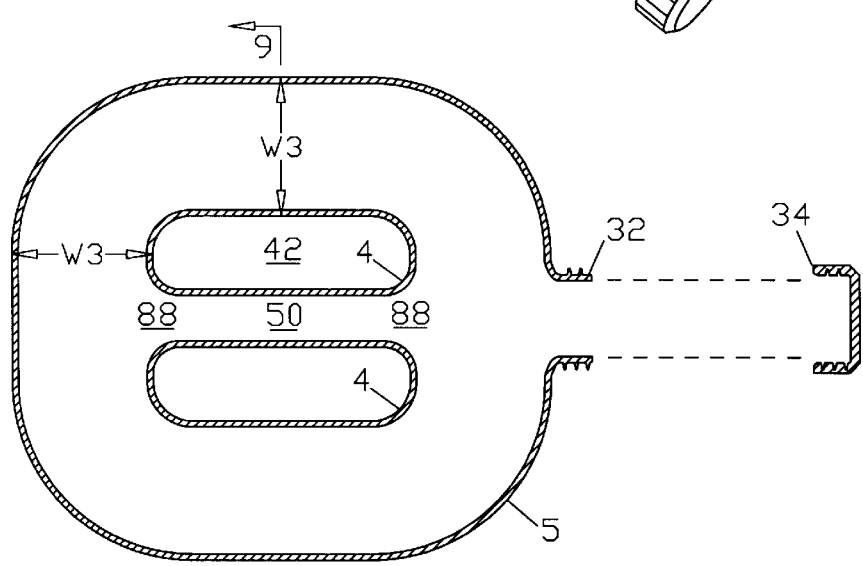
FIG. 8 is a sectional top view of the third embodiment. This view also applies to the fourteenth embodiment.
Figure 9:
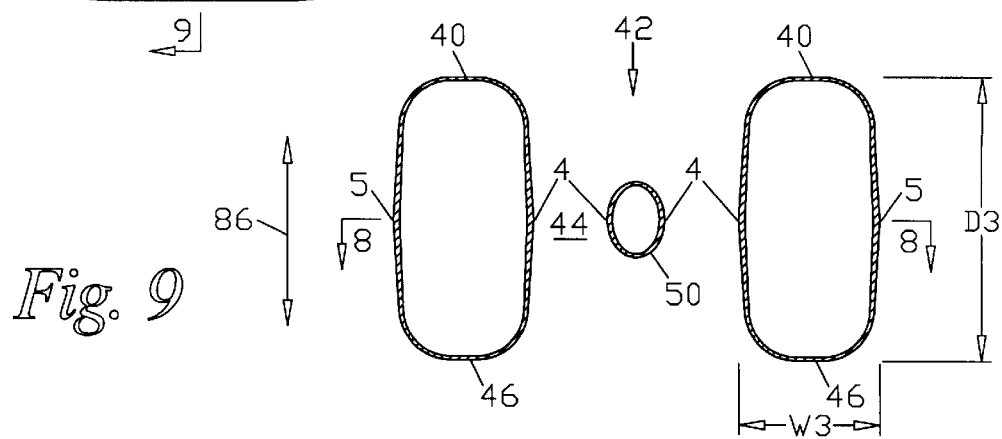
FIG. 9 is a sectional end view of the third embodiment. This view also applies to the eighth embodiment.

In FIGS. 7–9, we see a still thicker version, having a sectional width W3 of 2.75 inches, and a depth D3 of 5.5 inches. This unit when filled weighs in at about 12 lbs. When we divide the depth D3 by the width W3, we see that this unit has a blow ratio of exactly 2. It is the opinion of very experienced blow-molding production personnel, as well as seasoned mold designers that this unit could be successfully blow molded, even though it pushes the limits in terms of blow ratio, since the fillets between the recess walls and the top and bottom surfaces, as well as the fillets between the outer walls and the top and bottom surfaces have large radii relative to the overall size of the unit.

Fourth Embodiment

Figure 10:
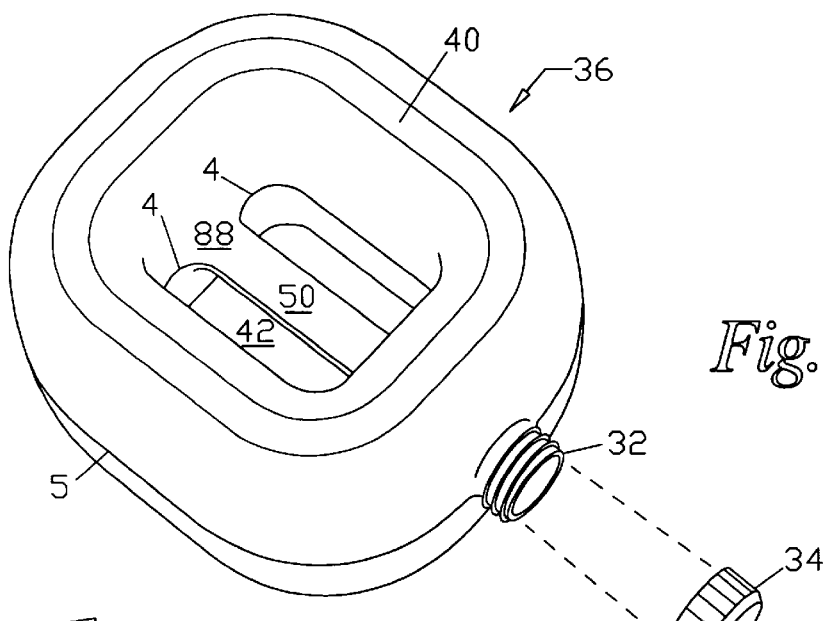
FIG. 10 is a perspective view of the fourth embodiment of the present invention, taken from the upper right front.
Figure 11:
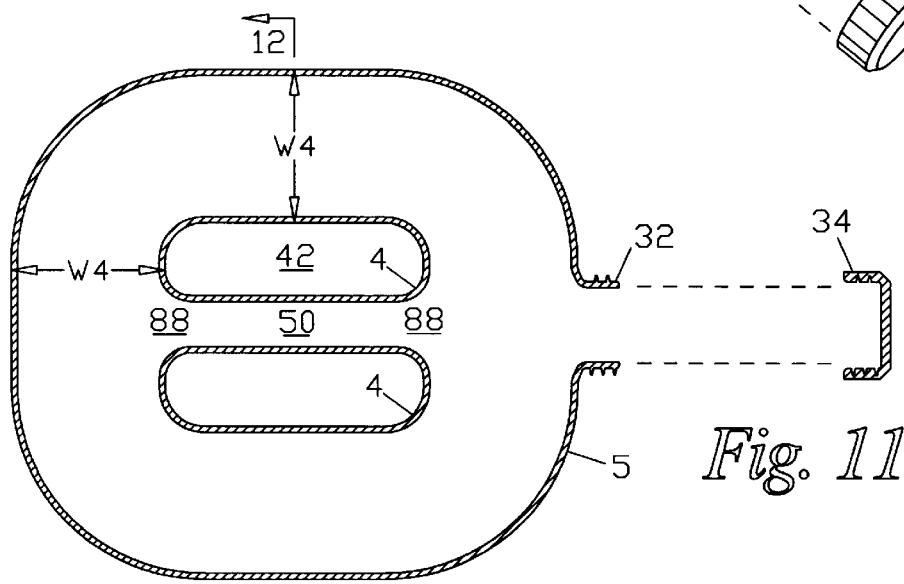
FIG. 11 is a sectional top view of the fourth embodiment. This view also applies to the fourteenth embodiment.
Figure 12:
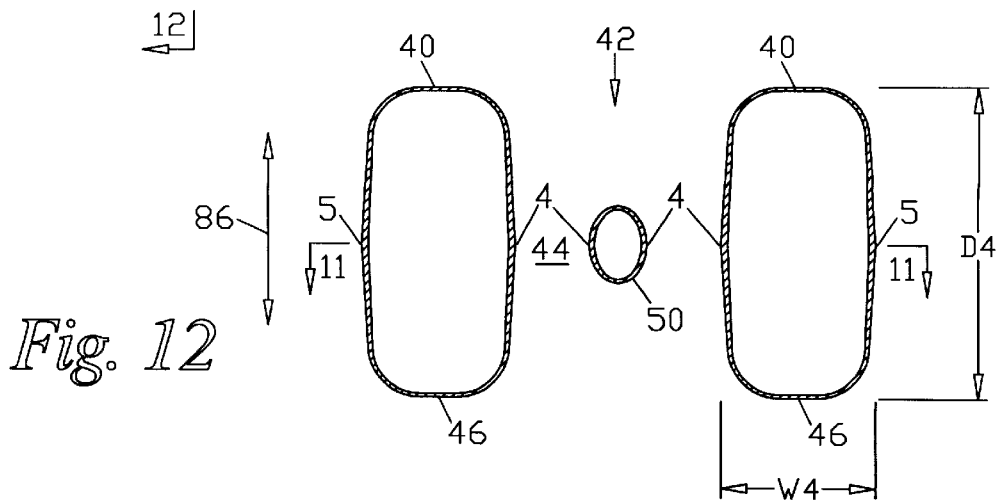
FIG. 12 is a sectional end view of the fourth embodiment. This view also applies to the ninth embodiment.

FIGS. 10–12 show a yet heavier fillable dumbell, again having a blow ratio of exactly 2, with a sectional width W4 of 3 inches, and a depth D4 of 6 inches. Again this blow-moldable dumbell is as deep as it can be, given its width, and is only blow-moldable at this maximum blow ratio because of the generous roundedness of its corners. This dumbell weighs about 15.5 lbs. when full.

Fifth Embodiment

Figure 13:
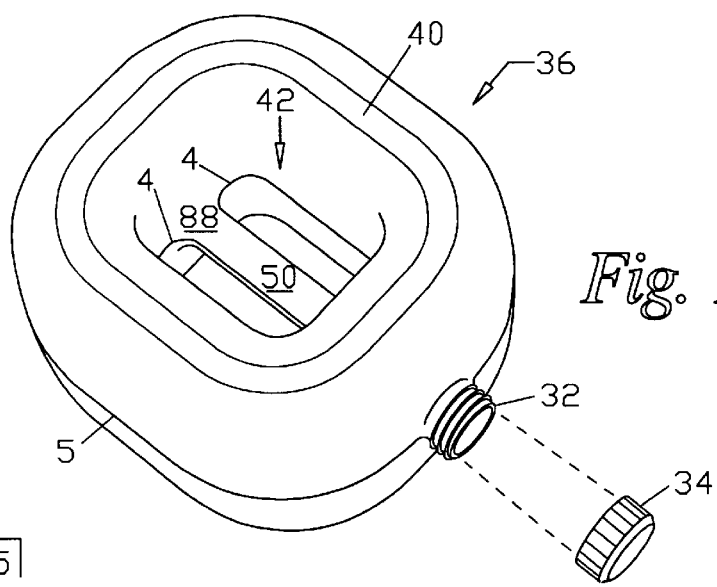
FIG. 13 is a perspective view of the fifth embodiment of the present invention, taken from the upper right front.
Figure 14:
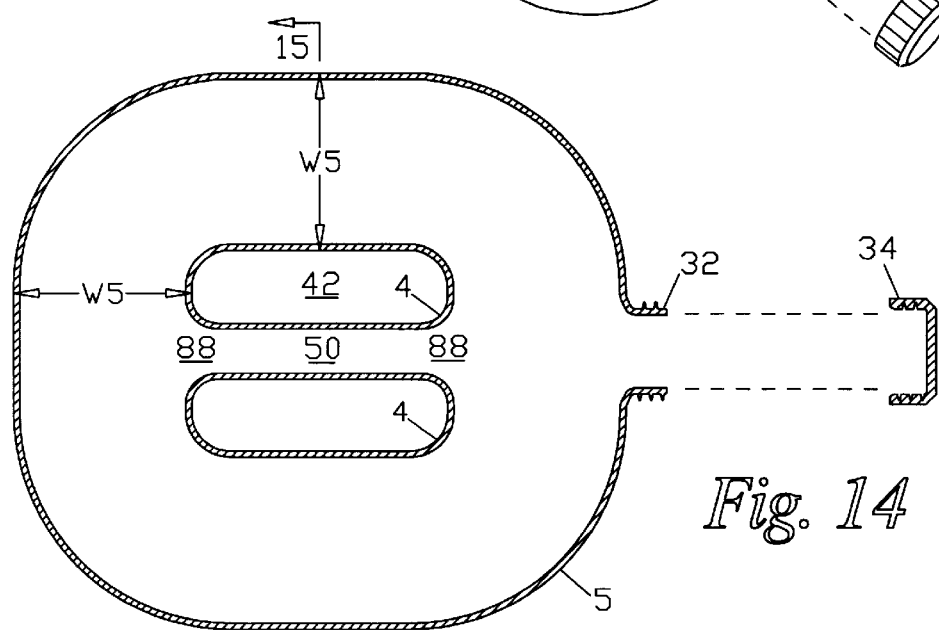
FIG. 14 is a sectional top view of the fifth embodiment. This view also applies to the fourteenth embodiment.
Figure 15:
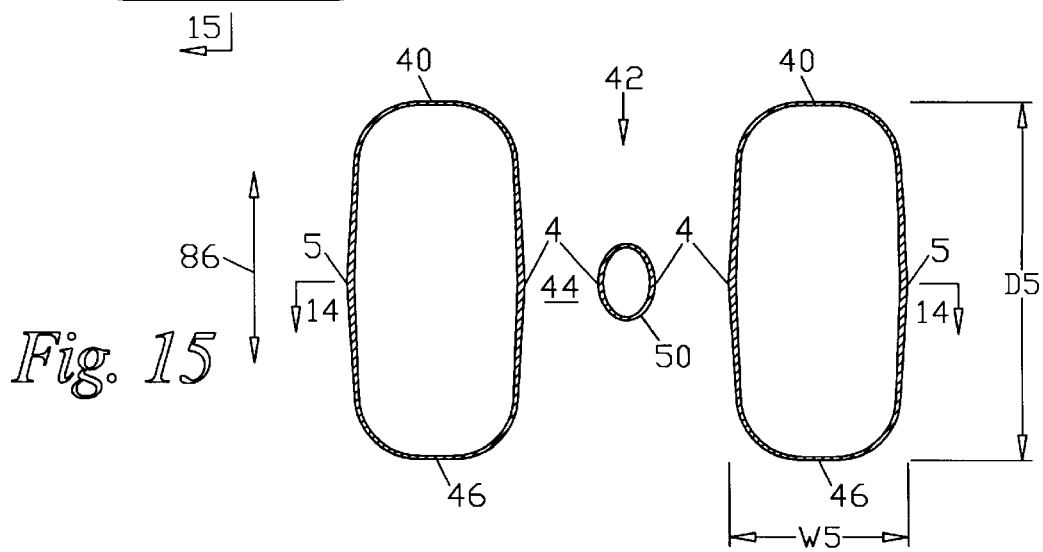
FIG. 15 is a sectional end view of the fifth embodiment. This view also applies to the tenth, and the twentieth through twenty-fifth embodiments.

In FIGS. 13–15, a 22 lb. fillable, blow-moldable dumbell is illustrated, having a sectional width W5 of 3.5 inches, and a depth D5 of 7 inches. Once again we're pushing the envelope of blow-moldability, at a blow ratio of exactly 2 (7/3.5=2), with only the liberally rounded corners saving us from having either unacceptably thin areas, or even a breach of the material. This one-handed freeweight is heavy enough for serious weight-training. The universally available aqueous ballast closely surrounds the user's hand in a uniform manner, minimizing torques experienced by the hand. Best of all, in sufficient numbers, this extremely useful and high-quality fitness product may be produced inexpensively by the technique of blow-molding, and is lightweight when empty, therefore inexpensive to ship.

Sixth Embodiment

Figure 16:
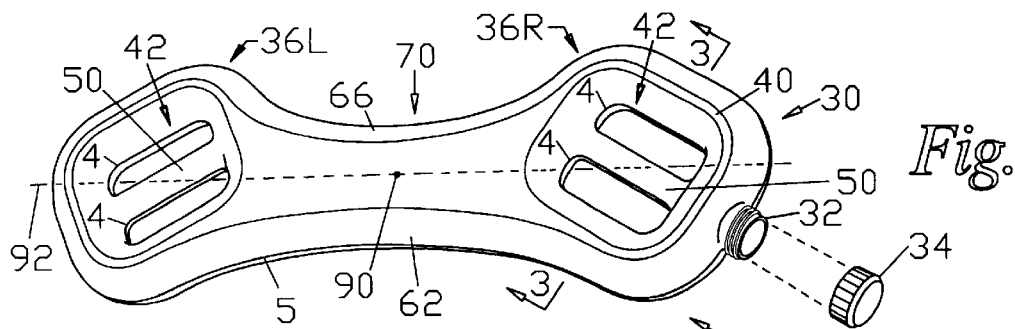
FIG. 16 is a perspective view of the sixth embodiment of the present invention, taken from the upper right front.

FIGS. 16 and 3 show a blow-moldable, fillable two-handed barbell 30, which could be thought of as essentially two of the previously described rounded rectangular donut-shaped dumbells 36 of the first embodiment, here labeled 36L and 36R, fluidly connected by and merged with a middle region 70 which smoothly blends with the contours of the "donuts" where it meets them. The handles 50, as well as the recesses 42 which they span, are each oriented at a 30 degree angle to, and disposed along, an imaginary longitudinal axis 92 passing through the center of mass 90 of the barbell when filled. This placement enhances the comfortable engagement of a user's hands with the unit, while maintaining minimal rotational moment induced by gravity.

The entire rounded rectangular donut shaped regions 36L and 36R which surround each handle are also oriented at the same 30 degree angle as the handles themselves. This has the effect of maintaining a constant blow-ratio all the way around the handle, eliminating areas which may have been "pinched" into having an unacceptably high blow ratio, had the handles and the recesses which contain them been disposed at an angle without the surrounding "donuts" being similarly angled (See U.S. Pat. No. 5,716,305 to this inventor). The angled disposition of these rounded-rectangular donut-shaped regions also has the effect of making the portion of each "donut" which is aimed at, and merged with, the barbell's middle region be a narrow "corner" rather than a wider, flat side. This reduces interference of these donut-shaped end regions with the user's trunk, in addition to facilitating a smoother transition between the outer contours of the donut-shaped end regions 36L, 36R and the inward-swooping front and rear surfaces, 62 and 66 respectively, of the middle region 70. These inward swooping surfaces are important because they fit the contours of a user's trunk, allowing full or more nearly full extension and contraction of the muscles during exercises. The important concept here is that orienting each of the rounded-rectangular donut-shaped end regions 36L and 36R at an angle results in a configuration where the exterior surfaces of these end regions which face the center of the barbell are angled similarly to, and so easily merge with, the inward-swooping front and rear surfaces 62 and 66. Altogether this configuration allows the handles to be closer together, while still providing a comfortable accomodation for the user's trunk at full extension and contraction, than if the end regions 36L and 36R were not angled.

Since this hollow barbell is designed to be produced from a two-piece mold, it has parting lines wherever the two halves of the mold meet. An outer parting line 5 follows the exterior of the shell at its widest point, when viewed from a direction in which the mold opens and closes. Inner parting lines 4, similarly to the inner parting lines 4 of the dumbell of the first embodiment, each follow the widest part of a handle, the widest parts of the flares connecting each end of the handle to the walls of its containing recess, and the narrowest part of the recess itself, allowing the finished part to be easily removed from the mold when opened. The walls of the recesses are provided with sufficient draft angles to allow easy part removal, since, as the part cools, it will tend to shrink to (tighten around) the mold in such an inner recess region. A single threaded filling neck 32, centered on outer parting line 5, is disposed with its longitudinal axis perpendicular to the directional axis 86 along which the mold opens, with this position facilitating the removal of the finished part from the mold. Since the entire barbell is fluidly connected, this single filling neck is sufficient to fill the entire barbell. It bears mention at this point that the series of the instant invention, including U.S. Pat. No. 5,716,305, represents a breakthrough in that these are the first known examples of a unitary one piece hollow moldable barbell designed to be produced as a single unit from a two-piece mold. In addition they are the first integral fillable barbell to have a filling neck, and to have it located on the parting line. This placement of the neck, which allows it to be threaded, and therefore allows the inclusion of threaded cap 34, greatly enhances the ease and reliability of the seal over examples of the prior art not having such a threaded neck. It is desirable that this neck be placed in such a location as to avoid contact with the user during exercises, and where the unit may be filled completely therethrough without leaving any air pockets or bubbles. Bearing those requirements in mind, the threaded filling neck protrudes perpendicularly from the center of a flat side nearest one end of the barbell, at the same 30 degree angle as that entire end of the unit, rather than protruding from the actual distal end of the unit as aligned with the longitudinal axis of the unit as a whole. This placement on a flat area allows the neck to effectively protrude less than if it projected from a "corner" area. The fact that the filling neck doesn't protrude from the very end of the unit reduces the overall length of the unit by the length of the neck, and also reduces the likelihood that the neck will contact other people or objects during use.

Now, let us discuss the aspects of this design regarding its capability of being produced by the blow-molding process. Firstly, the middle region, being wider than it is high, as well as having rounded corners where its sides intersect, is the kind of shape blow molders like to see, and presents no problem from that standpoint. In addition the handles, while having an elliptical cross section, are still not greatly taller than they are wide in cross-section, and so, like the handles of the dumbell in the first embodiment, will also present no problem as far as blow-moldability. Looking to FIG. 3, a vertical section, taken from the direction of the filling neck, we can see that, again like the dumbell of the first embodiment, the width W1, which is the perpendicular distance from inner parting line 4 to outer parting line 5, is equal to 2.5 inches. Depth D1, which is the vertical distance from top surface 40 to bottom surface 46 is also 2.5 inches. Dividing D1 by W1 yields a total blow ratio of 1:1, or simply 1. Since this blow ratio is less than 2, and the fillets between the recess walls and the top and bottom surfaces, as well as the fillets between the outer walls and the top and bottom surfaces have large radii relative to the overall size of the unit, with the handles generously flaring at each end, this unit is certainly blow-moldable and should not suffer from excessive wall thinness in any area.

This design represents a true groundbreaking improvement in barbells, since it is the first known example of a unitary, fillable barbell capable of being blow molded. This fact allows barbells of this general design to be economically produced in the range of thicknesses necessary for a fully functional set of graduated barbells. While the initial cost of a blow mold is much higher than that of most other types of molds (since it is a complex item which must be machined from large blocks of aluminum and have many unique and exacting features, such as liquid-coolant channels, blowpins, knockouts, pinchoffs, etc.), for high volume production it nevertheless remains the most cost-effective method of production for hollow plastic containers. This barbell weighs about 15 lbs. when full.

Seventh Embodiment

Figure 17:
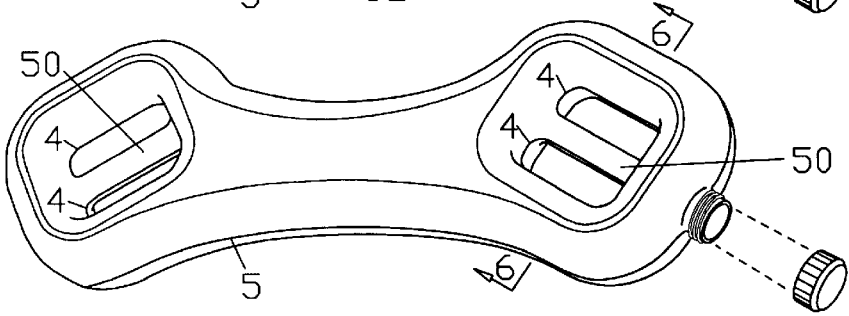
FIG. 17 is a perspective view of the seventh embodiment of the present invention, taken from the upper right front.

FIGS. 17 and 6 depict a thicker, heavier barbell, which is otherwise similar to the first barbell. In this case, sectional width W2, the distance between inner and outer parting lines is 2.5 inches, while overall depth D2, the distance from top surface 40 to bottom surface 46 is 4 inches. Dividing D2 by W2 yields a total blow ratio of 1.6, still within the requirements of blow-moldability. This unit weighs about 22.5 lbs. when full.

Eighth Embodiment

Figure 18:
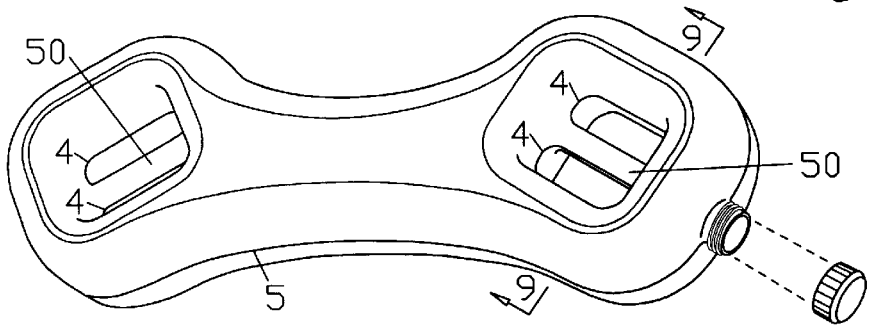
FIG. 18 is a perspective view of the eighth embodiment of the present invention, taken from the upper right front.

In FIGS. 18 and 9, we see a still thicker version, having a sectional width W3 of 2.75 inches, and a depth D3 of 5.5 inches. This unit when filled weighs in at about 35 lbs. When we divide the depth D3 by the width W3, we see that this unit, in its critical end regions, has a blow ratio of exactly 2. It is the opinion of very experienced blow-molding production personnel, as well as seasoned mold designers that this unit could be successfully blow molded, even though it pushes the limits in terms of blow ratio, since the fillets between the recess walls and the top and bottom surfaces, as well as the fillets between the outer walls and the top and bottom surfaces have large radii relative to the overall size of the unit.

Ninth Embodiment

Figure 19:
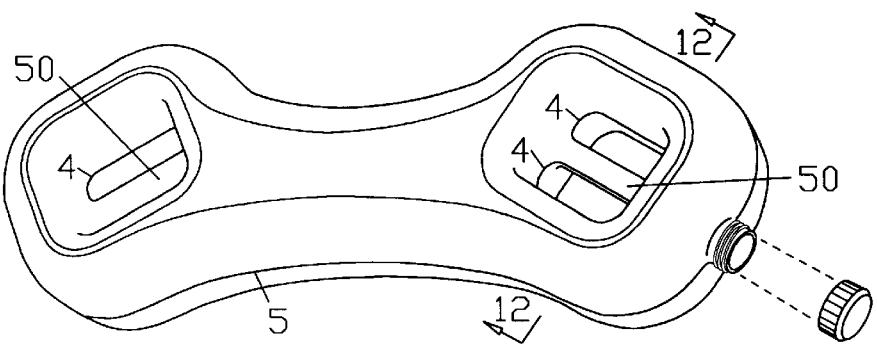
FIG. 19 is a perspective view of the ninth embodiment of the present invention, taken from the upper right front.

FIGS. 19 and 12 show a yet heavier fillable barbell, again having a blow ratio of exactly 2, with a sectional width W4 of 3 inches, and a depth D4 of 6 inches. Dividing D4 by W4 yields a blow ratio of 2. Again this blow-moldable barbell is as deep as it can be, given its width, and is only blow-moldable at this maximum blow ratio of 2 because of the generous roundedness of its corners. This barbell weighs about 45 lbs. when full.

Tenth Embodiment

Figure 20:
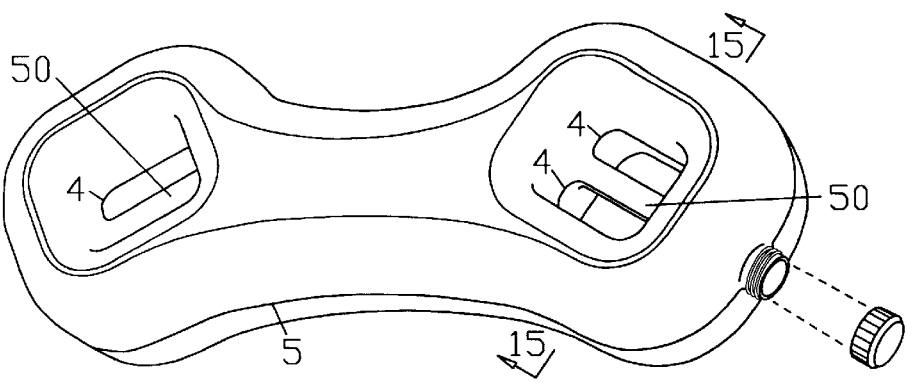
FIG. 20 is a perspective view of the tenth embodiment of the present invention, taken from the upper right front.

In FIGS. 20 and 15, a 60 lb. fillable, blow-moldable barbell is illustrated, having a sectional width W5 of 3.5 inches, and a depth D5 of 7 inches. Dividing D5 by W5 shows that, once again we're pushing the envelope of blow-moldability, at a blow ratio of exactly 2, with only the liberally rounded corners saving us from having either unacceptably thin areas, or even a breach of the material.

Eleventh Embodiment

Figure 21:
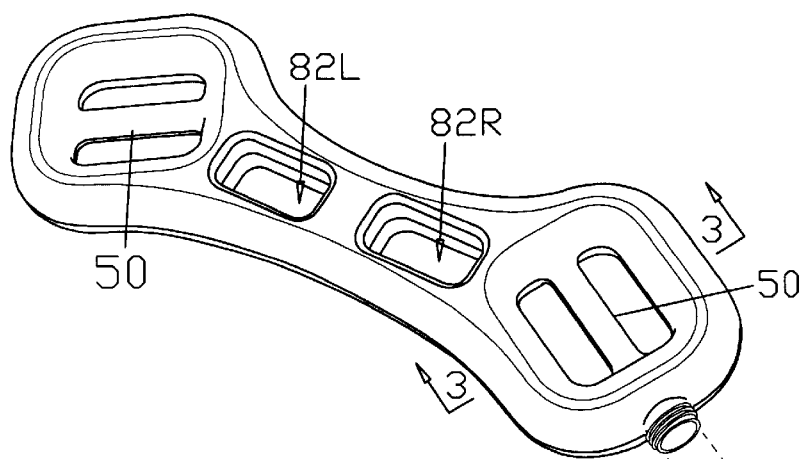
FIG. 21 is a perspective view of the eleventh embodiment of the present invention, taken from the upper right front.

FIGS. 21 and 3 show a blow-moldable barbell of the present invention, having separate voids 82L and 82R in its middle region for the fitably engaging insertion of the feet, toe first. With a user's feet inserted, the barbell provides resistance for leg extensions, or can hold down the user's feet for the enhanced performance of situps.

Twelfth Embodiment

Figure 22:
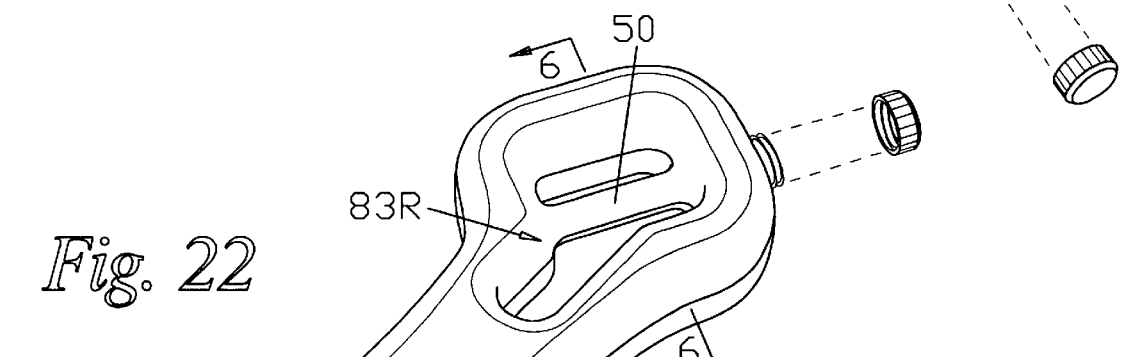
FIG. 22 is a perspective view of the twelfth embodiment of the present invention, taken from the upper right front.

FIGS. 22 and 6 show a blow-moldable barbell having voids for the insertion of the feet, like the previous embodiment, but in this case those voids are merged with and smoothly connected to their adjacent hand recesses, to form elongate multi-purpose apertures 83L and 83R, each of which is spanned by a handle 50 while also having a foot insertion function.

Thirteenth Embodiment

Figure 23:
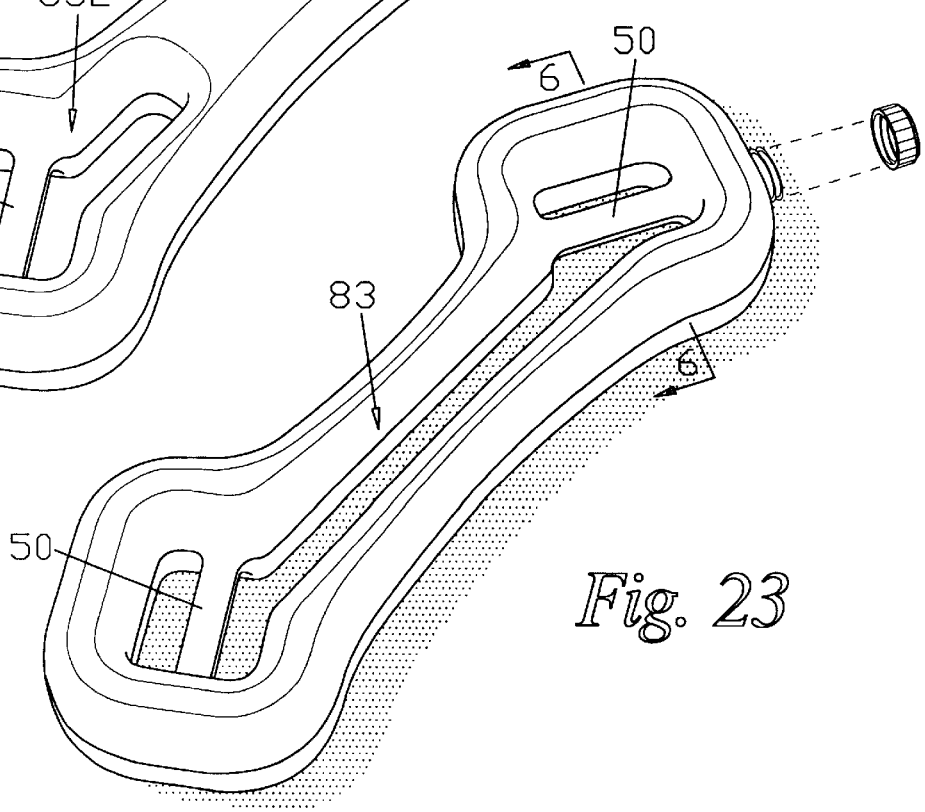
FIG. 23 is a perspective view of the thirteenth embodiment of the present invention, taken from the upper right front.

FIGS. 23 and 6 show a blow-moldable barbell having a single, very elongate multi-purpose aperture 83. This multi-purpose aperture is spanned by a handle 50 near each end and has foot-engaging function in its middle region. Topologically, this unit comprises a single elongate hollow toroid (loop) spanned by two hollow cylindrical handles.

Fourteenth Embodiment

Figure 24:
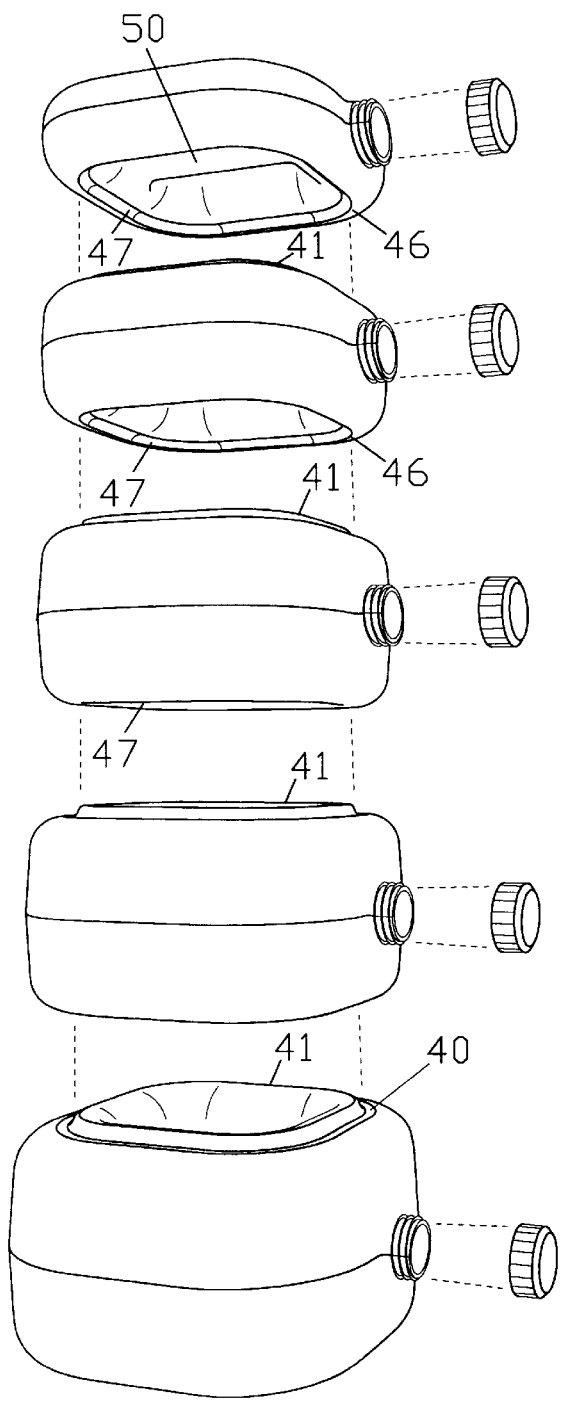
FIG. 24 is a perspective view of the fourteenth embodiment of the present invention, taken from the right front.
Figure 25:
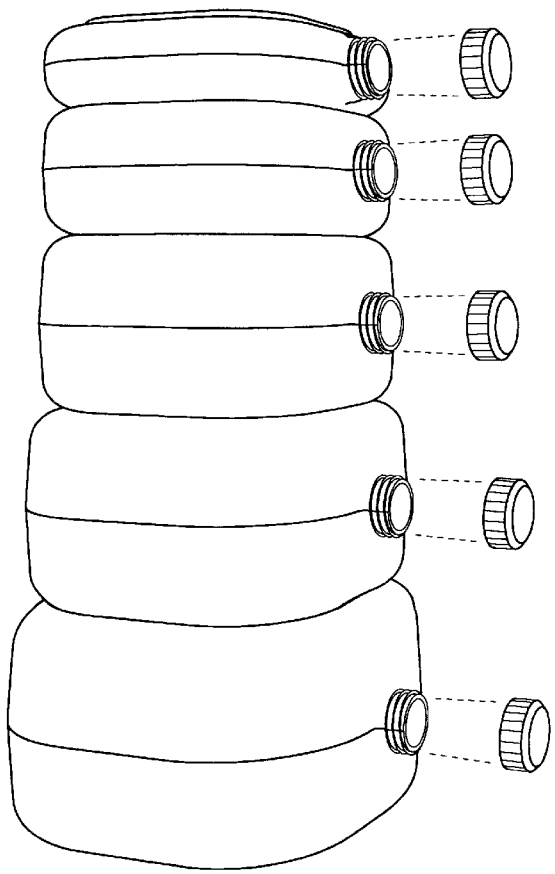
FIG. 25 is a perspective view of the fourteenth embodiment of the present invention, taken from the right front.
Figure 26:
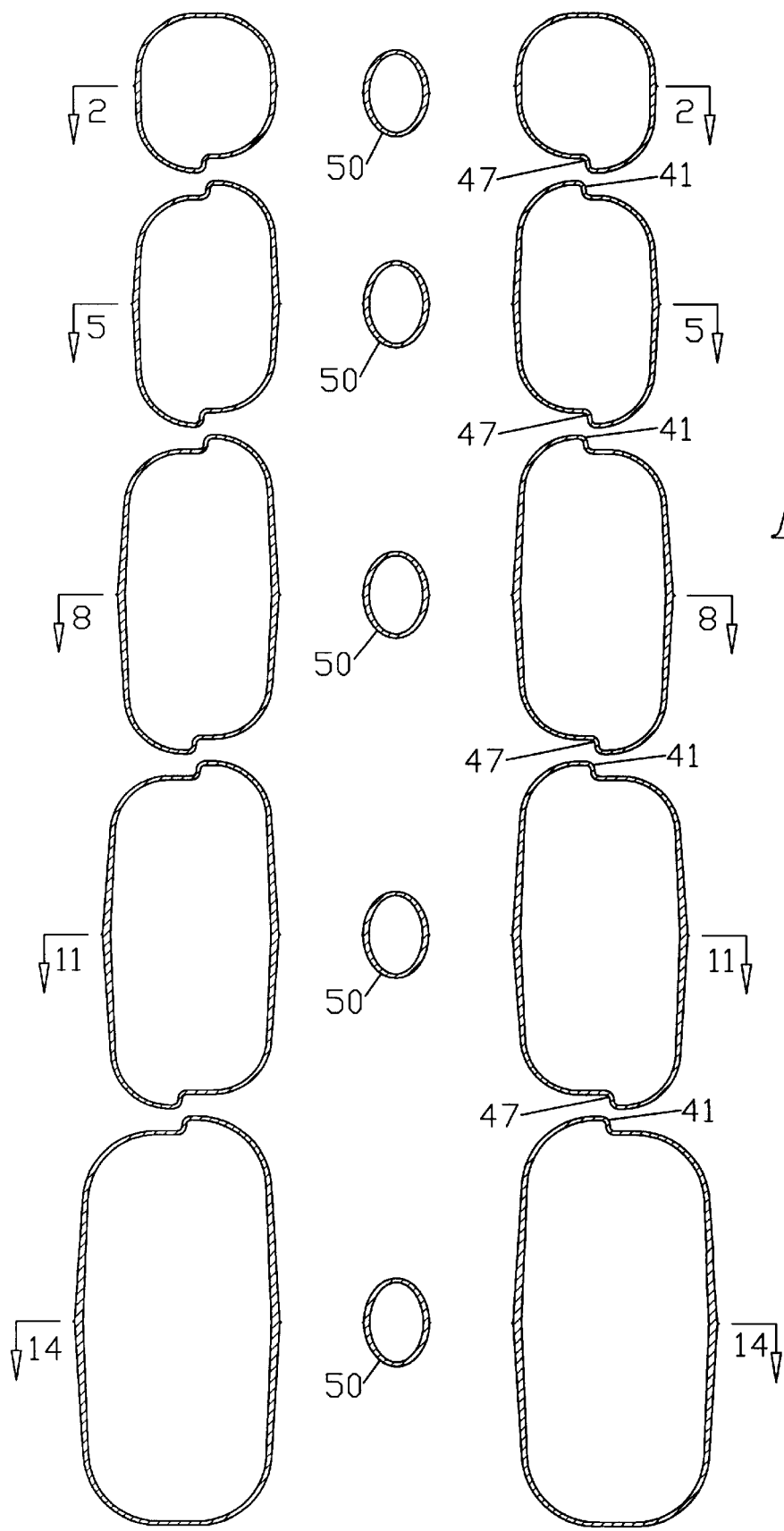
FIG. 26 is a sectional end view of the fourteenth embodiment of the present invention.

FIGS. 24, 25, and 26, as well as the sectional top views in FIGS. 2, 5, 8, 11, and 14 show a graduated set of stackable, interlocking dumbells of the present invention. These dumbells are similar to those already described in embodiments 1–5, except that they are provided on their top and bottom surfaces with mutually interlocking contours, in this case taking the form of a vertically offset raised lip 41, or ledge, formed into the top surface 40 of each dumbell, circumscribing the upper periphery of the hand access recess 42, and a corresponding groove 47, or channel, formed into the bottom surface 46, of the next smaller dumbell of the set, circumscribing the lower periphery of its hand access recess. With the edges of these lips and indentations smoothly rounded for comfort and moldability, these dumbells smoothly interlock for greatly enhanced stackability. Packaging, shipping, and storage are all made more convenient by this revolutionary feature. (Note that in this case, the top of the smallest dumbell need not have a raised lip, and the bottom of the largest dumbell need not have a groove, because these surfaces do not contact any other dumbell.)

Fifteenth Embodiment

Figure 49:
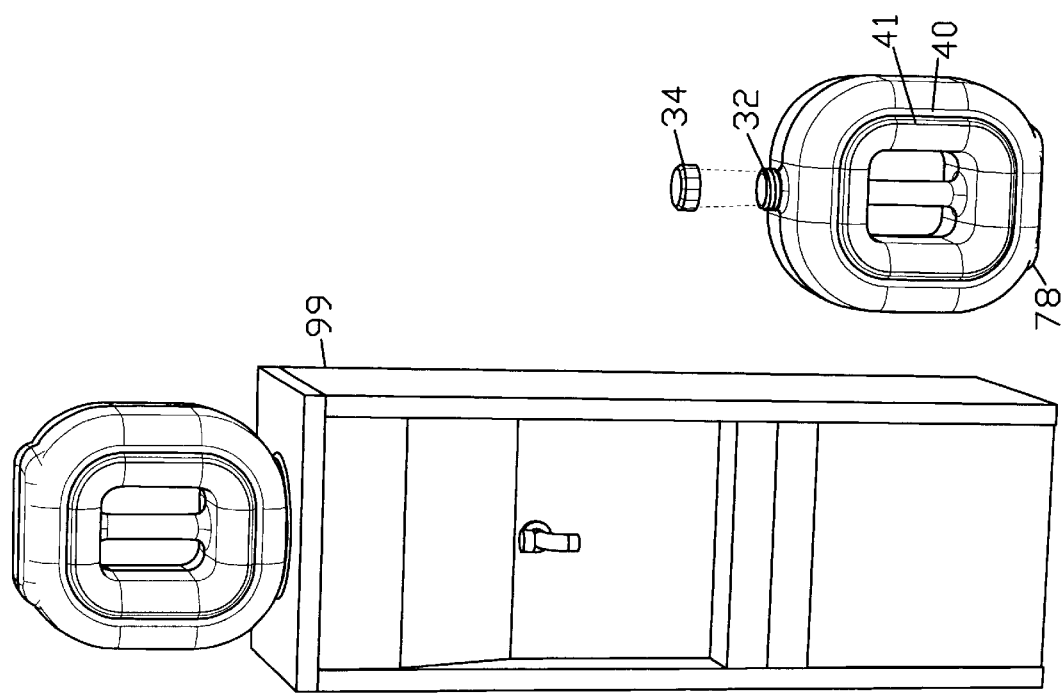
FIG. 49 is a front perspective view of the fifteenth embodiment.

Having achieved in our dumbell a design for a stackable, blow-moldable container for a liquid, having an integral handle which is located at the center of gravity, within a recess that fully penetrates from one side of the container to the other, so that the walls of the recess serve to physically enhance the rigidity of the container, I believe such a container has great utility beyond a weightlifting application. In FIGS. 27, 28 and 49 are illustrated a version of the present invention similar to the stackable dumbells of the fourteenth embodiment, but in this case each container is configured to stack with others of its own size. These containers have the same size and shape as the dumbells already described in the fifth embodiment, except that they are provided on their top and bottom surfaces with mutually interlocking contours, in this case, as in the fourteenth embodiment, taking the form of a vertically offset raised lip 41, or ledge, formed into the top surface 40 of each container, circumscribing the upper periphery of the hand access recess 42, and a corresponding groove or channel 47 formed into the bottom surface 46, circumscribing the lower periphery of its hand access recess. With the edges of these lips and channels smoothly rounded for comfort and moldability, these blow-molded containers conveniently interlock for greatly enhanced stackability. Bulk packaging, shipping, and storage are all made more convenient by this revolutionary feature. In addition, each container is provided with an integrally molded base 78 at the opposite end from the filling neck, so that it may be stood on its end with the filling neck facing straight upward, similarly to a conventional bottle or jug when stood upright. Such a container might be used for the packaging and storage of any number of pourable consumer products, from milk and juice, to pet foods and breakfast cereals. Beer, wine, and soft-drinks might also be advantageously be marketed by the use of such inexpensive, ergonomic, stackable containers. Stacks of such containers could be incorporated into retail displays, forming a stable base for signs or 3D constructs. Motor oil or antifreeze, for example, might be good candidates for such packaging. Also, industrial chemicals, solvents, inks, paints, and cleaners might be well suited, as would bulk liquid foodstuffs, such as soybean oil for bakeries and restaurants.

Any fitness, health, or active-lifestyle oriented drink, such as Gatorade, mineral water, Mountain Dew, etc. could be marketed in such a container with the idea being that the consumer automatically gets a free dumbell by simply purchasing the product. Consumers may be thereby induced to buy two of a product to obtain a matching pair of dumbells. Alternatively, if the product is offered in several sizes of container which interlock one with the next, as do our dumbells of the fourteenth embodiment, the consumer could be induced to purchase two of every size of a product to obtain a complete interlocking set of matching pairs of dumbells.

Since our new design locates the handle in the center of the container, minimal gravitational torques will act upon it. In such a configuration, the container may be held upright, poured, or carried with equal ease, using only one hand. Even a five-gallon blow-molded water bottle for use with a conventional water cooler or dispenser 99, when made according to our new, stackable design having a central handle, is easy to store and ship, and one person can easily carry a pair—one in each hand! From the water-delivery company's point of view, this means less physical strain on the delivery person, and less chance of a work-related injury claim. In addition, since the bottles are stackable, a normal truck may be used, instead of a special truck outfitted with customized bottle racks. From the customer's point of view, the bottles are easier to carry and load onto a dispenser. Drinking water sold in stores is usually available in containers up to two and a half gallons, but not larger because larger containers, as currently configured, would be unwieldy and hard to carry. Our new, easy-to-carry design might permit larger sizes, such as five-gallon, to be successfully dispensed from retail stores.

Blow-molded plastic containers in general are designed to have their walls as thin as possible, since when less material is used, the container is more economical to produce. While thin walls are desirable from an economic standpoint, a thin-walled container may suffer from inadequate rigidity, and be unable to hold its shape, especially when filled with a hot liquid, as is often the case in bottling operations for foodstuffs. Many blow-molded bottles therefore incorporate strengthening ribs, webs, grooves, panels, or other contours to enhance the stiffness of their walls. In our improved design, the central recess 42, spanned by the handle 50, fully penetrates the container from one side to an opposing side. The walls of this central recess constitute a physical communication between the central regions of these two opposing sides of the container. This communication in turn prevents these sides from bulging outward from the pressure exerted by the contents. Since these two opposing sides will also have the largest surface area of any pair of opposing sides, this represents a real enhancement in strength, and will stabilize the shape of a container which might otherwise severely bulge when filled, especially with a hot liquid. The handle, spanning the central recess, further serves to unify the structure of the container. The walls of the recess also add to the stability of the container when it is under the weight of several layers of stacked containers placed on top of it. The vertical outer sides and inner walls combine to fortify the container against any region being vertically crushed when several filled containers are stacked above it. The physical communication of the inner walls with the top and bottom sides, combined with the inherent shear strength of those inner walls, help to prevent a rolling type of deformation of the container in any horizontal direction.

Sixteenth Embodiment

Figure 29:
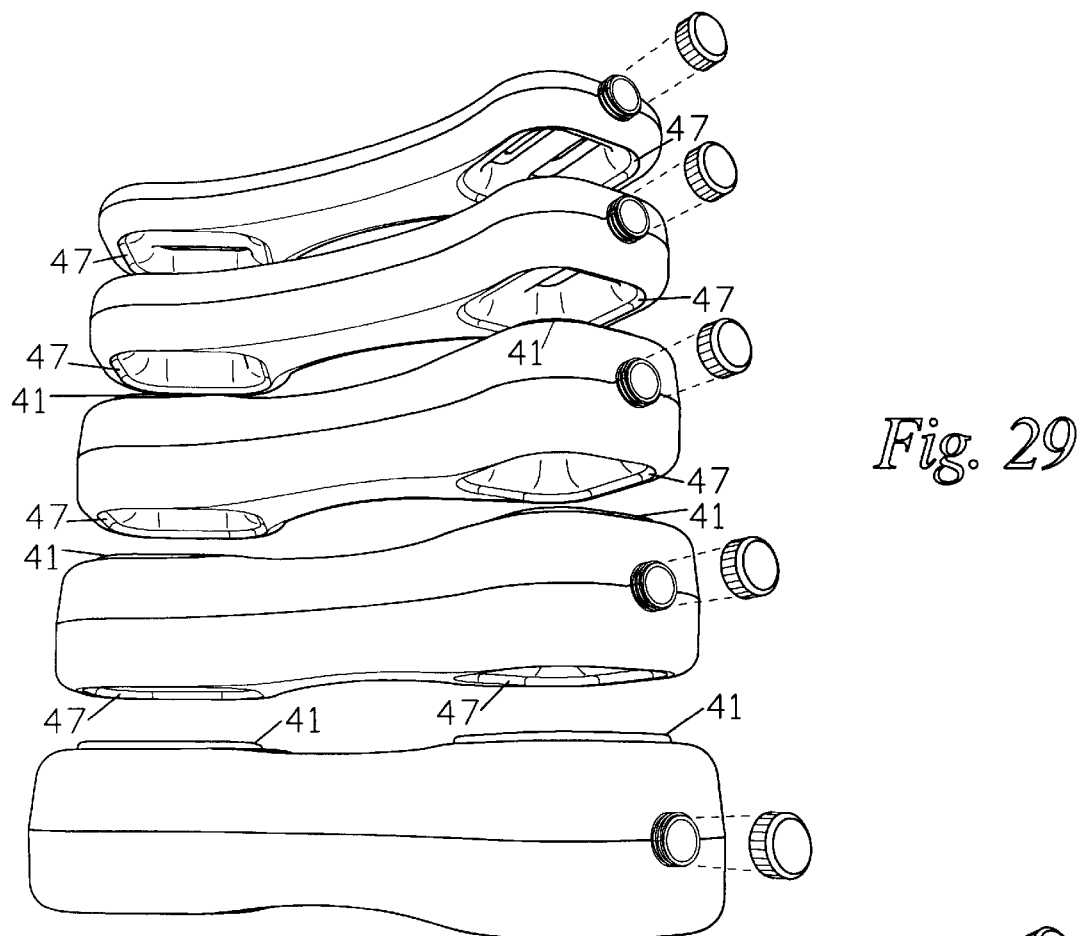
FIG. 29 is a perspective view of the sixteenth embodiment of the present invention, with its members slightly separated from one another, taken from the right front.
Figure 30:
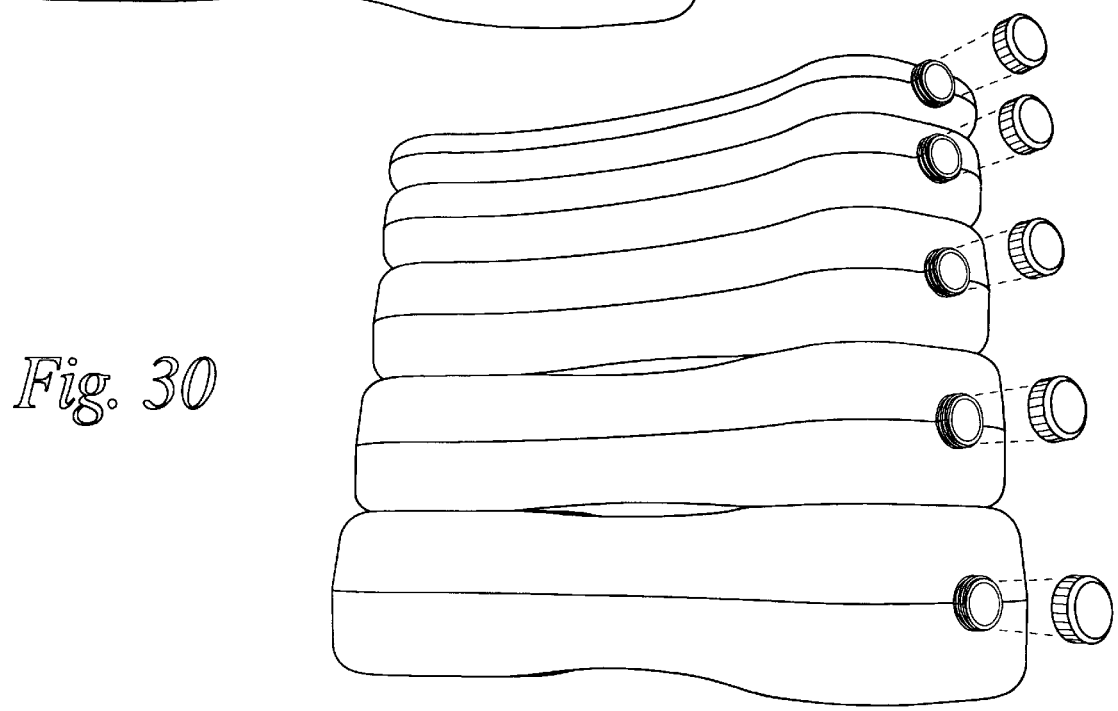
FIG. 30 is a perspective view of the sixteenth embodiment of the present invention, with its members stacked atop one another, taken from the right front.

FIGS. 29 and 30 show a graduated set of stackable, interlocking barbells of the present invention. The sectional end view of FIG. 26 may also be applied to the present embodiment. These barbells are similar to those of embodiments 6–10, except they have the same type of mutually interlocking contours 41 and 47 as the dumbells just described in the fourteenth and fifteenth embodiments. Again, packaging, shipping, and storage are all greatly facilitated by this feature. For instance, with this interlocking feature, packaging could be as simple as stacking the product, adding a printed cardboard insert and binding the entire assembly with transparent shrinkwrap plastic.

Seventeenth Embodiment

Figure 31:
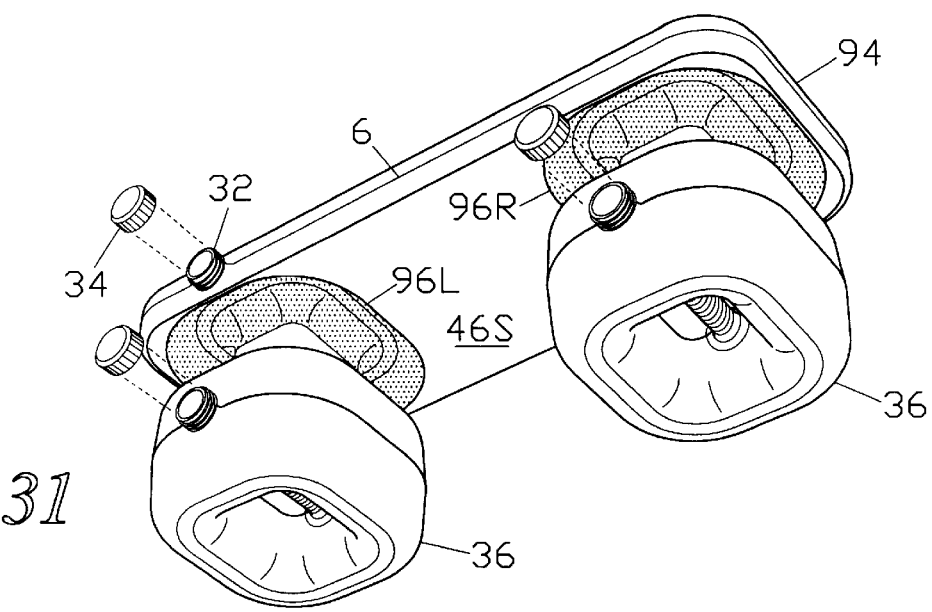
FIG. 31 is a perspective view of the seventeenth embodiment of the present invention, with its members slightly separated from one another, taken at an oblique angle from below.
Figure 32:
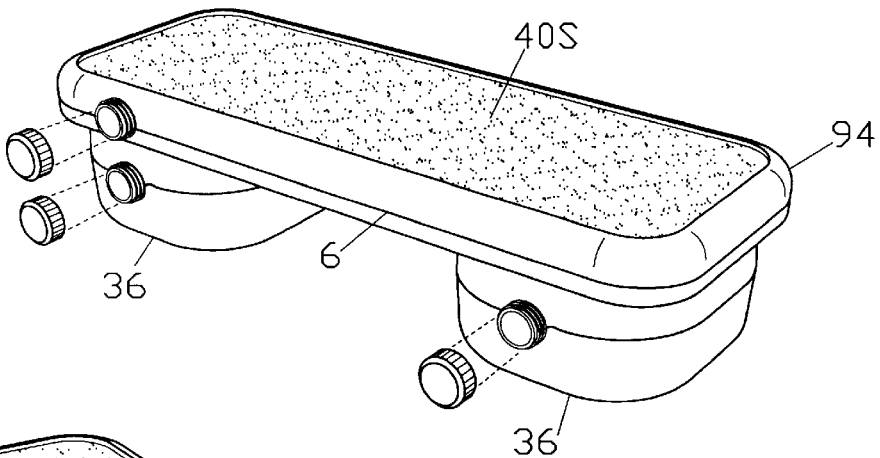
FIG. 32 is a perspective view of the seventeenth embodiment of the present invention, with its members stacked together, taken at an oblique angle from above.
Figure 33:
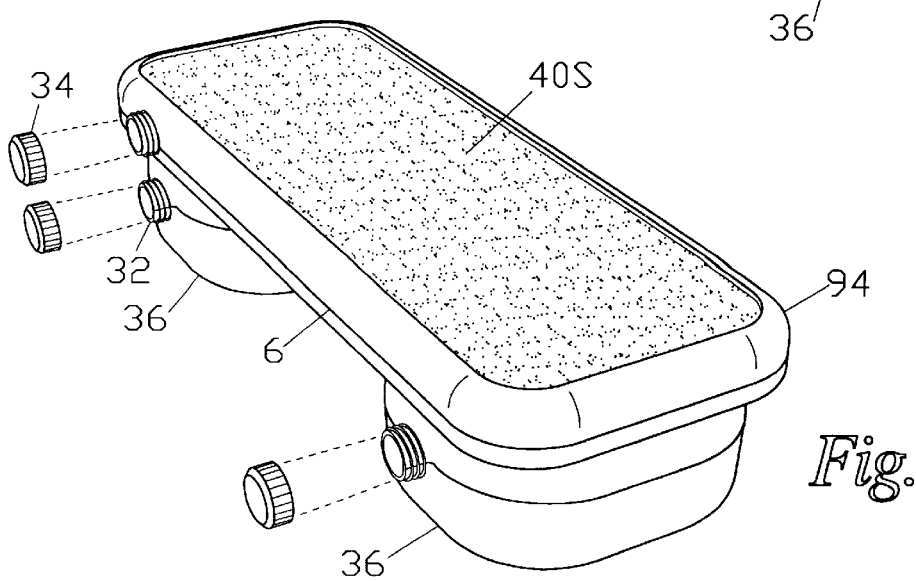
FIG. 33 is a perspective view of the seventeenth embodiment of the present invention, with its members stacked together, taken at an oblique angle from above.

FIGS. 31, 32, and 33 show a blow-molded fillable deck member 94, fitably mountable atop two of the fillable dumbells of the present invention. The deck member 94 has a top surface 40S and an opposed bottom surface 46S. Left and right bottom indentations 96L and 96R are integrally molded into bottom surface 46S, and are each shaped to fitably engage the top of one of our rounded rectangular donut-shaped dumbells 36. The dumbells serve as pylons, to raise the height of the deck, with their considerable mass adding substantially to the stability of the arrangement. In addition, since the deck is also fillable with ballast, it too has considerable mass, weighing in at about 30 lbs. when full, and so is less likely to be accidentally pushed or kicked out of place during use than if it were lighter. The combined mass of the dumbells and deck also reduces the tendency for all or part of the assembly to accidentally tip over, and so is a safety plus.

The deck member 94 has an outer parting line 6 which circuits its periphery, following the widest part, when viewed from a direction in which the mold opens and closes. This placement insures that the finished part may be easily removed from the mold when opened. A threaded filling neck 32, similar to those of the dumbells and barbells of the previously described embodiments, is centered on the parting line, with its longitudinal axis perpendicular to the directions in which the mold opens and closes. This placement, again, allows easy separation of the finished part from the mold. Threaded cap 34 provides a positive, watertight seal to the filling neck. In this case we have chosen to locate the neck/cap combination near one end of a longer side of the deck member, so that when the deck is mounted upon the dumbells, the filling neck of the deck may be located approximately above the filling neck of one of the barbells, should the user choose to so orient that (symmetrical) dumbell. This consolidates the number of general regions having a protruding neck from three to two, and allows both regions to be on the same side of the assembly, so that a user may orient the assembly with all necks facing away from him/her, with freedom to step up to the platform from the front, or either side without inadvertently contacting a filling neck.

The deck may be sat, laid, or stood upon, making it useful as a step for aerobic-type stepping routines, a bench for freeweight exercises such as flys, extensions, and presses, a seat for leg extensions, curls, or a variety of other exercises, or simply as a place to rest after all that exertion! Such a platform is also useful for leaning upon with one hand, while performing bent over rows, extensions, or other exercises with the other. The deck may be provided with a nonskid surface, which may be either molded in, or applied to the top of it after molding.

Eighteenth Embodiment

FIGS. 34 and 35 illustrate the deck/dumbell combination of the seventeenth embodiment, with the addition that each dumbell 36 is fitably mounted upon a base member 97. Each base member has a flat bottom surface which provides a widened stance and enhanced stability. The top side of each base member is provided with a base indentation 98 which fitably engages the bottom of the dumbell. The base members greatly add to the stability of the arrangement, in addition to providing a means for adjustment of the deck height; The inclusion or non-inclusion of base members, as well as the option of using base members having different thicknesses, or even stackable base members, all offer ways to adjust the height of the deck.

Nineteenth Embodiment

This is an especially preferred version of the dumbell, deck member, and base member combination. In this embodiment, we have two matching graduated sets of stackable dumbells, similar to those described in the fourteenth embodiment, except that the heaviest pair and the next heaviest pair differ in height, but not width, and so are interchangeably stackable. Each of these two largest sizes is provided with a lip on its top surface and a matching groove, or channel, on its bottom surface. The contours of the top surfaces of both of these larger sizes of dumbell are similar, so that either size is capable of securely engaging the bottom surface of the deck member equally well. The contours of the bottom surfaces of both of these larger sizes of dumbell are also similar, so that either size fits the, base indentations in the top surfaces of the base members equally well.

(Obviously either size dumbell will also stackably fit atop the other.) With this arrangement one can choose between two different height aerobic stair-stepping platforms, depending on which height of dumbell we wish to use as pylons, mounted on the base members and supporting the deck member. Alternatively we may choose to configure an exercise bench for sitting, laying, or leaning upon, higher than a stair-stepping platform, by mounting the heaviest pair of dumbells on the base members, stacking the next heaviest pair of dumbells on top of those dumbells (so that each pylon now consists of two different height dumbells stacked one atop the other), and finally spanning both of these stacks with our fitably attachable deck member. Thus, by making our heaviest and second heaviest dumbells interchangeably stackable, we have the option of using them in combination with two base members and a deck member to configure three different height stable exercise platforms.

Twentieth Embodiment

FIG. 36 shows a deck member 95 similar to that of the seventeenth embodiment, except that it has integrally molded contours making it fitably mountable atop a barbell 30 of the present invention. In this case bottom indentation 96 is integrally formed into bottom surface 46S, and is shaped to fitably engage the top of one of our barbells 30. In FIG. 37, we can see that deck member 95 is also mountable atop a pair of our dumbells 36 when they are properly angled. Base members 98 could easily be added to this configuration. With a complete set of our stackable freeweights, including a deck, many related configurations are possible. The set may be designed so that the deck member may be mounted atop different barbells, dumbells, or combinations thereof to change the height. Another method of varying the height would be to utilize base members 98 having different thicknesses.

The deck member could also be provided with compound contours making it fitable atop either a barbell as in the eighteenth embodiment, or a pair of dumbells aligned in a mutually parallel configuration as in the seventeenth embodiment.

Twenty-First Embodiment

FIGS. 38, 40, and 15 illustrate a hollow, fillable, blow-moldable barbell of the present invention, similar to the tenth embodiment, except that in this case the handles 50 are not angled, but are instead disposed parallel to the longitudinal axis of the unit as a whole. This type of fillable barbell is more suited to presses than the previous embodiments, being comparable to a regular conventional barbell having a straight bar.

Like the barbell of the tenth embodiment, this one could be thought of as essentially two of the previously described rounded-rectangular donut-shaped dumbells 36 of the fifth embodiment, here labeled 36L and 36R, fluidly connected by and merged with a middle region 70 which smoothly blends with the contours of the "donuts" where it meets them. These donut-shaped regions 36L, 36R, the handles 50, as well as the recesses 42 which they span, are disposed along, and in this case are aligned parallel to, an imaginary longitudinal axis 92 passing through the center of mass 90 of the barbell when filled. Middle region 70 has front and rear inward-swooping surfaces 62 and 66 respectively, as well as top-central and bottom-central surfaces 40C and 46C respectively.

One major difference from the tenth embodiment is that the handles are placed further apart here. Since the rounded-rectangular donut-shaped ends 36L and 36R of this barbell are not angled, they do not blend as easily with inward-swooping surfaces 62 and 66 as they did in the tenth embodiment, and therefore must be slightly further apart to avoid interference with the user's trunk when the barbell is held closely to the body, at full extension and contraction during curls, for example.

All of the same considerations regarding the blow-ratio, sufficiently rounded corners, and the location of the filling neck centered on the parting line, etc. which allow the barbells and dumbells of the previously described embodiments to be blow-molded, also apply to this barbell. Looking to FIG. 15, we see that this barbell has a sectional width of 3.5 inches, a depth of 7 inches and therefore has a blow-ratio of 2.

Twenty-Second Embodiment

FIGS. 41 and 15 illustrate a variation on the twenty-first embodiment wherein top central surface 40C and bottom central surface 46C are slightly concave, to reduce interference with the user's trunk. Like the barbell of the twenty-first embodiment, this one can be engaged by the user with equal ease from either the top or bottom side.

Twenty-Third Embodiment

FIGS. 39 and 42 show a blow-moldable, water-fillable barbell similar to that of the twenty-first embodiment except that in this case the top-central surface 40C is concave, forming user's trunk accomodation central cutout 80, centered on the top side. Since in this case bottom-central surface 46C is not correspondingly concave, we have established a side of preferred access (the top side). By making the top-central surface concave, we have removed ballast-containing volume from that region. This barbell is now not symmetrical from top to bottom, with the center of mass 90 having been relocated away from the user (moved toward the bottom) as compared to the center of mass of the twenty-first embodiment. Our imaginary longitudinal axis 92, since it passes through center of mass 90, is now also relocated away from the user as compared to the symmetrical twenty-first embodiment. In order to maintain the balanced, rotationally stable, ergonomic grip characteristic of our newly invented freeweights, we must also relocate our handles 50 away from the user, along longitudinal axis 90. Since the handles 50 must be centered vertically on inner parting lines 4, we must also adjust the position of those parting lines by the same amount.

Twenty-fourth Embodiment

FIGS. 43 and 44 show a hollow, fillable, blow-moldable barbell, similar to the twenty-first embodiment, additionally having protrusions 20 at either end for the telescopic attachment of hollow, fillable, blow-moldable weights 22. The outer parting line 5 circuits the periphery of these protrusions at their widest section, when viewed from a direction in which the mold opens and closes, beginning and ending at filling neck 32. Filling neck 32 projects from the end of one protrusion, centered on the outer parting line 5 and disposed perpendicularly to the direction in which the mold opens and closes, so that the finished part may be easily removed from the mold when the mold is opened.

In this case the protrusions have a rounded-square cross-section, and the weights each have a central void which geometrically matches that cross-section, for a snug fit. The barbell and weights are provided with a mutually interlocking bump-and-dimple type of arrangement to secure the weights to the protrusions. A pair of bumps 24 are molded into the centrally-facing surface of the void of each weight, diametrically opposed to one another and centered on an inner parting line 28. A pair of dimples 25 are molded into corresponding locations on the top and bottom of each protrusion, so that when a weight is fully attached, the bumps and dimples snapably engage one another.

Each molded weight has both an inner, and an outer parting line, 28 and 29 respectively, which circuit the narrowest, and widest sections of the weight, respectively, when viewed from a direction in which the mold opens and closes. Similarly to the barbell itself, a threaded filling neck is centered on the outer parting line 29, and is disposed perpendicularly to the direction in which the mold opens and closes, for easy separation of the part from the mold. Since no section of these attachable weights need be greatly deeper than its width, we should not anticipate great difficulty in blow-molding such a shape.

Twenty-Fifth Embodiment

In FIGS. 45 and 46 we see a barbell with attachable weights similar to the twenty-second embodiment, except that the protrusions are cylindrical, each having an L-shaped channel 26 formed into its surface. The weights, as in the twenty-second embodiment, each have bumps 24, which serve as locking means for attachment of the weights, molded into their central holes, except that in this case the holes are round. In this scenario, the weight is first telescopically slid onto the protrusion, then rotated to lock it into place.

Twenty-Sixth Embodiment

In FIGS. 47 and 48 we see another arrangement similar to the twenty-third embodiment except here the protrusions are provided with integrally molded threads 27. In this case the bumps 24 engage the threads 27. The weights are attached by simply screwing them onto the protrusions. The weights could alternatively have partial threads molded into the surfaces of their voids, or the weights could have fully threaded inserts.

CONCLUSION, RAMIFICATIONS AND SCOPE OF INVENTION

A two-handed fillable barbell molded as a single unit and having a threaded filling nozzle and screw-on cap has been completely unknown until first revealed by this inventor in U.S. Pat. No. 5,716,305.

The design of the present invention represents a true groundbreaking improvement in barbells and dumbells, since it reveals the first known example of a unitary, rigid, fillable dumbell, having a handle located within a central recess, which is capable of being blow molded. This design also represents a true groundbreaking improvement in barbells, since it is the first known example of a unitary, fillable barbell capable of being blow molded in the range of thicknesses necessary for a fully functional set of graduated barbells. While the initial cost of a blow mold is much higher than that of most other types of molds for high volume production it nevertheless remains the most cost-effective method of production for hollow plastic containers. Thus the reader will see that the present invention provides an inexpensively manufactured, multiple use set of exercise equipment which can be shipped or transported in a lightweight state, and conveniently filled with a ballast substance such as water by the end user to impart mass sufficient to facilitate the myriad of uses for which it is designed. By concentrating on the balance, ergonomics, strength, and blow-moldability of a fillable dumbell, I am also putting forth an improved container for pourable substances. The inclusion of an integrally molded base and contours for enhanced stackability make such a container useful for a variety of purposes other than weightlifting. While the above description contains many specificities, these should not be construed as limitations on the scope of the invention, but rather as exemplification of preferred embodiments thereof. Many other variations are possible, without departing from the overall spirit of the invention, for example:

The handles could be mounted at a different angle than that discussed above;

More handles and hand access recesses could be incorporated in the middle instead of foot insertion voids;

The hand access recesses and handles could be omitted from a version of the present invention which would be directed toward engagement by the feet only;

The present invention could be cast or machined as a single solid, as opposed to a fillable hollow container;

The threaded fill nozzle and cap could be replaced by a permanent fill plug, with the present invention being filled with a permanent ballast substance or a cementitious hardening solid at the point of manufacture;

The present invention could have one or more decorative textures, patterns, or markings molded into the surface;

Structural ribs, folds, creases, grooves, or panels could be molded into one or more surfaces of the invention;

Having writing, brand recognition markings, instructional text or diagrams, or trademark graphics integrally molded into the surface could enhance the appearance or utility of this invention;

This general design could incorporate rotatable, or swivel mounted handles, or handles mounted within a gimbal assembly;

Accordingly, the scope of the invention should be determined not by the embodiments illustrated, but by the appended claims and their legal equivalents.

What is claimed is:

1. A unitary jug stackable with others of its kind, and capable of being produced by the technique of blow-molding from a two piece mold, said jug comprising:

a shell enclosing a hollow interior, said shell comprising a walled exterior surrounding a walled aperture which fully penetrates said jug from one side thereof through to an opposing side, the aperture having a midsection where it is narrowest and widening toward its open ends, where it merges with said sides;

an elongate tubular handle within and spanning said aperture at said narrowest midsection so that the jug is rotationally stable about the handle;

closable entry means for admitting material to the interior of said jug;

corresponding mutually engagable contours formed respectively on each said side in the region surrounding the periphery of said aperture and configured so that the contour of one side is fitably engagable with the corresponding contour on the opposing side, such that said jug is stackable with others of its kind, one said side being shaped to provide a stable base for supporting a stack of said jugs on a planar support surface;

two inner parting lines defined within said aperture, one on either side of the handle, each describing a closed curve which follows the length of the handle and the narrowest part of the aperture;

an outer parting line defined following said exterior wall at its widest point;

wherein the exterior and aperture walls, where they flank said handle, extend substantially parallel to the length of the handle so that the minimum distance between any said inner parting line and said outer parting line, in any given region, is at least about one half of the distance between said first side and said opposing side in said given region, so that a maximum blow ratio of about two is not exceeded.

2. The jug in claim 1, wherein said entry means comprises a filling neck or spout, centered on said outer parting line.

3. The jug in claim 2, wherein said filling neck or spout is threaded, having its longitudinal axis in line with the outer parting line, and provided with closure means comprising a threaded cap.

4. The jug in claim 1, wherein said entry means is provided with closure means.

5. The jug in claim 1, wherein the perpendicular distance between any of said inner parting lines and said outer parting line, in all regions except said handle and said entry means, is constant, thereby giving the entire fillable jug in all regions except said handle and said entry means a constant depth or height.

6. The jug in claim 1, wherein the handle has a substantially elliptical cross section.

7. The jug in claim 1, further comprising an integrally molded base disposed opposite said entry means, whereby said container may be stood on said base.

8. The jug in claim 1, wherein said jug is a member of a graduated set of jugs having a similar shape, which vary volumetrically, wherein said contours are fitably engagable with the other members of said set.

9. The jug in claim 1, wherein one said contour is a raised lip circumscribing the periphery of said aperture on one side of said jug and the corresponding contour is an indented groove circumscribing the periphery of said aperture on the opposing side.

10. The jug in claim 9, wherein said lip takes the form of a ledge which increases in height from its outer periphery to its inner periphery; and said groove takes the form of an indentation which increases in depth from its outer periphery to its inner periphery.

11. A ballast fillable barbell capable of being produced by the technique of blow-molding comprising:

an elongate fillable vessel having entry means for admitting a ballast material to the interior of the vessel, a walled exterior at each end of the vessel surrounding a walled aperture penetrating the vessel from one side thereof through to the opposite side, an elongate handle spanning each aperture, the length of each handle being oriented at an angle to a longitudinal center line passing through the center of mass of said fillable vessel, wherein the exterior and aperture walls, where they flank said handle, extend substantially parallel to the length of the handle so as to be oriented at the same angle as the handle, thereby maintaining a substantially constant blow ratio.

12. The barbell of claim 11 wherein a middle region of said barbell is penetrated by a void for insertion of a user's foot.

13. The barbell of claim 12 wherein the void merges with each of said apertures.

14. The barbell of claim 11 wherein a middle region of said barbell is penetrated by a pair of voids for insertion of a user's feet.

15. The barbell of claim 14 wherein each void merges with a respective one of said apertures.

16. The barbell of claim 11 wherein each handle is tubular.

17. The barbell of claim 11 wherein each handle is elliptical in cross-section.

18. The barbell of claim 11 wherein said vessel is a member of a graduated set of vessels having a similar shape, which vary volumetrically, each member of said set having corresponding mutually engagable contours such that said vessels are stackable, on atop another.

19. The barbell of claim 18 wherein one said contour comprises a raised lip circumscribing the periphery of said apertures on one side of said vessel and the corresponding contour is an indented groove circumscribing the periphery of said aperture on the opposing side.

20. The barbell of claim 19 wherein said lip takes the form of a ledge which increases in height from its outer periphery to its inner periphery; and said groove takes the form of an indentation which increases in depth from its outer periphery to its inner periphery.

21. The barbell of claim 11 wherein a top surface of said barbell comprises a flat surface for serving as a step in step-type exercises.

22. The barbell of claim 11 wherein a concavity for accommodating the user's body is formed between the apertures.

23. A ballast fillable barbell capable of being produced by the technique of blowmolding comprising:

an elongate fillable vessel having entry means for admitting a ballast material to the interior of the vessel, a walled exterior at each end of the vessel surrounding a walled aperture penetrating the vessel from one side thereof through to the opposite side, an elongate handle spanning each aperature, wherein the exterior and aperture walls, where they flank said handle, extend substantially parallel to the length of the handle so as to be oriented at the same angle as the handle, thereby maintaining a substantially constant blow ratio, wherein two male protrusions are formed on opposite ends of said vessel, and further comprising additional weights having female holes engagable with said protrusions.

24. The barbell of claim 23 further comprising locking means for securing said weights to said protrusions.

25. The barbell of claim 24 wherein said locking means comprises a convex bump within the female hole of each weight and a matching concave dimple on each protrusion.

26. The barbell of claim 24 wherein said locking means comprises said female hole of each said weight and each said protrusion being complementarily threaded.

27. The barbell of claim 24 wherein said locking means comprises a convex bump within the female hole of each weight and a matching L-shaped channel on each protrusion.

28. A step exercise apparatus, comprising:

a deck member;

at least one pair of pylons, the pylons each having an aperture penetrating from one side thereof through to the opposite side and a handle spanning the aperture for use of the pylons as dumbbells; and means for securely engaging a bottom surface of the deck member to a top surface of each pylon so that the deck may be raised for step exercises.

29. The step exercise apparatus of claim 28, wherein the deck member comprises a fillable vessel.

30. The step exercise apparatus of claim 28, wherein the pylons comprise fillable vessels.

31. The step exercise apparatus of claim 28, further comprising a second pair of said pylons, said pylons having mutually interlocking surfaces allowing one to be stacked atop another so that the height of the deck member may be selectively varied.

32. The step exercise apparatus of claim 28, further comprising a pair of base members, a top side of each base member being provided with an indentation which fitably engages a bottom portion of one said pylon, to increase the footprint of the pylon on a support surface.

* * * * *